US011928903B2

(12) United States Patent
Kang et al.

(10) Patent No.: US 11,928,903 B2
(45) Date of Patent: Mar. 12, 2024

(54) USER TERMINAL DEVICE, SERVER, AND METHOD FOR PROVIDING DRIVER'S DRIVING INFORMATION USING THE SAME

(71) Applicant: THINKWARE CORPORATION, Seongnam-si (KR)

(72) Inventors: Min Suk Kang, Seongnam-si (KR); Won Jun Heo, Seongnam-si (KR); Seung Yo Jang, Seongnam-si (KR); Youn Joo Shin, Seongnam-si (KR); Tae Kyu Han, Seongnam-si (KR)

(73) Assignee: THINKWARE CORPORATION, Seongnam-si (KR)

( * ) Notice: Subject to any disclaimer, the term of this patent is extended or adjusted under 35 U.S.C. 154(b) by 136 days.

(21) Appl. No.: 17/096,352

(22) Filed: Nov. 12, 2020

(65) Prior Publication Data

US 2021/0295621 A1    Sep. 23, 2021

(30) Foreign Application Priority Data

Mar. 18, 2020   (KR) .......................... 10-2020-0033186
Oct. 16, 2020   (KR) .......................... 10-2020-0133936

(51) Int. Cl.
*A61B 5/18* (2006.01)
*G06F 3/04817* (2022.01)
(Continued)

(52) U.S. Cl.
CPC ....... *G07C 5/0825* (2013.01); *G06F 3/04817* (2013.01); *G07C 5/008* (2013.01); *G07C 5/0808* (2013.01)

(58) Field of Classification Search
CPC ........ G07C 5/0825; G07C 5/008–0808; G06F 3/04817
See application file for complete search history.

(56) References Cited

U.S. PATENT DOCUMENTS 9,751,535 B1 *   9/2017   Fields ...................... A61B 5/18
2013/0179198 A1 *   7/2013   Bowne ...................... G07C 5/08
705/4

(Continued)

OTHER PUBLICATIONS

"Inavi Connected Pro new service announcement", Nov. 14, 2019, http://www.inavi.com/CustCenter/Notice/Dtls/3007?notidiv&schtext&schtype, with English Translation. (3 pages).
(Continued)

*Primary Examiner* — Lin Li
(74) *Attorney, Agent, or Firm* — WHDA, LLP

(57) ABSTRACT

There is provided a method for providing driver's driving information of a user terminal device, including accessing a driving information providing server storing data generated in a driving recording device for a vehicle, receiving driving record data including event record data corresponding to a driving-related event of a driver from the driving information providing server, and displaying a driving-related event occurrence location on a map using the received driving record data. The driving-related event may include at least two or more of a lane departure event, a forward collision possibility event, a rear side collision possibility event, a sudden deceleration event, a sudden acceleration event, a sudden stop event, a sudden start event, and a speeding event.

20 Claims, 54 Drawing Sheets

(51) Int. Cl.
    *G07C 5/00*           (2006.01)
    *G07C 5/02*           (2006.01)
    *G07C 5/08*           (2006.01)
    *H04W 4/02*          (2018.01)

(56)              References Cited

U.S. PATENT DOCUMENTS

2013/0317665 A1    11/2013  Fernandes et al.
2015/0161827 A1*   6/2015  Getchius ................. G07C 5/02
                                                         701/519
2016/0313957 A1*  10/2016  Ebert ...................... H04W 4/02
2020/0219337 A1*   7/2020  Kwak ................. G06F 21/6272
2020/0231147 A1*   7/2020  Hori ..................... B60W 50/14

OTHER PUBLICATIONS

"Reinforced visibility after upgrading the iNavi connected mobile phone application", Nov. 21, 2019, https://cafe.naver.com/haruhi/2537337, with English Translation. (7 pages).
"INavi QXD3000PRO + iNavi 2nd Generation Connected Pro Reviews", Nov. 22, 2019, https://blog.naver.com/ign_5425/221715503507, with English Translation. (15 pages).

* cited by examiner

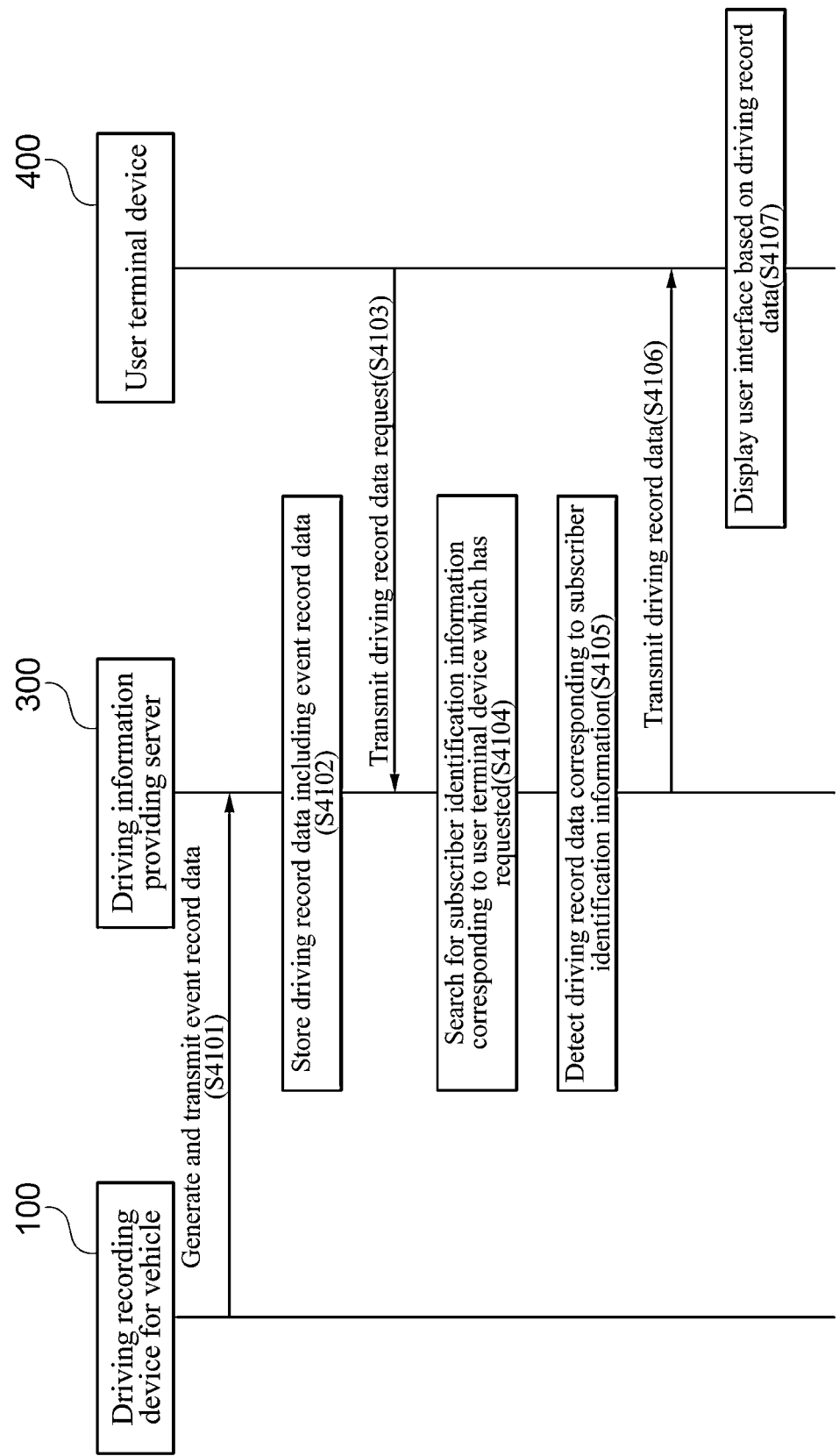

FIG. 10D

There is no driving record on selected date.
Would you like to see record of O month
O day which is near instead?

| No | Yes |

FIG. 14D

There is no driving record on selected month. Would you like to see record of O month which is near instead?

| No | Yes |

FIG. 14E

My driving record up to latest 3 months is provided. Would you like to see record of adjacent O month, instead?

| No | Yes |

FIG. 27
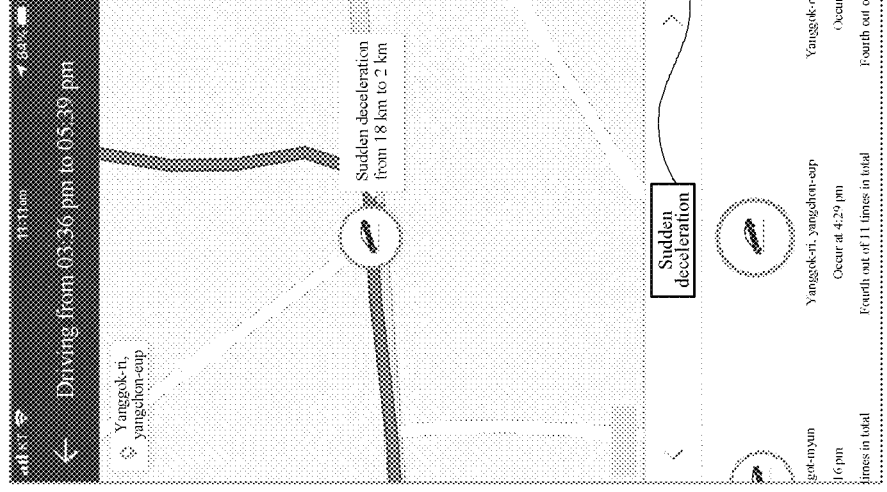
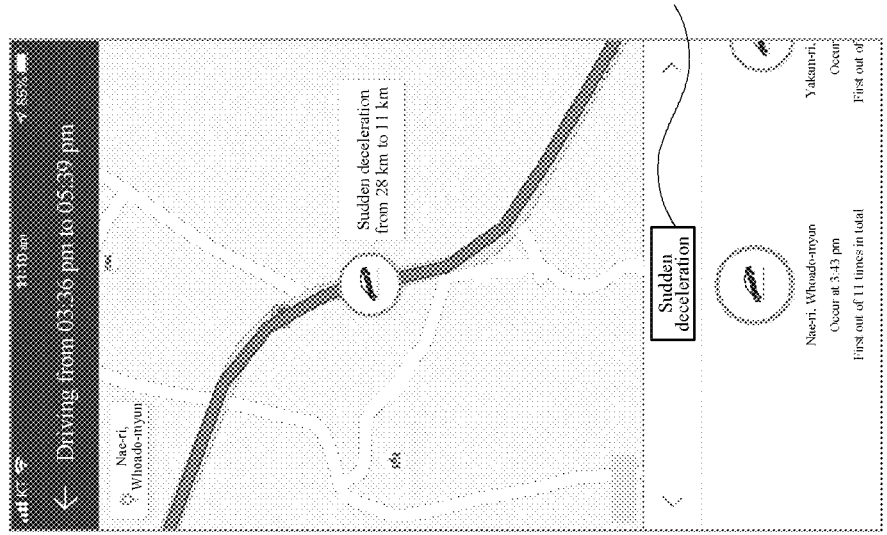

USER TERMINAL DEVICE, SERVER, AND METHOD FOR PROVIDING DRIVER'S DRIVING INFORMATION USING THE SAME

CROSS-REFERENCE TO RELATED APPLICATION

This application claims the priority and benefit of Korean Patent Application No. 10-2020-0033186 filed on Mar. 18, 2020 and Korean Patent Application No. 10-2020-0133936 filed on Oct. 16, 2020, with the Korean Intellectual Property Office, the disclosure of which is incorporated herein by reference.

BACKGROUND OF THE INVENTION

1. Field of the Invention

The present invention relates to a user terminal device that provides driving information of a vehicle driver based on a driving-related event of the driver detected by a driving recording device for a vehicle, a server, and a method for providing driver's driving information using the same.

2. Description of the Related Art

A driving recording device for a vehicle is a device for recording images captured during driving, stopping, and parking of a vehicle, which is very importantly used to reveal a cause of an accident in the vehicle. Accordingly, in recent years, most vehicles are equipped with driving recording devices.

Images captured by the driving recording device for a vehicle includes images captured during driving, stopping, and parking of the vehicle and various driving records such as information on locations where the images are captured.

Therefore, if the various driving records collected by the driving recording device for a vehicle are properly utilized, various functions or services utilizing the driving record may be provided to drivers and driver's convenience may be expected to be improved.

SUMMARY

An aspect of the present invention may provide a user terminal device, a server, and a method for providing driver's driving information using the same, which enables easy recognition of and search for a record of occurrence of a driving-related event due to careless driving by a vehicle driver anytime and anywhere.

According to an exemplary embodiment of the present invention, a method for providing driver's driving information of a user terminal device includes: accessing a driving information providing server storing data generated in a driving recording device for a vehicle; receiving driving record data including event record data corresponding to a driving-related event of a driver from the driving information providing server; and displaying a driving-related event occurrence location on a map using the received driving record data.

The driving-related event may include at least two or more of a lane departure event, a forward collision possibility event, a rear side collision possibility event, a sudden deceleration event, a sudden acceleration event, a sudden stop event, a sudden start event, and a speeding event.

The event record data may include location information corresponding to a location where the driving-related event occurs, time information corresponding to a time at which the driving-related event occurs, and event type information corresponding to a type of the driving-related event.

The displaying may include displaying a driving route of the driver and an event icon indicating the driving-related event occurrence location on the driving route, wherein the event icon may be displayed to be distinguished from each other according to types of events.

The method may further include: displaying a driving record list classified monthly and daily using the received driving record data, wherein at least one of driving time information or driving distance information corresponding to each item may be displayed on each item of the driving record list.

The map and the driving record list may be displayed on one screen.

The method may further include: displaying, when one item on the driving record list is selected, a driving route of the driver and an event occurrence location on the driving route corresponding to the selected item on the map.

The method may further include: displaying, when the event icon displayed on the map is selected, event occurrence reason information corresponding to the selected event icon as a pop-up window on the map.

The method may further include: displaying, when the event icon displayed on the map is selected, the map based on the selected event icon by scaling up the map.

The method may further include: displaying, when the event icon displayed on the map is selected, an image of an event corresponding to the selected event icon as a pop-up window.

The method may further include: displaying, when the event icon displayed on the map is selected, a driving-related event list including event detail information corresponding to the selected event icon and event detail information corresponding to an event that occurs before and/or after the selected event icon.

Each of a plurality of event detail information included in the driving-related event list may be selectable according to a user's swipe input, and when one of the plurality of event detail information is selected according to the user's swipe input, an event occurrence location on a driving route corresponding to the selected event detail information may be displayed on the map.

The method may further include: displaying an event driving record of the driver for a predetermined period of time in a region of a main user interface, wherein the region may display a driving record by adjusting a size of a figure according to the number of each kind of the driving record.

According to an exemplary embodiment of the present invention, a user terminal device for providing driver's driving information includes: a display unit; a communication unit accessing a driving information providing server storing data generated in a driving recording device for a vehicle and receiving driving record data including event record data corresponding to a driving-related event of a driver from the driving information providing server; and a controller controlling the display unit to display a driving-related event occurrence location on a map using the received driving record data.

The driving-related event may include at least two or more of a lane departure event, a forward collision possibility event, a rear side collision possibility event, a sudden deceleration event, a sudden acceleration event, a sudden stop event, a sudden start event, and a speeding event.

The event record data may include location information corresponding to a location where the driving-related event occurs, time information corresponding to a time at which the driving-related event occurs, and event type information corresponding to a type of the driving-related event.

The controller may control the display unit to display a driving route of the driver and an event icon indicating the driving-related event occurrence location on the driving route, wherein the event icon may be displayed to be distinguished from each other according to types of events.

The controller may control the display unit to display a driving record list classified monthly and daily using the received driving record data, wherein at least one of driving time information or driving distance information corresponding to each item may be displayed on each item of the driving record list.

The map and the driving record list may be displayed on one screen.

The controller may control the display unit to display, when one item on the driving record list is selected, a driving route of the driver and an event occurrence location on the driving route corresponding to the selected item on the map.

The controller may control the display unit to display, when the event icon displayed on the map is selected, event occurrence reason information corresponding to the selected event icon as a pop-up window on the map.

The controller may control the display unit to display, when the event icon displayed on the map is selected, the map based on the selected event icon by scaling up the map.

The controller may display, when the event icon displayed on the map is selected, an image of an event corresponding to the selected event icon as a pop-up window.

The controller may control the display unit to display, when the event icon displayed on the map is selected, a driving-related event list including event detail information corresponding to the selected event icon and event detail information corresponding to an event that occurs before and/or after the selected event icon.

Each of a plurality of event detail information included in the driving-related event list may be selectable according to a user's swipe input, and the controller may control the display unit to display, when one of the plurality of event detail information is selected according to the user's swipe input, an event occurrence location on a driving route corresponding to the selected event detail information.

The controller may display an event driving record of the driver for a predetermined period of time in a region of a main user interface, wherein the region may display a driving record by adjusting a size of a figure according to the number of each kind of the driving record.

According to an exemplary embodiment of the present invention, a method for providing driver's driving information by a server includes: receiving event record data corresponding to driver's driving-related event generated by a driving recording device for a vehicle; generating driving record data for a plurality of drivers based on the received event record data and storing the generated driving record data; detecting driving record data corresponding to the user terminal device when driving record data is requested by the user terminal device connected to the server; and transmitting the detected driving record data to the user terminal device, wherein the driving record data is used to display the driver's driving-related event information in the user terminal device.

The driving-related event may include at least two or more of a lane departure event, a forward collision possibility event, a rear side collision possibility event, a sudden deceleration event, a sudden acceleration event, a sudden stop event, a sudden start event, and a speeding event.

The driving record data may include the event record data and may further include at least one of driving time data, driving route data, and driving distance data.

In the storing of the driving record data, the driving record data may define as a single driving record from driving start to driving end, and a plurality of driving records whose driving start times and/or driving end times allocated to driving records are different may be classified as different driving records and stored.

The user terminal device may display a driving route of the driver and an event icon indicating the driving-related event occurrence location on the driving route on the map using the driving record data.

The user terminal device may output a captured image and/or recorded sound related to the driving-related event using the driving record data.

According to an exemplary embodiment of the present invention, a driving information providing server includes: a communication unit receiving event record data corresponding to driver's driving-related event generated by a driving recording device for a vehicle; a storage unit generating driving record data for a plurality of drivers based on the received event record data and storing the generated driving record data; and a controller controlling the communication unit to detect driving record data corresponding to the user terminal device when driving record data is requested by the user terminal device connected to the server, and to transmit the detected driving record data to the user terminal device, wherein the driving record data is used to display the driver's driving-related event information in the user terminal device.

The driving-related event may include at least two or more of a lane departure event, a forward collision possibility event, a rear side collision possibility event, a sudden deceleration event, a sudden acceleration event, a sudden stop event, a sudden start event, and a speeding event.

The driving record data may include the event record data and may further include at least one of driving time data, driving route data, and driving distance data.

The driving record data may define as a single driving record from driving start to driving end, and the storage unit may classify and store a plurality of driving records whose driving start times and/or driving end times allocated to driving records are different, as different driving records.

The user terminal device may display a driving route of the driver and an event icon indicating the driving-related event occurrence location on the driving route on the map using the driving record data.

The user terminal device may output a captured image and/or recorded sound related to the driving-related event using the driving record data.

According to an exemplary embodiment of the present invention, a computer-readable recording medium may have a program code recorded thereon to execute the method for providing driver's driving information described above.

According to an exemplary embodiment of the present invention, a computer program may include a program code stored in a computer-readable recording medium for executing the method for providing driver's driving information described above.

According to an exemplary embodiment of the present invention, a method for controlling a user terminal device including a touch-sensitive display includes: receiving driving record data including user's driving-related event data from a driving information providing server; generating a user interface including a driving record list and a map using the received driving record data; and displaying the generated user interface on the display, wherein the driving record list and the map are generated to reflect the user's driving-related event.

In the generating of the user interface, a map displaying a driving route corresponding to the driving record and the driving-related event occurrence location on the driving route may be generated.

In the generating of the user interface, the map in which the driving route and the driving route and the driving-related event occurrence location on the driving route may be displayed on one screen by scaling the map.

In the generating of the user interface, the driving record list in which only driving records in which the driving-related event occurs among a plurality of driving records of the user are displayed and a recently generated driving record based on time information for each driving record is displayed at a top end may be generated.

The method may further include: detecting a first contact on the touch-sensitive display from the driving record list of the user interface; selecting one item on the driving record list in response to detection of the first contact; generating a driving-related event list including at least one driving-related event occurring in a driving process of a driving record corresponding to the selected item; and displaying the generated driving-related event list on the display.

The method may further include: detecting a second contact on the touch-sensitive display from the driving-related event list; selecting one of a plurality of driving-related events included in the driving-related event list in response to detection of the second contact; displaying the selected driving-related event on the driving-related event list to be distinguished from other driving-related events; and displaying a location of occurrence of the selected driving-related event to be located at the center of the map.

The second contact may be a swipe input, and a driving-related event included in the driving-related event list may be moved in a direction corresponding to the swipe input so as to be displayed.

In the displaying to be located at the center of the map, the map may be magnified and displayed based on a location where the selected driving-related event occurs.

In the displaying to be distinguished, the selected driving-related event may be magnified to be displayed compared to the other driving-related events, may be displayed at a different height, or may be displayed to protrude further in a direction of the user's eyes.

The driving-related event may be displayed as an icon indicating a kind of the driving-related event on the map and the driving-related event list.

The method may further include: detecting a third contact on the touch-sensitive display on the map; selecting one of at least one driving-related event displayed on the map in response to detection of the third contact; and displaying event occurrence reason information corresponding to the selected driving-related event on the map.

According to an exemplary embodiment of the present invention, since a record of occurrence of a driving-related event due to careless driving by a vehicle driver may be easily recognized and searched anytime and anywhere, convenience of a user who wants to check and manage a driving record may be increased.

Furthermore, according to the present invention, since the driver easily recognizes his/her driving style by time or by driving road, it may be helpful in learning and improvement for safe driving.

Meanwhile, the effects obtainable in the present invention are not limited to the above-mentioned effects, and other effects not mentioned may be clearly understood by those skilled in the art from the following description.

BRIEF DESCRIPTION OF DRAWINGS

FIG. 5 is a timing view illustrating a process of providing driver's driving information in a connected service providing system according to an exemplary embodiment of the present invention.

FIGS. 10A-10D are views of a driving information user interface illustrating a date change process according to an exemplary embodiment of the present invention.

FIGS. 14A-14E are views of a driving information user interface illustrating a monthly date change according to an exemplary embodiment of the present invention.

FIG. 27 is view illustrating a user interface according to another exemplary embodiment of the present invention in which driving-related events that occur in a corresponding route are classified by event type and displayed.

DETAILED DESCRIPTION

Figure 1:
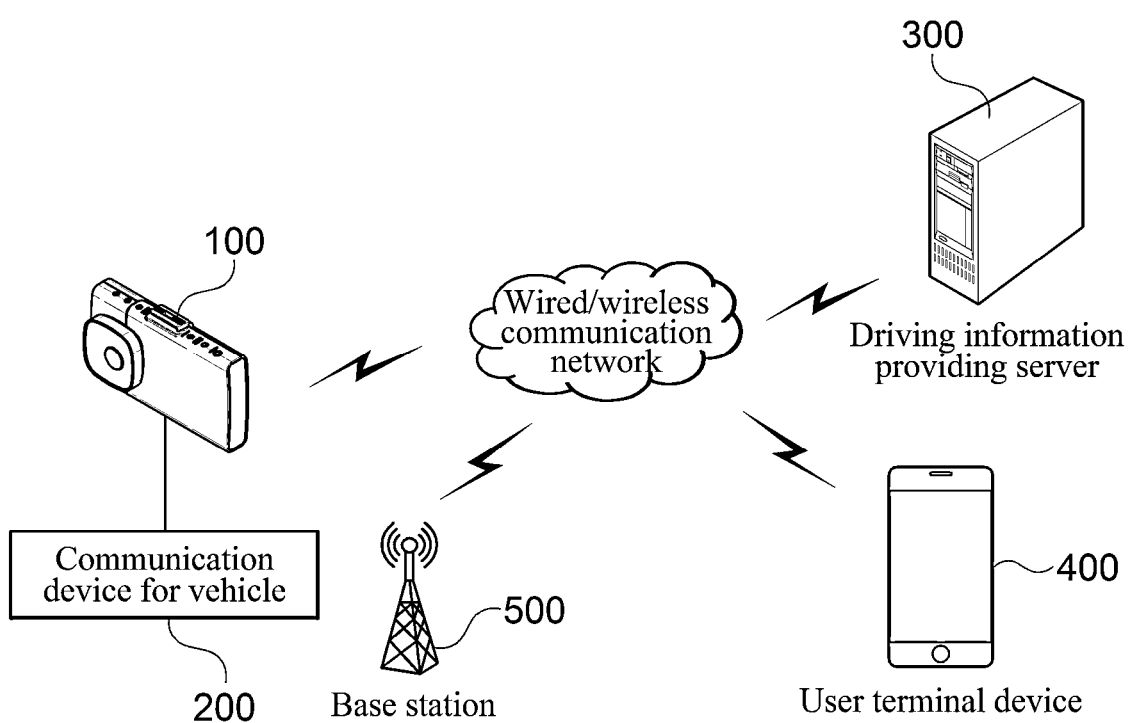
FIG. 1 is a block diagram illustrating a connected service system according to an exemplary embodiment of the present invention.

The following description merely illustrates the principles of the present invention. Therefore, those skilled in the art may implement the principle of the present invention and invent various devices included in the spirit and scope of the present invention, although not clearly described or illustrated in the present specification. In addition, it is to be understood that all conditional terms and exemplary embodiments mentioned in the present specification are obviously intended only to allow those skilled in the art to understand a concept of the present invention in principle, and the present invention is not limited to exemplary embodiments and states particularly mentioned as such.

Further, it is to be understood that all detailed descriptions mentioning specific exemplary embodiments of the present invention as well as principles, aspects, and exemplary embodiments of the present invention are intended to include structural and functional equivalences thereof. Further, it is to be understood that these equivalences include an equivalence that will be developed in the future as well as an equivalence that is currently well-known, that is, all elements invented so as to perform the same function regardless of a structure.

Therefore, it is to be understood that, for example, a block diagram of the present specification shows a conceptual aspect of an illustrative circuit for embodying the principle of the present invention. Similarly, it is to be understood that all flowcharts, state transition diagrams, pseudo-codes, and the like, illustrate various processes that may be tangibly embodied in a computer readable medium and that are executed by computers or processors regardless of whether or not the computers or the processors are clearly illustrated.

Functions of various elements including processors or functional blocks represented as concepts similar to the processors and illustrated in the accompanying drawings may be provided using hardware having capability to execute appropriate software as well as dedicated hardware. When the functions are provided by the processors, the functions may be provided by a single dedicated processor, a single shared processor, or a plurality of individual processors and some thereof may be shared with each other.

In addition, terms mentioned as a processor, a control, or a concept similar to the processor or the control should not be interpreted to exclusively cite hardware having the capability to execute software, but should be interpreted to implicitly include digital signal processor (DSP) hardware and a read only memory (ROM), a random access memory (RAM), and a non-volatile memory for storing software without being limited thereto. The above-mentioned terms may also include other well-known hardware.

In the claims of the present specification, components represented as means for performing functions mentioned in a detailed description are intended to include all methods for performing functions including all types of software including, for example, a combination of circuit elements performing these functions, firmware/micro codes, or the like, and are coupled to appropriate circuits for executing the software so as to execute these functions. It is to be understood that since functions provided by variously mentioned means are combined with each other and are combined with a scheme demanded by the claims in the inventions defined by the claims, any means capable of providing these functions are equivalent to means recognized from the present specification.

The above-mentioned objects, features, and advantages will become more obvious from the following detailed description provided in relation to the accompanying drawings. Therefore, those skilled in the art to which the present invention pertains may easily practice a technical idea of the present invention. Further, in describing the present invention, in the case in which it is judged that a detailed description of a well-known technology associated with the present invention may unnecessarily make the gist of the present invention unclear, it will be omitted.

Hereinafter, various exemplary embodiments of the present invention will be described in detail with reference to the accompanying drawings.

FIG. 1 is a block diagram illustrating a connected service system according to an exemplary embodiment of the present invention. Referring to FIG. 1, a connected service system 1000 includes driving recording device 100 for a vehicle, a communication device 200 for a vehicle, a driving information providing server 300, a user terminal device 400, and a base station 500.

In the present invention, the vehicle is an example of a moving body, and the moving body according to the present invention is not limited to the vehicle. The moving body according to the present invention may include various objects that may be moved, such as a vehicle, a person, a bicycle, a ship, and a train. Hereinafter, for convenience of explanation, a case in which the moving object is the vehicle will be described as an example.

The base station 500 is a wireless communication facility that connects a network and various terminals for a service of wireless communication, and enables communication between the driving recording device 100 for a vehicle, the communication device 200 for a vehicle, the driving information providing server 300, and the user terminal device 400 included in the connected service system 1000 according to the present invention. As an example, the communication device 200 for a vehicle may be wirelessly connected to a communication network through the base station 500, and if the communication device 200 for a vehicle is connected to the communication network, the communication device 200 for a vehicle may exchange data with other devices (e.g., the driving information providing server 300 and the user terminal device 400) connected to the network.

The driving recording device 100 fora vehicle may be provided in the vehicle to capture an image related to driving of the vehicle in a driving situation of the vehicle such as driving, stopping, and parking of the vehicle (hereinafter, driving, stopping, and parking are collectively referred to as driving), and store the captured image.

In addition, the driving recording device 100 for a vehicle may be controlled by a user control input through the user terminal device 400. For example, when the user selects an executable object installed on the user terminal device 400, the driving recording device 100 for a vehicle may perform operations corresponding to an event generated by a user input to the executable object. Here, the executable object may be a type of application installed on the user terminal device 400 to remotely control the driving recording device 100 for a vehicle.

In addition, in the present specification, an action that triggers the operation of the driving recording device 100 for a vehicle will be defined as an event. For example, the types of events may be impact detection, motion detection, user gesture detection, user touch detection, and reception of a control command from a remote. Here, the driving recording device 100 for a vehicle may include all or some of a front capturing apparatus that captures the front of the vehicle, a rear capturing apparatus that captures the rear thereof, a side capturing apparatus that captures the left and right sides thereof, a capturing apparatus that captures a face of a driver of the vehicle, and an interior capturing apparatus that captures an interior of the vehicle.

In the present specification, an infra-red camera for a vehicle, a black-box for a vehicle, a car dash cam, or a car video recorder are different expressions of the driving recording device 100 for a vehicle, and may all mean the same device.

The communication device 200 for a vehicle is an apparatus that is connected to the driving recording device 100 for a vehicle to enable communication of the driving recording device 100 for a vehicle, and the driving recording device 100 for a vehicle may communicate with an external server through the communication device 200 for a vehicle. Here, the communication device 200 for a vehicle may use various wireless communication connection methods such as cellular mobile communication such as Long Term Evolution (LTE), and a wireless local region network (WLAN) method such as Wireless Fidelity (WiFi).

In addition, according to an exemplary embodiment of the present invention, the communication device 200 for a vehicle performing wireless communication with the server may be implemented as a communication module using low-power wide-area (LPWA) technology. Here, as an example of the low-power wide-area technology, a low-power wideband wireless communication module such as Long Range (LoRa), Narrow Band-Internet of Things (NB-IoT), or Cat M1 may be used.

Meanwhile, the communication device 200 for a vehicle according to an exemplary embodiment of the present invention may also perform a location tracking function such as a global positioning system (GPS) tracker.

In addition, in FIG. 1, the communication device 200 for a vehicle is described as being an external type provided separately from the driving recording device 100 for a vehicle, but is not limited thereto, and the communication device 200 for a vehicle may also be implemented as a built-in communication module provided inside the driving recording device 100 for a vehicle.

In the present specification, the dongle is another expression of the communication device 200 for a vehicle, and may all mean the same device.

The driving information providing server 300 relays various data between the communication device 200 for a vehicle and the user terminal device 400 to enable various connected services to be described later.

As an example, the driving information providing server 300 may receive data including various information generated by the driving recording device 100 for a vehicle from the communication device 200 for a vehicle, and store the received data by matching the received data to user identification information. In addition, the driving information providing server 300 may transmit the data generated by the driving recording device 100 for a vehicle to a user corresponding to the user identification information. Here, the user corresponding to the user identification information may mean a user with authority to data.

In this case, the user terminal device 400 may display a screen providing a variety of meaningful information based on the received data.

The user terminal device 400 may be installed with an application (hereinafter, referred to as "driving information providing application") for transmitting and receiving various data to and from the driving recording device 100 for a vehicle and/or the communication device 200 for a vehicle through the driving information providing server 300 and displaying the result. Accordingly, the user may execute the driving information providing application installed on the user terminal device 400, and display a guide screen based on various data related to the driving situation of the vehicle received from the driving recording device 100 for a vehicle according to the execution of the application. Here, the user terminal device 400 may be implemented as a smart phone, a tablet computer, a notebook computer, a personal digital assistant (PDA), or a portable multimedia player (PMP), or may also be implemented as a wearable device such as a smart glass wearable on a user's body, a head mounted display (HMD), or the like.

Here, the user may be a person having management authority for the vehicle and/or the driving recording device 100 for a vehicle such as a vehicle owner, a vehicle driver, an owner of the driving recording device 100 for a vehicle, or a supervisor of the driving recording device 100 for a vehicle.

Hereinafter, the driving recording device for a vehicle, the driving information providing server, and the user terminal device according to an exemplary embodiment of the present invention will be described in more detail with reference to the subsequent drawings.

Figure 2:
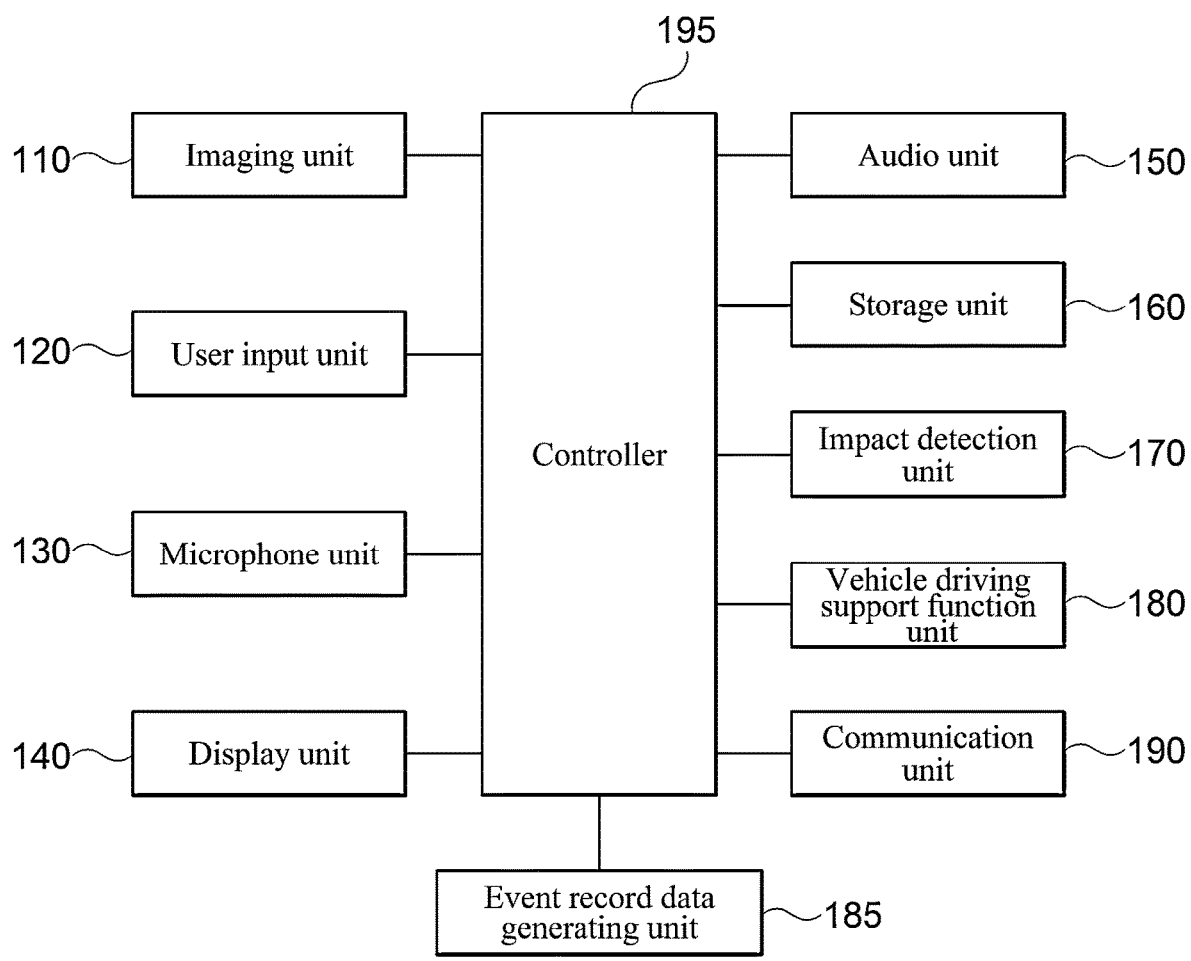
FIG. 2 is a block diagram illustrating a driving recording device for a vehicle according to an exemplary embodiment of the present invention.

FIG. 2 is a block diagram illustrating the driving recording device for a vehicle according to an exemplary embodiment of the present invention. Referring to FIG. 2, the driving recording device 100 for a vehicle may include an imaging unit 110, a user input unit 120, a microphone unit 130, a display unit 140, an audio unit 150, a storage unit 160, an impact detection unit 170, a vehicle driving support function unit 180, an event recording data generating unit 185, a communication unit 190, and a controller 195.

The imaging unit 110 may capture a driving image of the vehicle. Here, the driving image of the vehicle is an image captured in at least one situation of parking, stopping, and driving of the vehicle, and may include at least one image of the front, rear, side, and interior of the vehicle. At this time, the imaging unit 110 may also include an infrared camera that may monitor a face or a pupil of a driver, and the controller 195 may determine a driver's state including whether the driver is drowsy or not by monitoring the face or the pupil of the driver through an infrared camera.

The imaging unit 110 may include a lens unit and an imaging element. The lens unit may perform a function of condensing an optical signal, and the optical signal transmitted through the lens unit 21 reaches an imaging region of the imaging element and forms an optical image. Here, as the imaging element, a charge coupled device (CCD), a complementary metal oxide semiconductor image sensor (CIS), a high speed image sensor, or the like that converts the optical signal into an electrical signal may be used. In addition, the imaging unit 110 may further include all or some of a lens unit driving unit, an aperture, an aperture driving unit, an imaging element controller, and an image processor.

The user input unit 120 is a component that receives various user inputs for operating the driving recording device 100 for a vehicle, and may receive, for example, a user input for setting an operation mode of the driving recording device 100 for a vehicle, a user input for displaying a recorded image on the display unit 140, a user input for setting a manual recording, and the like.

Here, the operation mode of the driving recording device 100 for a vehicle may include a normal recording mode, an event recording mode, a manual recording mode, and a parking recording mode.

The normal recording mode is a mode that is executed when an engine of vehicle is turned on and the vehicle starts driving, and the normal recording mode may be maintained while the vehicle continues to drive. In the normal recording mode, the driving recording device 100 for a vehicle may perform recording in a predetermined time unit (e.g., 1 to 5 minutes). In the present invention, the normal recording mode and the normal mode may be used in the same sense.

The parking recording mode may refer to a mode in which the engine of vehicle is turned off or a battery supply for driving of the vehicle is stopped to operate in a parked state. In the parking recording mode, the driving recording device 100 for a vehicle may perform recording during a certain period (for example, recording before 10 seconds to after 10 seconds of an occurrence of an event) from a predetermined time of the occurrence of an impact event to a predetermined time after the occurrence of the impact event. In the present invention, the parking recording mode and the parking mode may be used in the same sense.

The event recording mode may refer to a mode operated when various events occur. Here, the events may include a driving-related event based on careless driving by a vehicle driver.

Such a driving-related event may include a lane departure event, a front collision possibility event, a rear collision possibility event, a sudden deceleration event, a sudden acceleration event, a sudden stop event, a sudden start event, and a speeding event. For example, when the driving-related event, such as an impact event detected by the impact detection unit 170 or an advanced driving assistance system (ADAS) event detected by the vehicle driving support function unit 180, is detected, an event recording mode may operate. In the event recording mode, the driving recording device 100 for a vehicle may perform recording during a time (for example, recording before 10 seconds to after 10 seconds of an occurrence of an event) from a predetermined time before the occurrence of the event to a predetermined time after the occurrence of the event.

The manual recording mode may refer to a mode operated by a user manually inputting recording. In the manual recording mode, the driving recording device 100 for a vehicle may perform recording during a time (for example, recording before 10 seconds to after 10 seconds of an occurrence of an event) from a predetermined time before an occurrence of a manual recording request of the user to a predetermined time after the occurrence of the manual recording request of the user.

Here, the user input unit 120 may be configured in various ways that may receive a user input, such as a key pad, a dome switch, a touch pad, a jog wheel, and a jog switch.

The microphone unit 130 may receive a sound generated from the inside or outside of the vehicle. Here, the received sound may be a sound caused by an external impact or a voice of a person related to a situation inside/outside the vehicle and may help to recognize a situation at the time together with an image captured by the imaging unit 110.

In particular, the microphone unit 130 may record a sound generated outside and/or inside the vehicle from before a predetermined time to after a predetermined time based on a time when a driving-related event occurs or a voice according to a user's speech and store the sound or the voice in the storage unit 160. Here, the sound recorded for a predetermined period of time of the driving-related event may be provided to the user terminal device 400 and used to analyze a driving state of the vehicle driver at the time when the driving-related event occurs.

The display unit 140 may display a variety of information processed by the driving recording device 100 for a vehicle. For example, the display unit may display a "live view image" which is an image captured in real time by the imaging unit 110, and may display a setting screen for setting an operation mode of the driving recording device 100 for a vehicle. As another example, the display unit 140 may display that the driving-related event of the vehicle driver has occurred.

The audio unit 150 may output audio data received from an external device or stored in the storage unit 160. Here, the audio unit 150 may be implemented as a speaker that outputs the audio data. As an example, the audio unit 150 may output audio data indicating that the driving-related event of the vehicle driver has occurred.

The storage unit 160 stores various data and programs necessary for the operation of the driving recording device 100 for a vehicle. In particular, the storage unit 160 may store a driving image captured by the imaging unit 110 and voice data input through the microphone unit 130.

In addition, the storage unit 160 may classify and store data obtained according to the operation mode of the driving recording device 100 for a vehicle in different storage areas.

The storage unit 160 may be configured inside the driving recording device 100 for vehicle, or configured detachably through a port provided in the driving recording device 100 for a vehicle, or may exist outside the driving recording device 100 for a vehicle. When the storage unit 160 is configured inside the driving recording device 100 for a vehicle, the storage unit 160 may exist in the form of a hard disk drive or flash memory. When the storage unit 160 is configured detachably in the driving recording device 100 for a vehicle, the storage unit 160 may exist in the form of an SD card, a Micro SD card, a USB memory, or the like. When the storage unit 160 is configured outside the driving recording device 100 for a vehicle, the storage unit 160 may exist in a storage space in another device or a database server connected through the communication unit 190.

The impact detection unit 170 may detect an impact applied to the vehicle or a case in which a change in acceleration is a certain level or higher. Here, the impact detection unit 170 may include an acceleration sensor, a geomagnetic sensor, and the like to detect impact or acceleration.

The vehicle driving support function unit 180 may determine whether or not a driving support function is required for the driver of the vehicle based on the driving image captured by the imaging unit 110.

As an example, the vehicle driving support function unit 180 may detect a start of a vehicle located in front of the vehicle and determine whether or not a forward vehicle start alarm (FVSA) is required for the driver, based on the driving image captured by the imaging unit 110. If a predetermined time has elapsed after the forward vehicle started, the vehicle driving support function unit 180 may determine that the forward vehicle start alarm is required.

In addition, the vehicle driving support function unit 180 may detect whether or not a signal is changed and determine whether or not a traffic light change alarm (TLCA) is required for the driver, based on the driving image captured by the imaging unit 110. As an example, if a stop state (0 km/h) is maintained for 4 seconds in a state in which the signal is changed from a stop signal to a straight signal, the vehicle driving support function unit 180 may determine that the traffic light change alarm is required.

In addition, the vehicle driving support function unit 180 may detect whether or not the vehicle departures from a lane and determine a lane departure warning system (LDWS) is required for the driver, based on the driving image captured by the imaging unit 110. As an example, when the vehicle departs from the lane, the vehicle driving support function unit 180 may determine that the lane departure warning system is required.

In addition, the vehicle driving support function unit 180 may detect a danger of a collision a vehicle in front of the vehicle and determine a front collision warning system (FCWS) is required for the driver, based on the driving image captured by the imaging unit 110. As an example, the vehicle driving support function unit 180 may determine that a primary front collision warning system is required when an initial front collision danger is detected, and determine that a secondary front collision warning system is required when an interval with the front vehicle is further reduced after the initial front collision danger is detected.

Here, the front collision warning system may further include an urban FCWS (uFCWS) that provides a front collision warning at a lower driving speed so as to be suitable for an environment in which a driving speed is low.

In addition, the vehicle driving support function unit 180 may detect a vehicle in a rear blind spot based on a driving image captured by the imaging unit 110 in a situation where the driver is to change lanes and determine whether blind spot collision warning (BSD) is necessary for the driver. For example, when a rear vehicle is detected in a situation where the driver attempts to change lanes, the vehicle driving support function unit 180 may determine that BSD is necessary. In this case, the vehicle driving support function unit 180 may include a radar-based rear vehicle detection sensor (not shown) and an on-board diagnostic (OBD)-based vehicle direction indicator detection sensor (not shown) to increase accuracy of the BSD.

The event recording data generating unit 185 may generate event recording data corresponding to a driving-related event when the driving-related event of the driver occurs. Here, the driving-related event of the driver may include at least two or more of a lane departure event, a front collision possibility event, a rear collision possibility event, a sudden deceleration event, a sudden acceleration event, a sudden stop event, a sudden start event, and a speeding event.

For example, when the vehicle driving support function unit 180 determines that at least one of a lane departure warning, a front collision warning, and a rear collision warning is necessary and the warning is executed, the event recording data generating unit 185 may generate at least one of the lane departure event, the front collision possibility event, and the rear collision possibility event corresponding to the warning and generate corresponding event recording data.

As another example, when at least one of sudden deceleration, sudden acceleration, sudden stop, and sudden start is detected based on a change in the impact and/or acceleration applied to the vehicle by the impact detection unit 170, the event recording data generating unit 185 may generate at least one of a sudden deceleration event, a sudden acceleration event, a sudden stop event, and a sudden start event corresponding to the detected situation and generate corresponding event recording data. Here, at least one of the sudden deceleration, sudden acceleration, sudden stop, and sudden start may be detected based on GPS data.

As another example, when a speeding situation in which the vehicle is driving exceeding a speed limit of a road on which the vehicle is driving is detected based on map data and GPS data, the event recording data generating unit 185 may generate a speeding event corresponding to the detected situation and generate corresponding event recording data. Here, the speeding event may refer to a situation in which the vehicle is driving in excess of a speed limit of a speeding control point. In such a speeding event, whether the vehicle is speeding may be determined by detecting a vehicle speed based on OBD.

Meanwhile, the generated event recording data may include location information corresponding to a location where a driving-related event occurs, time information corresponding to a time when the driving-related event occurs, and event type information corresponding to a type of the driving-related event.

In addition, the event recording data may include an image and/or a recorded sound captured for a period from before a predetermined time to after a predetermined time based on the occurrence of the driving-related event.

Here, the image may be a motion image generated by combining at least two images instead of using one image in order to represent a motion of an object in the image or may be an image including only one image.

The communication unit 190 may enable the driving recording device 100 for a vehicle to communicate with other devices. Here, the communication unit 190 may be implemented as various known communication modules such as a communication module using a cellular type mobile communication such as long term evolution (LTE), various wireless communication connection methods such as a wireless local region network (WLAN) such as wireless fidelity (Wi-Fi), a low-power wide-area (LPWA) technology.

Accordingly, the driving recording device 100 for a vehicle may communicate with the driving information providing server 300 and/or the user terminal device 400 through the communication unit 190.

Hereinafter, for convenience of explanation, a case in which the communication unit 190 is separately provided as the communication device 200 for a vehicle will be described as an example.

The controller 195 controls an overall operation of the driving recording device 100 for a vehicle. Specifically, the controller 195 may control all or some of the imaging unit 110, the user input unit 120, the microphone unit 130, the display unit 140, the audio unit 150, the storage unit 160, the impact detection unit 170, the vehicle driving support function unit 180, the event recording data generating unit 185, and the communication unit 190.

In particular, the controller 195 may set the operation mode of the driving recording device 100 for a vehicle to one of the normal recording mode, the event recording mode, the parking recording mode, and the manual recording mode, based on at least one of whether or not the vehicle is started, a measurement result of the battery voltage of the vehicle, a detection result of the impact detection unit 170, a determination result of the vehicle driving support function unit 180, and a set value of the operation mode. In addition, the controller 195 may perform control to stop the operation of the driving recording device 100 for a vehicle when the battery voltage of the vehicle falls below a threshold value or less.

In addition, the controller 195 may determine whether a driving-related event of the vehicle driver occurs, and when the driving-related event occurs, the controller 195 may control the communication unit 190 to transmit event recording data generated by the event recording data generating unit 185 to the driving information providing server 300.

Here, the event recording data may be used by the user terminal device 400 to provide information on a driver's driving-related event.

Figure 3:
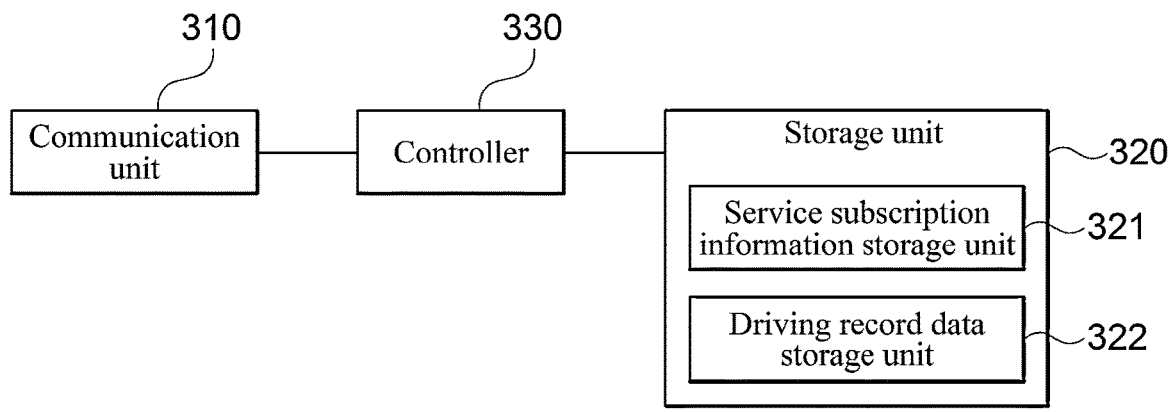
FIG. 3 is a block diagram illustrating a user terminal device according to an exemplary embodiment of the present invention.

FIG. 3 is a block diagram illustrating a driving information providing server according to an exemplary embodiment of the present invention. Referring to FIG. 3, the driving information providing server 300 may include a communication unit 310, a storage unit 320, and a controller 330.

The communication unit 310 may be provided in order for the driving information providing server 300 to communicate with other devices. Specifically, the communication unit 310 may transmit and receive data to and from at least one of the driving recording device 100 for a vehicle, the communication device 200 for a vehicle, and the user terminal device 400. Here, the communication unit 310 may be implemented as various well-known communication modules.

The storage unit 320 may store various data and programs for an operation of the driving information providing server 300. Here, the storage unit 320 may include a service subscription information storage unit 321 and a driving recording data storage unit 322.

Specifically, when a user who wants to receive a connected service subscribes to the service as a member using own terminal device 400, the service subscription information storage unit 321 may store service subscription information generated based on the information input through the member subscription. Here, the service subscription information storage unit 321 may store subscriber information subscribed to the connected service as the member and device information of the corresponding subscriber. The subscriber information may include subscriber identification information and subscription service information.

The subscription service information is information indicating in detail the service to which the subscriber has subscribed, and may include a service application history, a rate plan, a service expiration date, a data rate, a service type, and the like.

The subscriber identification information is information that enables identification of each of a plurality of subscribers, and may include a subscriber's ID, a subscriber's password, a subscriber's social security number, a subscriber's name, a subscriber's nickname, a subscriber's personal identification number (PIN), and the like.

In addition, the subscriber device information may include at least one of identification information of the driving recording device 100 for a vehicle and identification information of the communication device 200 for a vehicle purchased by the subscriber. Here, the identification information of the driving recording device 100 for a vehicle is information that enables identification of each of a plurality of driving recording devices for a vehicle, and may include a black box model name, a black box unique serial number, and the like. In addition, the identification information of the communication device 200 for a vehicle is information that enables identification of each of a plurality of communication devices for a vehicle, and may include a dongle model name, a dongle phone number, a dongle serial number, a universal subscriber identity module (USIM) serial number, and the like.

In addition, the subscriber device information may further include identification information of the terminal device 400 of the subscriber, and the identification information of the user terminal device 400 may include international mobile subscriber identity (IMSI), integrated circuit card ID (IC-CID), and international mobile equipment identity (IMEI), which are the unique information given by the network to identify the user terminal device 400.

In this case, the service subscription information storage unit 321 may match and store the subscriber information and the subscriber device information for each subscriber subscribed to the service as the member.

Meanwhile, the driving recording data storage unit 322 may store driving recording data to be provided to a subscriber who has joined a service based on event recording data generated in the driving recording device 100 for a vehicle.

Here, the driving recording data storage unit 322 may classify and store driving recording data for each subscriber in connection with the service subscription information storage unit 321.

Also, the driving recording data stored in the driving recording data storage unit 322 may include the event recording data, driving time data, driving route data, and driving distance data.

Here, the driving recording data may define a section from a driving departure point to a driving end point as a single driving record, and a plurality of driving records whose driving start times and/or driving end times allocated to driving record are different from each other are classified as mutually different driving records and stored in the driving recording data storage unit 322. For example, a driving record in which the driving start time is "10:00 a.m., June 1st" and the driving end time is "10:30 a.m., June 1st" may be classified as a first driving record, and a driving record in which the driving start time is "11:00 a.m., June 1st" and the driving end time "11:30 a.m., June 1st" may be classified as a second driving record and stored in the driving recording data storage unit 322.

Driving start refers to a situation in which power of the driving recording device 100 for a vehicle is turned on or the vehicle is turned on, and driving end may refer to a situation in which power of the driving recording device 100 for a vehicle is turned off or a situation in which the vehicle is turned off.

Meanwhile, the driving time data may include a driving start time for a driving record, a driving end time, a time from driving start to driving end, a driving date, and the like. The driving start time and the driving end time may refer to a time when the power of the driving recording device 100 for a vehicle is turned on/off or a time when the vehicle is turned on/off.

Further, the driving route data may refer to a movement route of the vehicle from driving start to driving end, and the driving distance data may refer to a movement route of the vehicle from the driving start to the driving end.

Meanwhile, all of the driving time data, the driving route data, and the driving distance data of the driving recording data described above may be generated by the driving information providing server 300 and added to the event recording data, or some of them may be used in the driving recording device 100 for a vehicle and transmitted to the driving information providing server 300 together with event recording data.

Here, the storage unit 320 may be implemented as an embedded module of the driving information providing server 300 or may be implemented as a separate database (DB) server.

Meanwhile, the controller 330 may control the overall operation of the driving information providing server 300 so that driver driving information according to the present invention is provided to the user terminal device 400

The operation of the driving information providing server 300 may be classified into a "new subscription process" in which the user newly subscribes to a service and a "service provision process" in which a service is provided to a subscriber who subscribes to the service.

In the "new subscription process", the controller 330 may perform control to initiate a service subscription procedure when a service member subscription is requested from the subscriber, acquire the subscriber information subscribed to the connected service as the member and the device information of the corresponding subscriber, and classify and store the acquired information. Accordingly, the storage unit 320 may establish a subscriber information database.

In the "service provision process", the controller 330 may control a black box/user registration process, a user registration process, and a driver driving information providing process, and the like so that the driver driving information may be provided to the user terminal device 400. As an example of the service provision, the user terminal device 400 may display a user interface that provides driving information of the driver as illustrated in FIGS. 6 to 15 to be described below.

As an example, when the "registration process of the black box" is performed, the controller 330 may receive unique information for identifying a communication device such as a universal subscriber identity module (USIM) chip embedded in the communication device 200 for a vehicle through communication with the communication device 200 for a vehicle, and may compare the unique information with information previously stored in the storage unit 320 to check validity of the communication device 200 that has requested registration.

Similarly, in the "registration process of the user", when the user terminal device 400 accesses the driving information providing server 300, the controller 330 may acquire user identification information such as the USIM embedded in the user terminal device 400 and may then compare the information previously stored in the storage unit 320 with the acquired user identification information to check whether the user terminal device 400 subscribes to the service and the type of service. If authentication for the user is successfully completed, the controller 330 may provide various information on the driving recording device 100 for a vehicle in various UX forms based on an authority assigned to the user.

Also, in the "driver driving information providing process", when the user terminal device 400 accesses the driving information providing server 300, the controller 330 may detect driving record data corresponding to the user of the connected user terminal device 400 and subsequently provide the detected driving record data to the user terminal device 400. In this case, the user terminal device 400 may display a driver driving information providing user interface to be described below.

Figure 4:
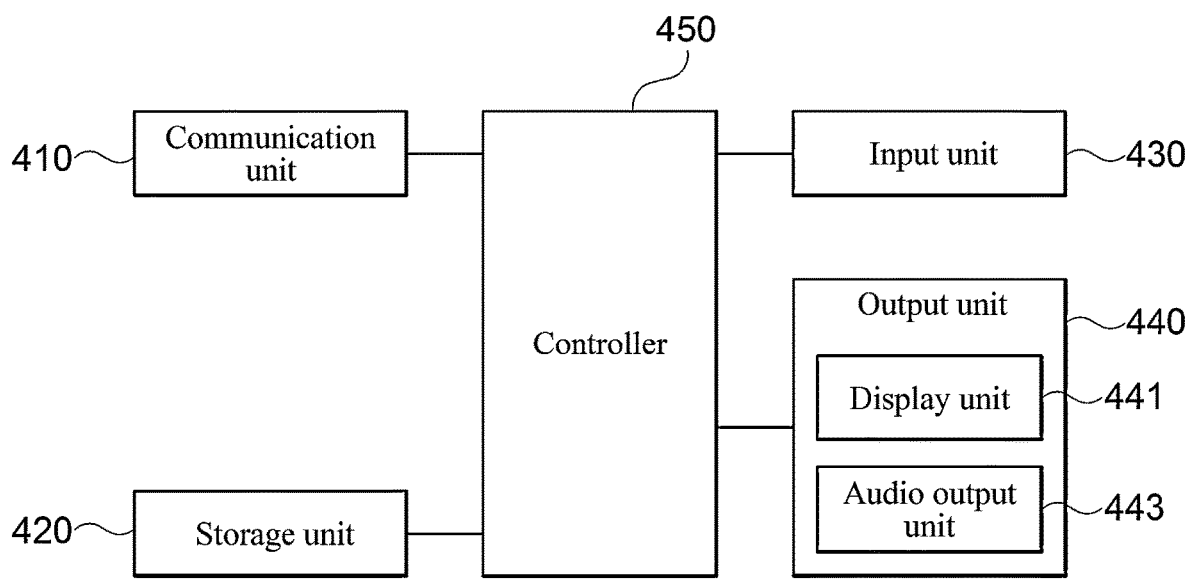
FIG. 4 is a block diagram illustrating a driving information providing server according to an exemplary embodiment of the present invention.

FIG. 4 is a block diagram illustrating a user terminal device according to an exemplary embodiment of the present invention. Referring to FIG. 4, the user terminal device 400 may include all or some of a communication unit 410, a storage unit 420, an input unit, an output unit 440, and a controller 450.

The communication unit 410 may be provided in order for the user terminal device 400 to communicate with other devices. Specifically, the user terminal device 400 may transmit and receive data to and from at least one of the driving recording device 100 for a vehicle, the communication device 200 for a vehicle, and the driving information providing server 300.

For example, the communication unit 410 may access the driving information providing server 300 storing data generated by the driving recording device 100 for a vehicle and receive driving recording data including event recording data corresponding to a driving-related event of the driver from the driving information providing server 300.

Here, the communication unit 410 may be implemented using various communication schemes such as a connection form in a wireless or wired scheme through a local region network (LAN) and the Internet network, a connection form through a universal serial bus (USB) port, a connection form through a mobile communication network such as the 3G and 4G mobile communication networks, and a connection form through a short range wireless communication scheme such as near field communication (NFC), radio frequency identification (RFID), Wi-Fi, or the like.

The storage unit 420 serves to store various data and applications required for an operation of the user terminal device 400. In particular, the storage unit 420 may store a "driving information providing application" according to an exemplary embodiment of the present invention.

Here, the storage unit 420 may be implemented as a detachable type of storage element such as a USB memory, as well as an embedded type of storage element such as a random access memory (RAM), a flash memory, a read only memory (ROM), an erasable programmable ROM (EPROM), an electronically erasable and programmable ROM (EEPROM), a register, a hard disk, a removable disk, a memory card, or a universal subscriber identity module (USIM).

The input unit 430 serves to convert a physical input from the outside of the user terminal device 400 into a specific electrical signal. Here, the input unit 430 may include all or some of a user input unit and a microphone unit.

The user input unit may receive a user input such as a touch, a gesture, or a push operation. Here, the user input unit may be implemented in various types of buttons, a touch sensor receiving a touch input, and a proximity sensor receiving an approaching motion. In addition, the microphone unit may receive a voice of the user and a sound generated from the inside and the outside of the vehicle.

The output unit 440 is a component that outputs data of the user terminal device 400, and the output unit 440 may include a display unit 441 and an audio output unit 443.

The display unit 441 may output data visually recognizable by the user of the user terminal device 400. In particular, the display unit 441 may display a user interface according to execution of the "driving information providing application" according to an exemplary embodiment of the present invention.

Here, the display unit 441 may be implemented as a touch-sensitive surface (e.g., a touch screen display) to receive various touch inputs (gestures) of the user.

In addition, the user interface may include various user interfaces such as a "main user interface collectively displaying various types of information useful to user" and "driver driving information user interface". These various user interfaces will be described later with reference to the accompanying drawings.

Meanwhile, the audio output unit 443 may output data auditorily recognizable by the user of the user terminal device 400. Here, the audio output unit 443 may be implemented as a speaker that expresses data to be notified to the user of the user terminal device 400 as sound.

The controller 450 controls an overall operation of the user terminal device 400. Specifically, the controller 450 may control all or some of the communication unit 410, the storage unit 420, the input unit 430, and the output unit 440. In particular, if various data is received from the driving recording device 100 for a vehicle, the communication device 200 for a vehicle, and/or the driving information providing server 300 through the communication unit 410, the controller 450 may process the received data to generate a user interface, and control the display unit 441 to display the generated user interface.

The controller 450 may execute applications that provide advertisements, the Internet, games, videos, and the like. In various exemplary embodiments, the controller 450 may include one processor core (single core) or include a plurality of processor cores. For example, the controller 450 may include a multi-core such as a dual-core, a quad-core, and a hexa-core. According to exemplary embodiments, the controller 450 may further include a cache memory located internally or externally.

The controller 450 may receive commands of other components of the user terminal device 400, interpret the received commands, and perform calculation or process data according to the interpreted commands.

The controller 450 may process data or signals generated or occurring in an application. For example, the controller 450 may request instructions, data, or signals to the storage unit 420 to execute or control the application. The controller 450 may write (or store) or update the instructions, the data, or the signals in the storage unit 420 to execute or control the application.

The controller 450 may interpret and process messages, data, instructions, or signals received from the communication unit 410, the storage unit 420, the input unit 430, and the output unit 440. In addition, the controller 450 may generate new messages, data, instructions, or signals based on the received messages, data, instructions, or signals. The controller 450 may provide the processed or generated messages, data, instructions, or signals to the communication unit 410, the storage unit 420, the input unit 430, the output unit 440, and the like.

All or part of the controller 450 may be electrically or operably coupled with or connected to other components (e.g., the communication unit 410, the storage unit 420, the input unit 430, and the output unit 440) in the user terminal device 400.

According to exemplary embodiments, the controller 450 may include one or more processors. For example, the controller 450 may include an application processor (AP) for controlling a program of an upper layer such as an application program, a communication processor (CP) for performing a control for communication, or the like.

Meanwhile, the above-described input unit 430 may receive an instruction, interaction, or data from the user. The input unit 430 may sense a touch or hovering input of a finger and a pen. The input unit 430 may sense an input caused through a rotatable structure or a physical button. The input unit 430 may include sensors for sensing various types of inputs. The input received by the input unit 430 may have various types. For example, the input received by the input unit 430 may include a touch and release, a drag and drop, a long touch, a force touch, a physical depression, and the like.

In addition, the input received by the input unit 430 may include tapping, one or more swiping inputs (from left to right, from right to left, upward and/or downward), and a rolling input (from left to right, from right to left, upward and/or downward).

Various inputs of the user may be used to select at least one graphic displayed in a user interface (UI). For example, selection of one or more graphics may occur when the user stops contacting the one or more graphics.

As another implementation example, an unintended contact with the graphic may not select the graphic. For example, when a gesture corresponding to the selection is tapping, a swiping gesture passing over an application icon may not select a corresponding application.

Meanwhile, the input unit 430 may provide the received input and data related to the received input to the controller 450. In various exemplary embodiments, although not illustrated in FIG. 3, the input unit 430 may include a microphone (or transducer) capable of receiving a user's voice command. In various exemplary embodiments, although not illustrated in FIG. 3, the input unit 430 may include an image sensor or a camera capable of receiving a user's motion.

Meanwhile, the above-described display unit 441 may output content, data, or signals. In various exemplary embodiments, the display unit 441 may display an image signal processed by the controller 450. For example, the display unit 441 may display a capture or still image. As another example, the display unit 441 may display a video or a camera preview image. As another example, the display unit 441 may display a graphical user interface (GUI) so that the user may interact with the terminal device 400.

The display unit 441 may be configured with a liquid crystal display (LCD) or an organic light emitting diode (OLED).

According to exemplary embodiments, the display unit 441 may be configured with an integrated touch screen by being coupled with a sensor capable of receiving a touch input or the like.

In various exemplary embodiments, the controller 450 may map at least one function to the input unit 430 such that the input unit 430 has at least one function among a plurality of functions that the user terminal device 400 may provide to the user. For example, the at least one function may include at least one of an application execution function, a vehicle's last parking location display function, a parking location guide function, a my driving record notification function, a live view viewing function, which is a real-time capturing image viewing function of the black box 100, a power on/off control function of the black box 100, a power on/off function of the vehicle, a function related to weather, a driving time guide function, a fuel efficiency guide function, a vehicle's parking/driving mode guide function, a vehicle driving information guide function, an event occurrence guide function, a vehicle's current location inquiry function, a vehicle's parking location and parking time guide function, a parking history guide function, a driving history guide function, an image sharing function, an event history function, a remote playback function, and an image viewing function.

In various exemplary embodiments, the input unit 430 may receive the configuration information from the controller 450. The input unit 430 may display indications for indicating the functions based on the configuration information.

For example, referring to FIGS. 6A to 31 to be described later, the input unit 430 may display various indications as visual objects based on the configuration information received from the controller 450.

In various exemplary embodiments, the controller 450 may transmit the configuration information to the input unit 430 to indicate what the at least one function mapped to the input unit 430 is. The configuration information may include data for displaying, through the display unit 441, an indication for indicating which function of the plurality of functions is provided through the input unit 430. The configuration information may include data for indicating a function selected by the controller 450 among the plurality of functions.

FIG. 5 is a timing view illustrating a process of providing driver's driving information in a connected service providing system according to an exemplary embodiment of the present invention.

Referring to FIG. 5, a driving recording device 100 for a vehicle may generate event record data during an operation process and transmit the generated event record data to the driving information providing server 300 (S4101).

Also, the driving information providing server 300 may store driving record data including event record data received from the black box 100 in the storage unit 320 (S4102). Specifically, the driving information providing server 300 may generate driving record data for a plurality of drivers based on the received event record data and store the generated driving record data.

Meanwhile, the user terminal device 400 may transmit a driving record data request to the driving information providing server 300 (S4103). Specifically, the driving information providing server 300 may receive a driving record data request from a user terminal device connected to the driving information providing server 300.

In this case, the driving information providing server 300 searches the service subscription information storage unit 321 for subscriber identification information corresponding to the user terminal device 400 which has requested service provision (S4104). If there is searched subscriber identification information as a result of searching, the driving information providing server 300 may detect driving record data corresponding to the subscriber identification information from the driving record data storage unit 322 (S4105).

The driving information providing server 300 may transmit the detected driving record data to the user terminal device 400 (S4106).

The user terminal device 400 may configure a user interface based on the driving record data and display the user interface on the screen (S4107).

That is, the driving record data transmitted to the user terminal device 400 may be used to display information on a driver's driving-related event in the user terminal device. For example, the user terminal device 400 may display a driving route of the driver and an event icon indicating a location where the driving-related event occurs on the driving route on a map using the driving record data. As another example, the user terminal device 400 may output a captured image and/or a recorded sound related to the driving-related event using driving record data.

An example of the user interface of the user terminal device 400 will be described in more detail with reference to FIGS. 6A to 27.

Meanwhile, according to an exemplary embodiment of the present invention described above, the driving information providing server 300 may classify and store driving record data generated from the event record data received from each of a plurality of driving recording devices 100 according to identification information of the driving recording devices. Accordingly, when a request for providing driving record data is received from a terminal device of a user who has subscribed to the service, the server 300 may detect driving recording device identification information allocated to the corresponding user based on the identification information of the user terminal device which has requested the driving record data provision, detect driving record data allocated to the corresponding driving recording device based on the detected driving recording device identification information, and provide the detected driving record data to the user terminal device 400.

Hereinafter, an implementation example of providing driving information according to an exemplary embodiment of the present invention will be described in more detail with reference to the accompanying drawings.

Figure 6A:
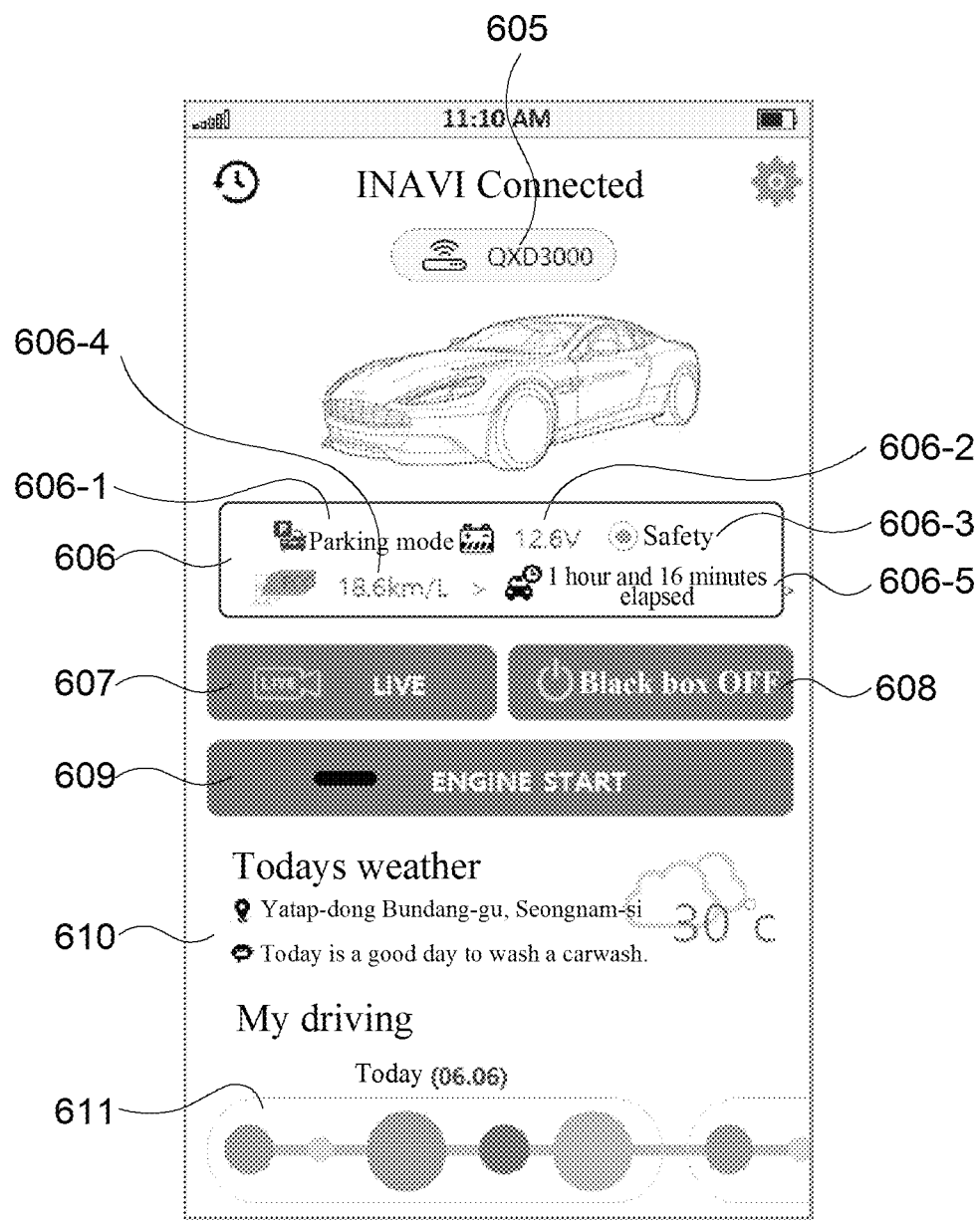
FIGS. 6A-6C are views illustrating a main user interface according to an exemplary embodiment of the present invention.
Figure 6B:
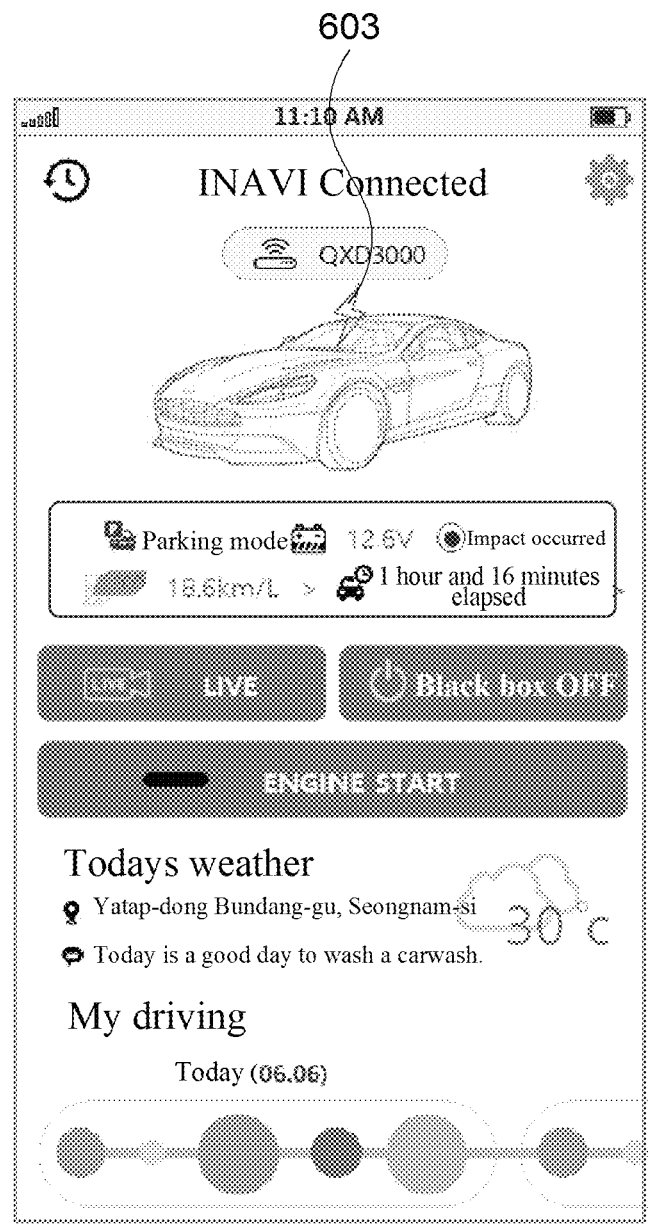
Figure 6C:
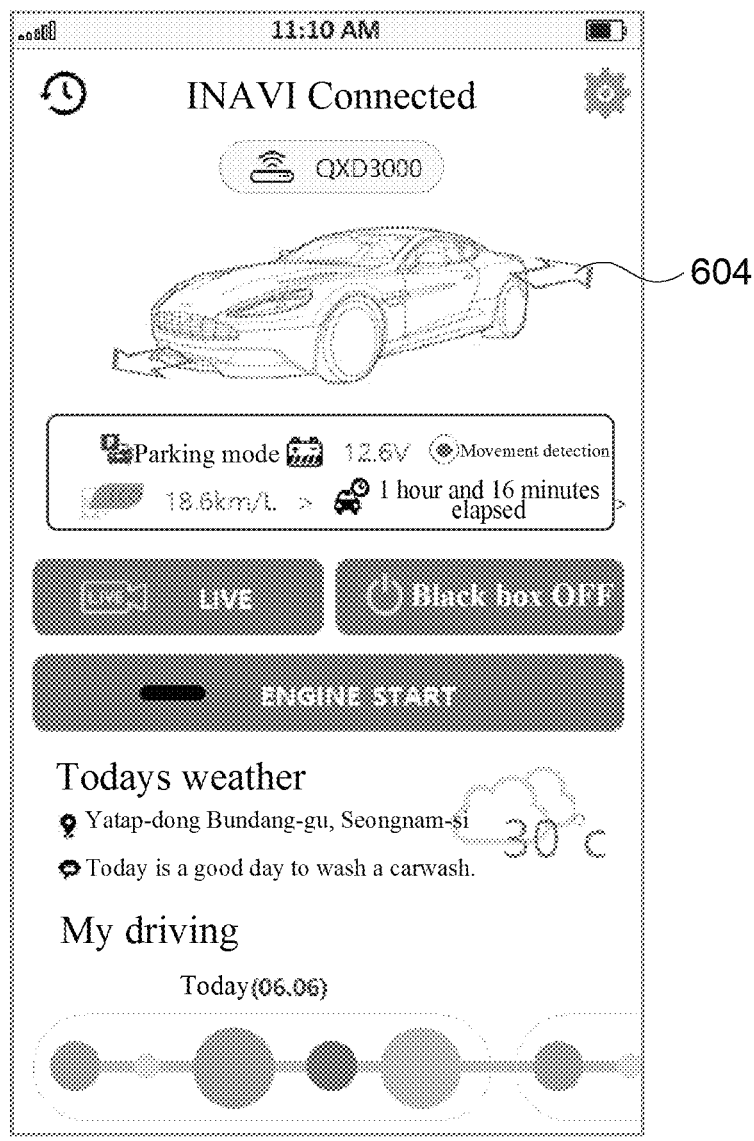

FIGS. 6A-6C are views illustrating a main user interface according to an exemplary embodiment of the present invention. Referring to FIG. 6A, the main user interface may display connection status information of the black box 100 connected to the driving information providing server 300, a vehicle image, and an event notification icon for the vehicle. Here, a screen of FIG. 6A may be displayed after authentication is completed through a registration procedure for the user of the black box 100 and the user terminal device 400.

Referring back to FIG. 6A, as an example, an operation mode of the black box 100 on a UX screen of an application provided to the user may be visually distinguished and displayed as a color of a border of a vehicle image object. For example, colors of the borders of the vehicle image objects in a case where the operation mode of the black box 100 is a parking mode and in a case where the operation mode of the black box 100 is a normal mode may be changed to be different so as to be displayed. As another example, a representative text indicating the operation modes of the black box 100 may be used to allow the user to visually recognize each operation mode. As another example, in the parking mode, the alphabet "P" may be displayed on the vehicle image, and in the normal mode, the alphabet "N" may be displayed.

As another example, the color of the border of the vehicle image object may represent a positive/negative state of the vehicle. For example, in various dangerous situations, such as when an impact occurs on a vehicle, a movement of the vehicle is detected, or a danger is detected among ADAS functions, the color of the border of the vehicle image object may be displayed in red. However, when the vehicle is parked or in a safe situation, the color of the border of the vehicle image object may be displayed in green.

As another example, when an impact event occurs during parking or driving of the vehicle, an application may display an impact notification icon 603 on a vehicle image as a visual object indicating the occurrence of the impact event regarding the vehicle as shown in FIG. 6B. In this case, the visual object may be transformed and displayed according to a size of the impact value received from the driving information providing server 300. For example, a size of the icon may be changed, different icons may be displayed, or a color of the icon may be changed and displayed. As another example, when an impact event occurs during parking or driving of a vehicle, the application may display the occurrence of the event in the form of generating vibration in the vehicle image. For example, according to the degree or frequency of the occurrence of the event, a magnitude of the vibration of the vehicle image may be adjusted and displayed. Here, as a method of displaying the vibration of the vehicle image, the vehicle image may be displayed to vibrate and move in a left-right or up-down direction or a vibration animation may be displayed.

As another example, when a vehicle movement is detected during parking of the vehicle, a visual object (e.g., an arrow icon 604) indicating a vehicle movement event may be displayed on the vehicle image as shown in FIG. 6C. Here, the arrow corresponding to a movement direction of the vehicle may be displayed based on the direction and/or the magnitude of the impact value received from the driving information providing server 300.

Meanwhile, a region 605 of the main user interface may display information (product name, etc.) of the black box 100 connected to the smartphone, and connection status information of the black box 100 as a visual object.

In addition, a region 606 of the main user interface is a region for displaying vehicle status information and may display current vehicle's mode (parking mode/driving mode) information, vehicle battery status information (e.g., a current voltage value of the vehicle battery and a distance to empty (DTE)), and auxiliary battery information (e.g., display a percentage of remaining battery capacity) when an auxiliary battery is mounted, as visual objects.

Specifically, a region 606-1 may display a current vehicle mode, for example, a normal mode and a parking mode.

In addition, a region 606-2 may display vehicle battery status information (e.g., current voltage value of the vehicle battery or DTE).

Further, a region 606-3 may display current state information of a black box and/or the vehicle. For example, the region 606 may display various information such as vehicle safety, vehicle impact occurrence, vehicle movement detection, necessity to check black box communication connection status, black box ultra-low power mode, black box communication module update, and the like as visual objects or in a text format.

Further, a region 606-4 may display driving mileage information and a corresponding icon. For example, when an average mileage of the vehicle is higher than a preset value, the region 606-4 may display the average mileage of the vehicle and an "ECO" icon. If the user selects the "ECO" icon, the user terminal device 400 may display a detailed mileage statistics screen.

Further, a region 606-5 may display elapsed parking time information and a corresponding icon. Here, the elapsed parking time may refer to a time difference from a time at which the vehicle is parked to a current time. If the user selects the elapsed parking time icon, the user terminal device 400 may display a user interface displaying the last parking location of the vehicle.

If there is no information on the last parking location of the vehicle, the user terminal device 400 may display location information set as default in the region 606.

Meanwhile, a region 607 is a live button. When the region 607 is selected, the user terminal device 400 may request the black box 100 to capture an image in real-time through the driving information providing server 300 and display a user interface for displaying the image captured by the black box 100 in real time received through the driving information providing server 300 according to the request.

In addition, a region 608 is a black box off button. When the region 608 is selected, the user terminal device 400 may generate a control signal to power off the black box 100 and transmit the generated control signal to the driving information providing server 300.

In addition, a region 609 is a start ON/OFF button of the vehicle. A start ON/OFF state of the vehicle may be displayed according to ON/OFF of an LED of the region 609. When the region 609 is selected, the user terminal device 400 may generate a control signal for the start ON/OFF of the vehicle and transmit the control signal to the driving information providing server 300.

In addition, a region 610 is a weather information display region and may display an address, a text related to weather and the vehicle, and a temperature and weather icon based on a location of the user terminal device 400. Here, the text related to the vehicle may refer to a useful text related to the vehicle based on a current weather, such as "Today is a good day to wash the car."

In addition, a region 611 is my driving information display region and may display driving information for a predetermined period (e.g., for the last 7 days). If there is a day on which no driving was performed for a predetermined period, my driving information display region 611 may display the remaining driving information excluding information on the corresponding date. My driving information displayed in the region 611 is displayed visually as a driving record of the vehicle, which may thus be referred to as driving history information and may be displayed as a visual object that may classify a large or small amount of accumulated driving distance by date (e.g., size of circle).

Here, the driving information displayed through the region 611 may include a driving-related event of the driver such as sudden deceleration, sudden acceleration, speeding, forward collision warning, and lane departure warning. In addition, the driving information displayed by date in the region 611 may display a visual object corresponding to the number of driving-related events that occur on the corresponding date. For example, as the number of driving-related events that occur is larger, a circle may be displayed to be larger, and as the number of driving-related events that occur is smaller, the circle may be displayed to be smaller.

The driving information may be displayed in order of sudden deceleration, sudden acceleration, speeding, forward collision warning, and lane departure warning, and respective circles of the region 611 may be icons representing sudden deceleration/sudden acceleration/speeding/forward collision warning/lane departure warning from left to right. Here, different colors may be mapped to each driving information in the region 611.

A date expression method in the region 611 may be provided in chronological order in one direction based on today N. For example, shifting in the rightward direction based on today N may provide data of yesterday N−1, two days ago N−2, three days ago N−3, four days ago N−4, five days ago N−5, and six days ago N−6.

If there is no driving information, a text such as "There is no driving record. Please start driving" may be provided in the region 611.

Meanwhile, when driving information on a specific date is selected, the user terminal device 100 may display a user interface that displays driving information on the selected date in detail.

Meanwhile, the number of events may be expressed in three sizes as a reference for providing a size of a circle according to a driving record in the region 611. For example, a first number (e.g., 5 times) or greater may be expressed in the largest circle, a second number (e.g., between 2 times and 4 times) may be expressed in the middle circle, and a third number (e.g., less than once) may be expressed by the smallest circle.

However, the circular display of driving information in the region 611 is merely an exemplary embodiment of the present invention and is not limited thereto. For example, the driving information may also be displayed through another polygon such as a square or a visual bubble such as a balloon. According to another exemplary embodiment of the present invention, it is possible to display the driving record information, while maintaining the reference (for example, a large bar/middle bar/small bar) through a non-circular bar type method.

Meanwhile, when the user touches the region 611 to select it, the user terminal device 400 may display a driving information user interface indicating in detail the user's driving information. This will be described later with reference to the drawings.

Figure 7A:
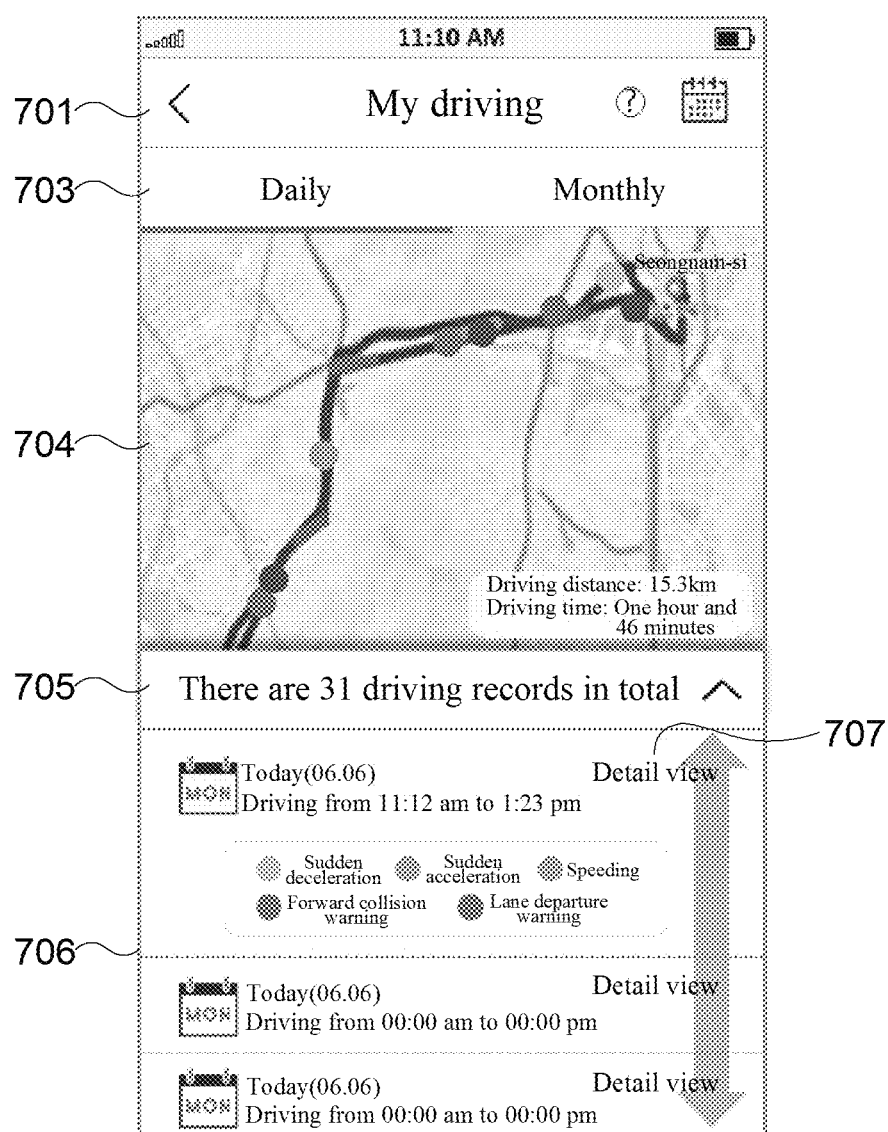
FIGS. 7A and 7B are views illustrating a driving information user interface according to an exemplary embodiment of the present invention.
Figure 7B:
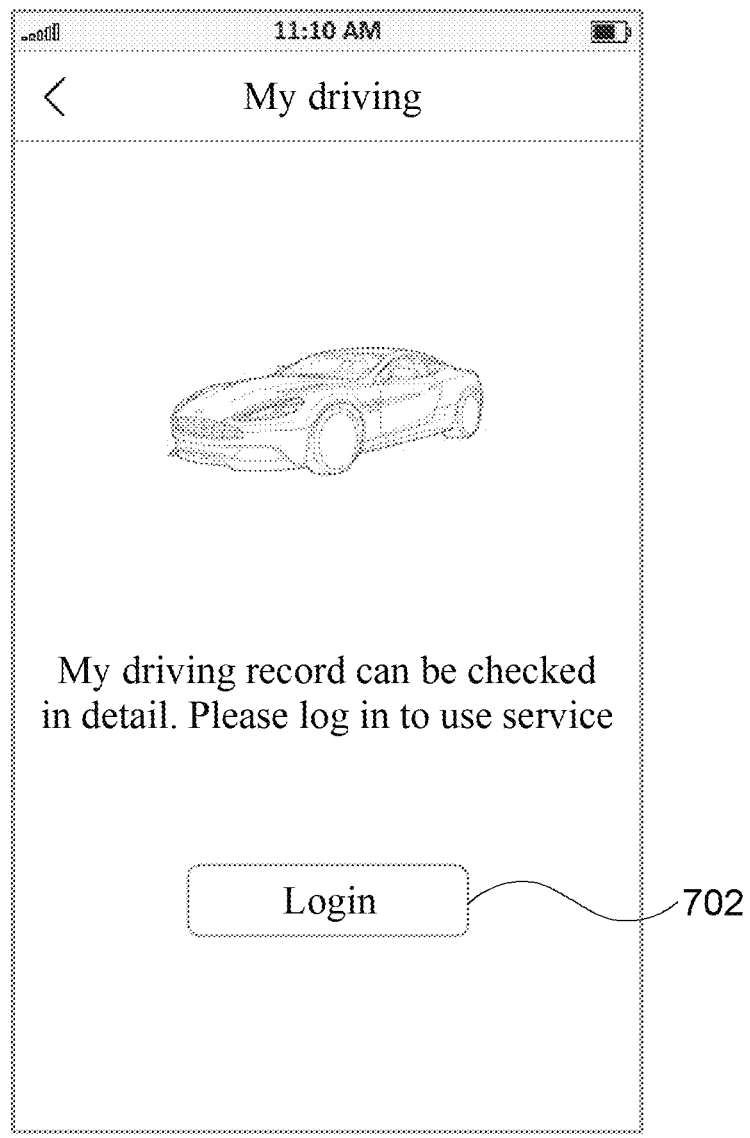

FIGS. 7A and 7B are views illustrating a driving information user interface according to an exemplary embodiment of the present invention. When the user selects the region 611 of the main user interface illustrated in FIGS. 6A-6C, the user terminal device 400 may display the driving information user interface illustrated in FIG. 7A.

Here, various information related to the driver's driving may be displayed in the driving information user interface, and if a region 701 is selected, the user terminal device 400 may display the main user interface as shown in FIGS. 6A-6C again.

Here, the driving user interface illustrated in FIG. 7A may be displayed based on the driving record data received from the driving information providing server 300.

In the region 703, a tab for providing driving records classified by day and month may be displayed, and a corresponding driving record list 706 may be displayed according to a user's selection of a daily tab or a monthly tab.

Further, driving information corresponding to a driving record selected from among a plurality of driving records in the driving record list (e.g., a driving route and a driving-related event occurrence location) may be displayed on the map 704. In this case, the user terminal device 400 may adjust the scale of the map so that all driving routes corresponding to the selected driving record are displayed on the map.

A case in which the daily tab is selected by the user will be described with reference to FIGS. 7A to 12D, and a case in which the monthly tab is selected by the user will be described with reference to FIGS. 13A to 15D.

The region 706 is a region for displaying a daily driving record list, and the driving record list may include items corresponding to a plurality of driving records of a corresponding date. Further, driving time information (driving start time, driving end time, and date) corresponding to the items may be displayed in each item of the driving record list. Further, although not shown in FIGS. 7A and 7B, driving distance information corresponding to each item may be displayed in the items of the driving record list.

When the driving information user interface is entered for the first time, a driving record located at the top of the driving record list may be selected by default and a driving route corresponding to the selected driving record and a driving-related event occurrence location may be displayed on the map 704.

That is, the user terminal device 400 may display a driving route of the driver on the map 704 using the driving record data received from the driving information providing server 300 and display the driving-related event occurrence location in the driving route.

Here, an event icon representing a driving-related event on the driving route may be displayed in colors or shapes distinguished from each other according to types of events such as sudden deceleration, sudden acceleration, speeding, sudden stop, sudden start, blind spot collision warning, forward collision warning, lane departure warning, and the like. Also, a driving distance and a driving time may be displayed together on one side of the map 704.

In addition, the map 704 may receive various touch interactions such as drag/zoom-in/zoom-out/rotation and may be displayed in response to a received touch interaction. For example, when the user selects two points on the map 704 and inputs a pinch-to-zoom-in operation by moving two fingers together inward, the user terminal device 400 may reduce and display a map illustrating a movement route.

In addition, the number of driving records included in the daily driving record list 706 may be displayed in a region 705. For example, if there are 31 driving records on a corresponding date, a text such as "There are 31 driving records in total" may be displayed in the region 705. In addition, the driving record list 706 may be enlarged or reduced by dragging the region 705, which will be described later with reference to FIGS. 9A and 9B.

Meanwhile, in the driving record displayed in the driving record list 706, a date such as year/month/day, driving start time, and driving end time may be displayed, and information that enables identification of a type of an event icon of a driving-related event may be displayed in the driving record selected from the driving record list 706.

For example, event icon information corresponding to "sudden deceleration", event icon information corresponding to "sudden acceleration", event icon information corresponding to "speeding", event icon information corresponding to "forward collision warning", and event icon information corresponding to "lane departure warning" may be displayed.

Here, the driving record selected from the driving record list 706 may be displayed to be distinguished from a non-selected driving record by color, size, and the like.

Meanwhile, in the driving record list 706, each driving record may be classified and displayed on a time basis. For example, the most recent driving record of a corresponding date may be displayed at the top, and the driving record before the date may be displayed in a direction toward the bottom. Here, the reference for the latest may be determined based on a point in time at which vehicle driving was terminated.

In addition, a region 707 is a detail view button. When the region 707 is selected, the user terminal device 400 may display detailed information of a corresponding driving record. This will be described later with reference to FIGS. 12A-12D.

In addition, the driving record list 706 may be scrolled up and down according to the user's vertical drag touch input, which will be described later with reference to FIGS. 8A-8D.

Meanwhile, when the region 611 of the main user interface shown in FIG. 6A is selected in a state in which login is not performed, a login request user interface as shown in FIG. 7B may be displayed. If the user selects a login region 702, the user terminal device 400 may display a user interface for logging in, and after logging in is completed, the user interface as shown in FIG. 7B is not displayed and a driving information user interface as shown in FIG. 7A may be displayed.

As described above, the driving information user interface according to the present invention may be configured to display the map and the driving record list on one screen, and driving information including driving-related event information of the user may be displayed through each of the map and the driving record list. Here, the driving-related event may be visually classified according to types of events and displayed on the driving route.

According to the present invention, since the driving-related event occurrence record due to careless driving by a vehicle driver may be easily recognized and searched anytime and anywhere, the convenience of the user who wants to check the driving record may be increased.

Figure 8A:
FIGS. 8A-8D are views of a driving information user interface illustrating a process of scrolling a driving record list according to an exemplary embodiment of the present invention.
Figure 8B:
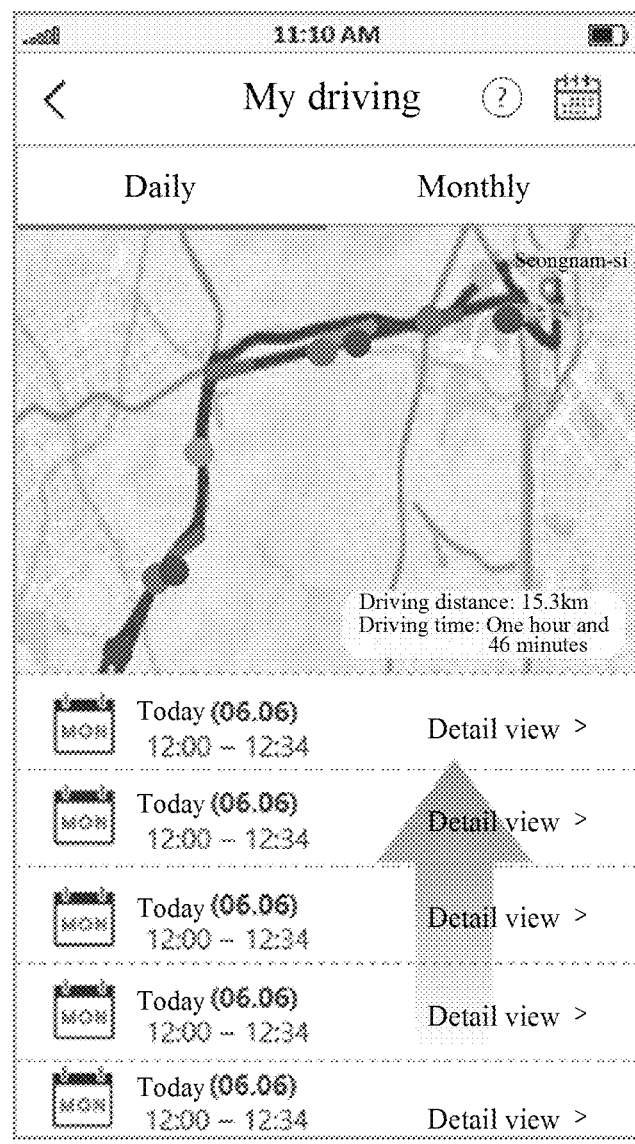

FIGS. 8A-8D are views of a user interface illustrating a process of scrolling a driving record list according to an exemplary embodiment of the present invention. When the user touches a region of the driving record list and drags upward as shown in FIG. 8A, the user terminal device 400 may cause the driving record list to be scrolled upward as shown in FIG. 8B.

Figure 8C:
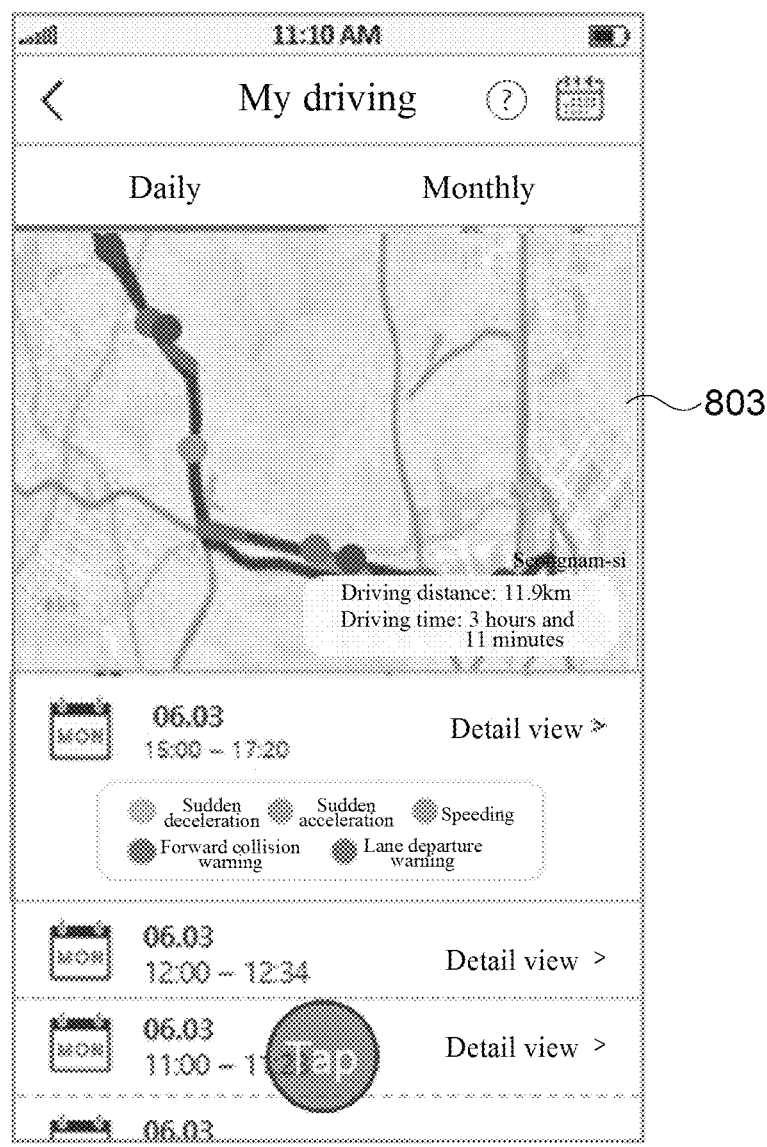

In addition, when the scroll movement of the driving record list stops, the user terminal device 400 may automatically select a driving record located at the top of the driving record list as shown in FIG. 8C. In this case, information that enables identification of a type of an event icon of a driving-related event may be additionally displayed in the driving record located at the top selected from the driving record list. In addition, a driving route corresponding to the selected driving record and a driving-related event occurrence location may be displayed on a map 803.

Figure 8D:
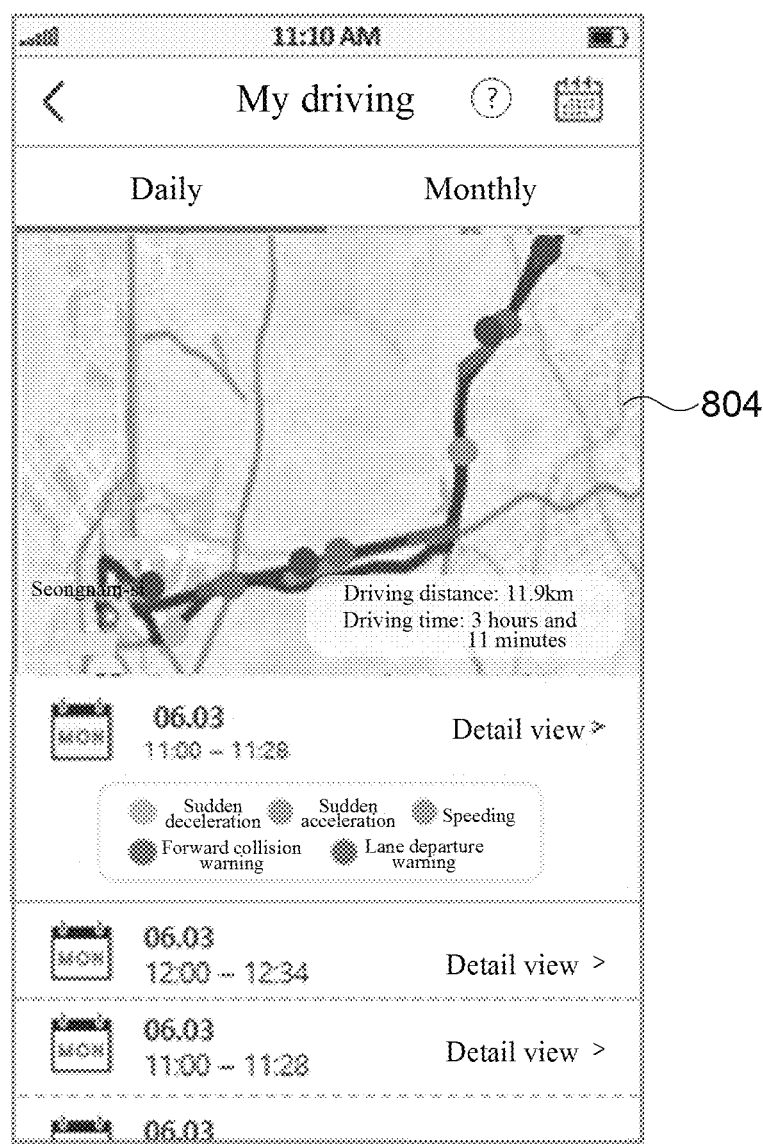

Meanwhile, when the user selects one item (driving record) from the driving record list displayed in FIG. 8C, the user terminal device 400 displays the driving record selected by the user to be placed at the top of the driving record list as shown in FIG. 8D and displays a driving route corresponding to the selected driving record and a driving-related event occurrence location on the map 804.

Figure 9A:
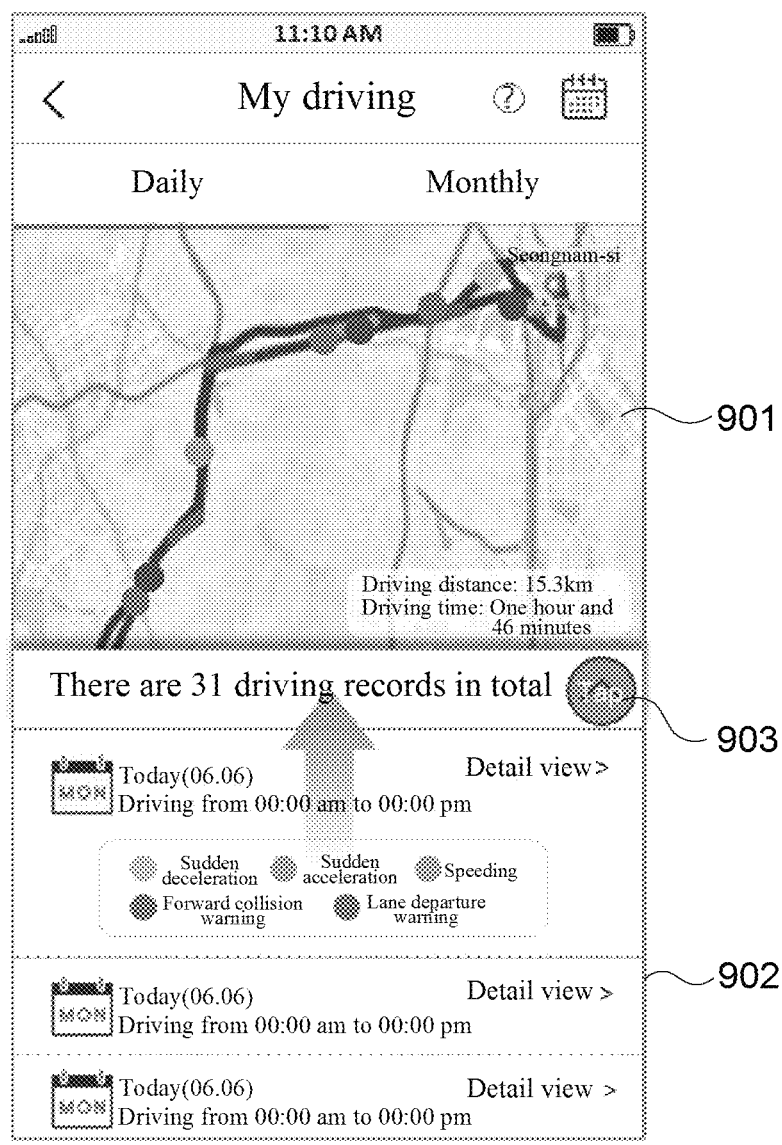
FIGS. 9A and 9B are views of a user interface illustrating a process of switching a driving record list into a portion and the entirety of a screen according to an exemplary embodiment of the present invention.
Figure 9B:
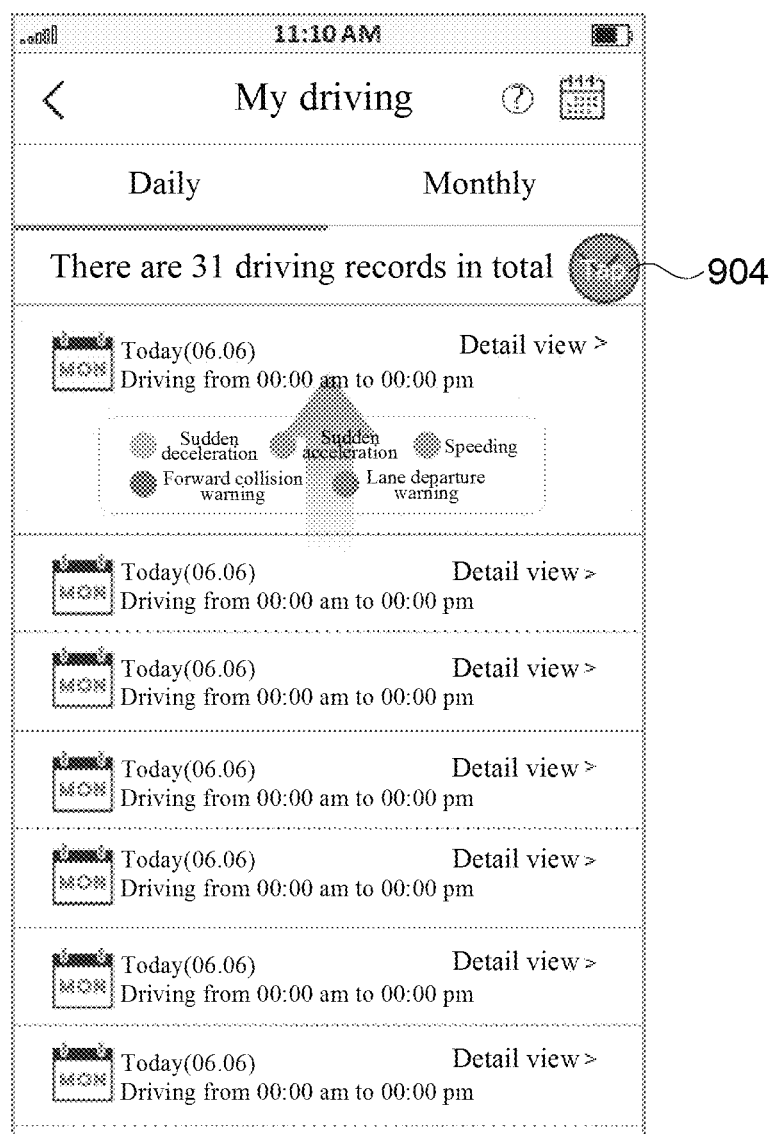

FIGS. 9A and 9B are views of a user interface illustrating a process of switching a driving record list into a portion and the entirety of a screen according to an exemplary embodiment of the present invention. When the user touches or drags a region 903 of FIG. 9A upward, the user terminal device 400 may expand the driving record list 902 over the map 901 as shown in FIG. 9B to display the driving record list on the entire screen. Here, the user may scroll the driving record list by touching a region of the driving record list.

Meanwhile, as shown in FIG. 9B, when the user touches or drags the region 904 downward, the user terminal device 400 may reduce a size of the driving record list as shown in FIG. 9A and display the map 901 and the driving record list 902 together on one screen.

Figure 10A:
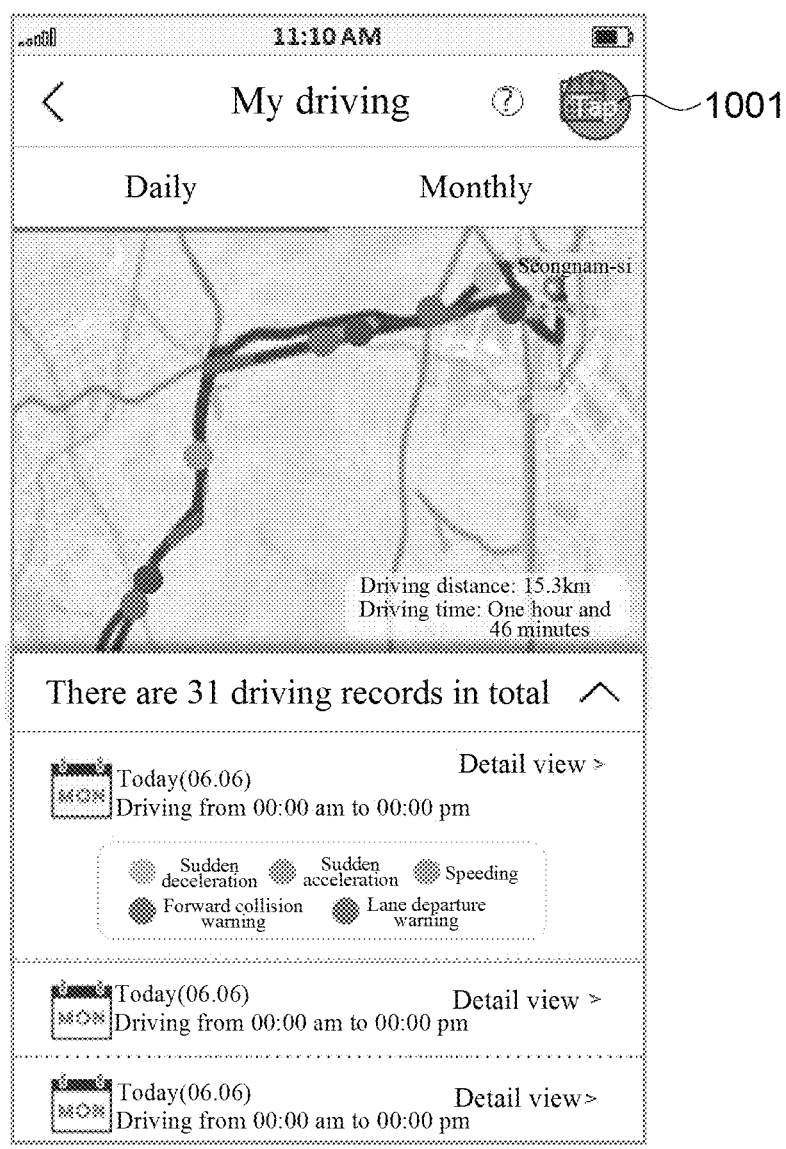
Figure 10B:
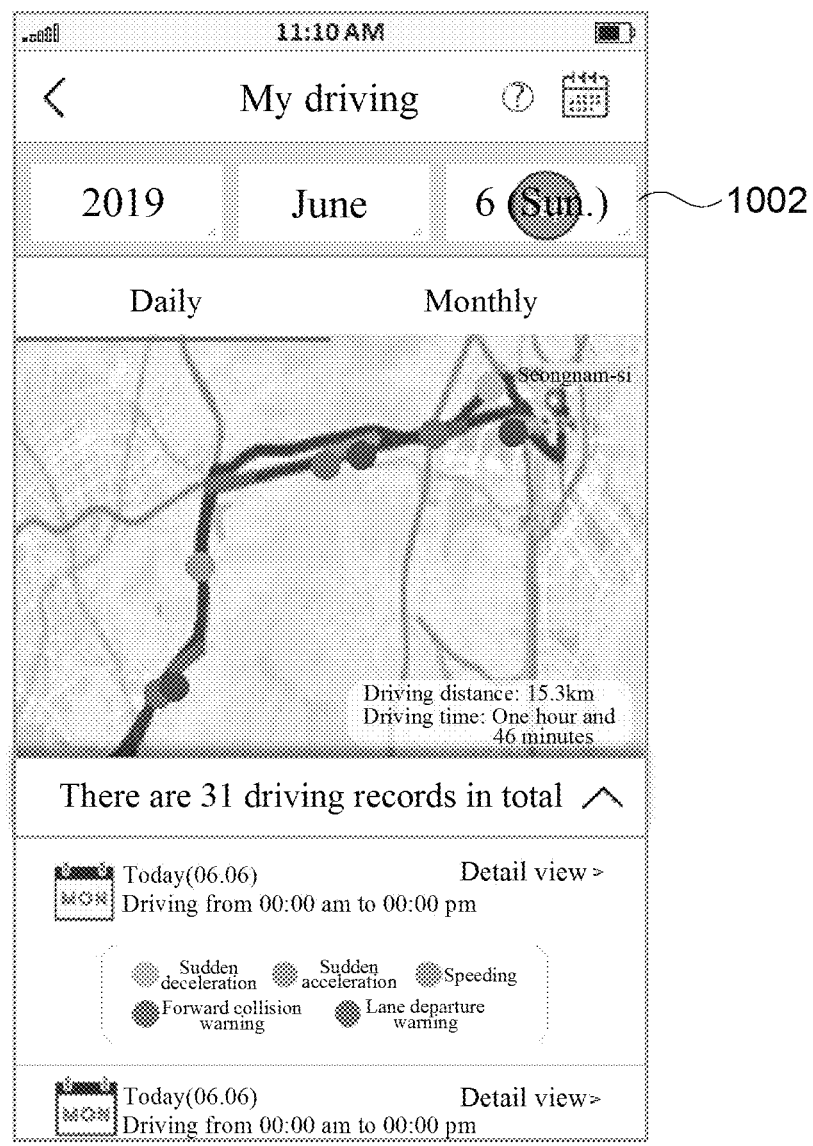
Figure 10C:
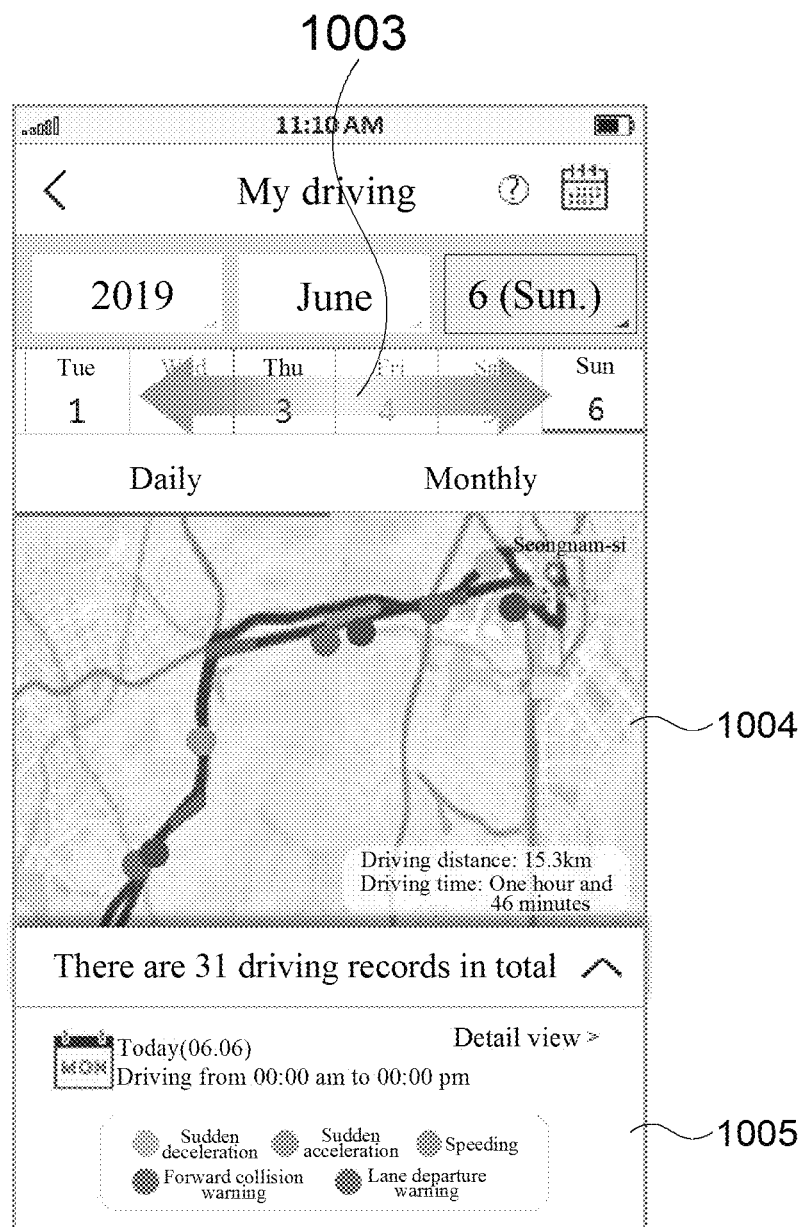

FIGS. 10A-10D are views of a driving information user interface illustrating a date change process according to an exemplary embodiment of the present invention. Referring to FIG. 10A, when a user selects a region 1001, the user terminal device 400 may display a region 1002 in which the year/month/day may be changed as shown in FIG. 10B. In addition, when the user selects a desired date in the region 1002, the user terminal device 400 may display adjacent dates based on the selected date in the region 1003 as shown in FIG. 100.

If the user selects a specific date in the region 1003, a driving record list corresponding to the user selected date may be displayed in the driving record list 1005.

Here, display of the map 1004 and the driving record list 1005 may be maintained unchanged until the user of the user terminal device 400 selects a different month and selects a day of the month.

In addition, in the region 1003, adjacent dates are displayed based on the date selected by the user, and dates may be displayed in a different color depending on whether there is a driving record on the corresponding date or may be displayed with a text such as "with record" and "without record".

In addition, in the region 1003, a button may be activated only on a date with a driving record, and a button may be deactivated and displayed on a date without a driving record.

In addition, when a user's left and right drag touch is input to the region 1003, the user terminal device 400 may change and display a date in the region 1003 so as to correspond to the corresponding left and right drag touch.

In addition, when the user selects a date using the region 1002 or the region 1003 but there is no driving record on the specific date, the user terminal device 400 may provide a pop-up indicating a date on which there is a driving record. For example, when the user selects a specific date using the region 1002 or 1003 but there is no driving information recorded on the specific date, the user terminal device 400 may display a pop-up window such as "There is no driving record on the selected date. Do you would you like to see a record of adjacent 0 month 0 date instead?" as shown in FIG. 10D.

Figure 11A:
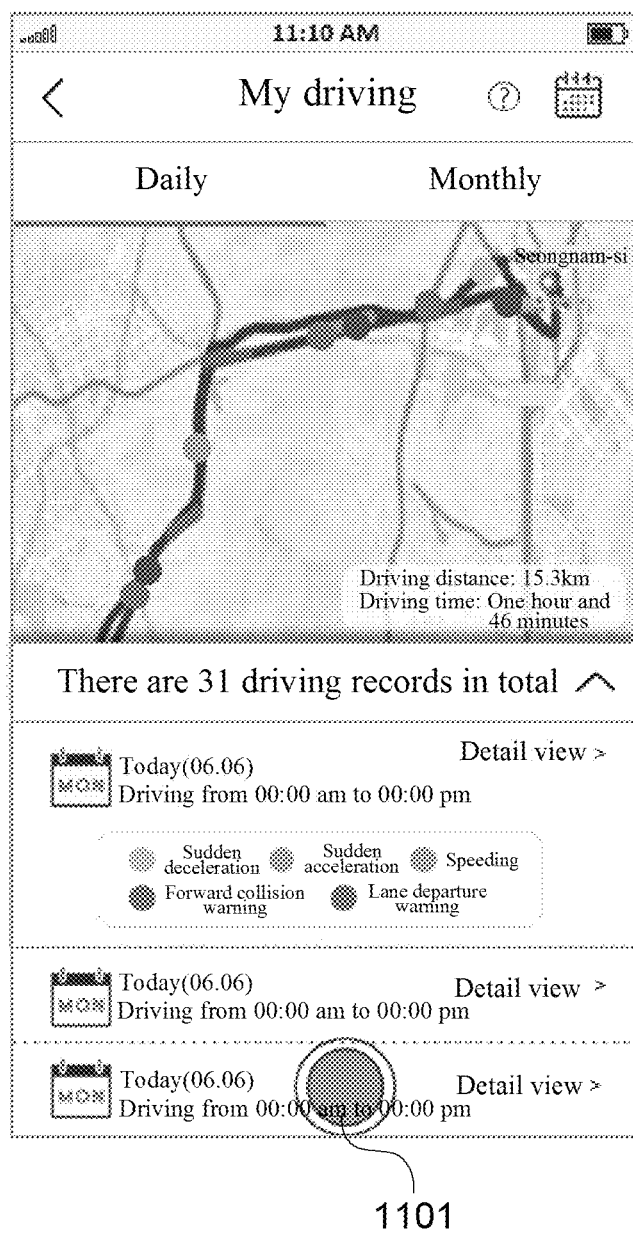
FIGS. 11A-11D are views of a driving information user interface illustrating a daily driving record editing process according to an exemplary embodiment of the present invention.
Figure 11B:
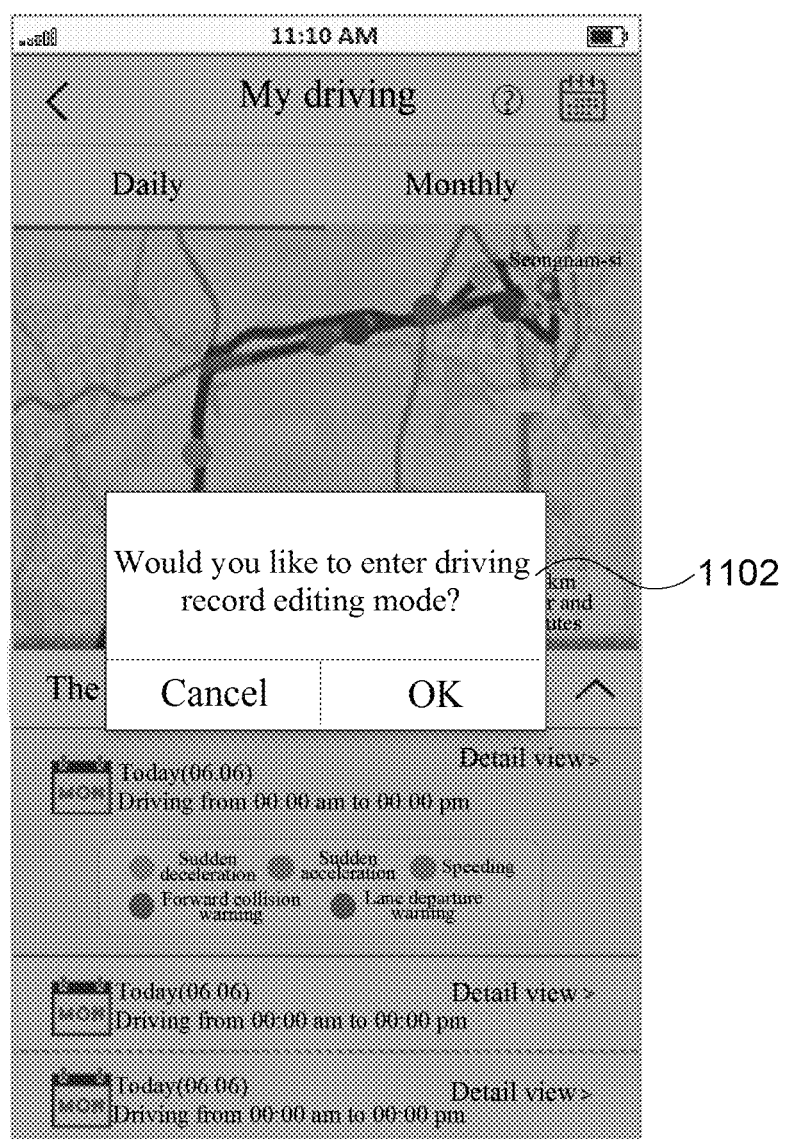

FIGS. 11A-11D are views of a driving information user interface illustrating a daily driving record editing process according to an exemplary embodiment of the present invention. Referring to FIG. 11A, when the user touches an item 1101 of the driving record list and then inputs a press & hold command to hold the touch for a certain period of time, the user terminal device 400 may display a pop-up window 1102 for confirming whether to enter a driving record editing mode as shown in FIG. 11B.

Figure 11C:
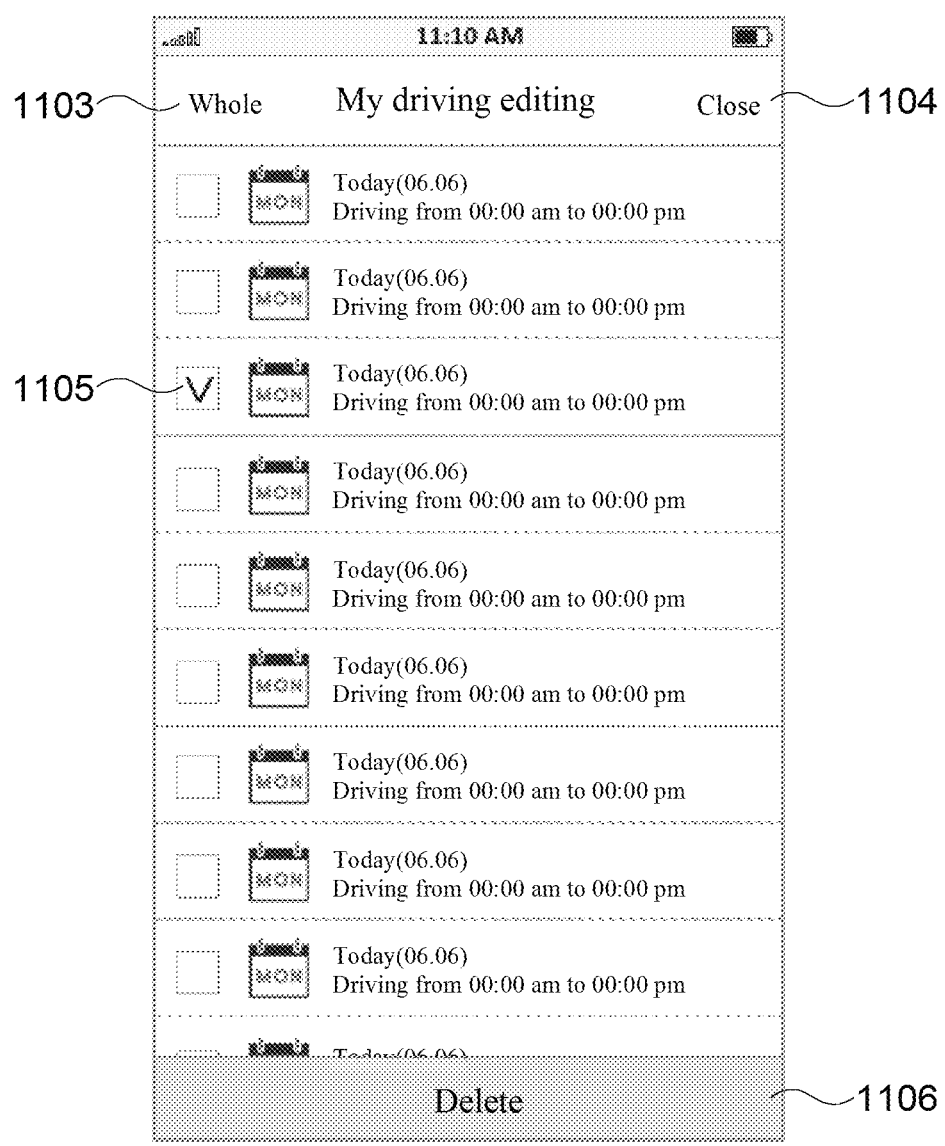

If the user selects "OK" in the pop-up window 1602, the user terminal device 400 may enter the driving record editing mode and display a driving information user interface for editing the driving record as shown in FIG. 11C.

If the user selects a total button 1103 in the driving information user interface of FIG. 11C, check boxes of all the driving record lists are selected, and with all the lists selected, when the total button 1103 is selected again, the check boxes of all the lists may be deselected.

In addition, when the user selects a check box in the driving information user interface of FIG. 11C, a corresponding check box 1105 is checked and a delete button 1106 at the bottom may be activated. Also, if there is no checked check box, the delete button 1106 may be deactivated.

Figure 11D:
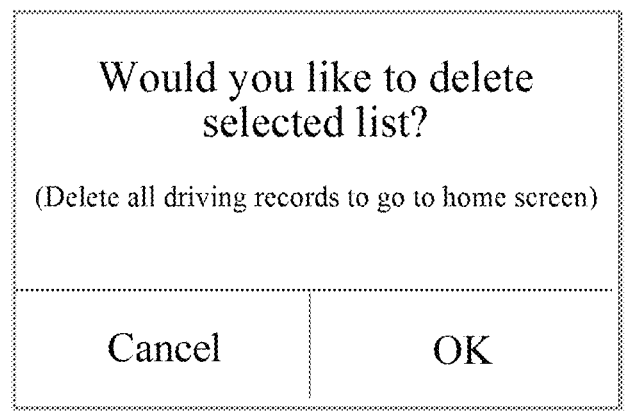

In addition, when the user selects the delete button 1106, the user terminal device 400 may display a pop-up window for confirming whether to delete as shown in FIG. 11D. Also, when the user selects a cancel button in the pop-up window indicating whether to delete, the pop-up window may be closed and the selected check boxes may be maintained.

In addition, when the user selects an OK button in the pop-up window indicating whether to delete with some of the driving record list selected, a text such as "deleted" may be exposed (displayed).

In addition, when the user selects the OK button in the pop-up window indicating whether to delete with all the driving records lists selected, a text such as "All my driving records are deleted" is exposed, and the main user interface or driving information user interface may be displayed.

Meanwhile, when the daily driving record is deleted, the region 1101 of the main user interface may also be displayed by reflecting the deleted record.

Meanwhile, when the user selects a close button 1104, the user terminal device 400 may display a previous driving information user interface as shown in FIG. 11A.

Figure 12A:
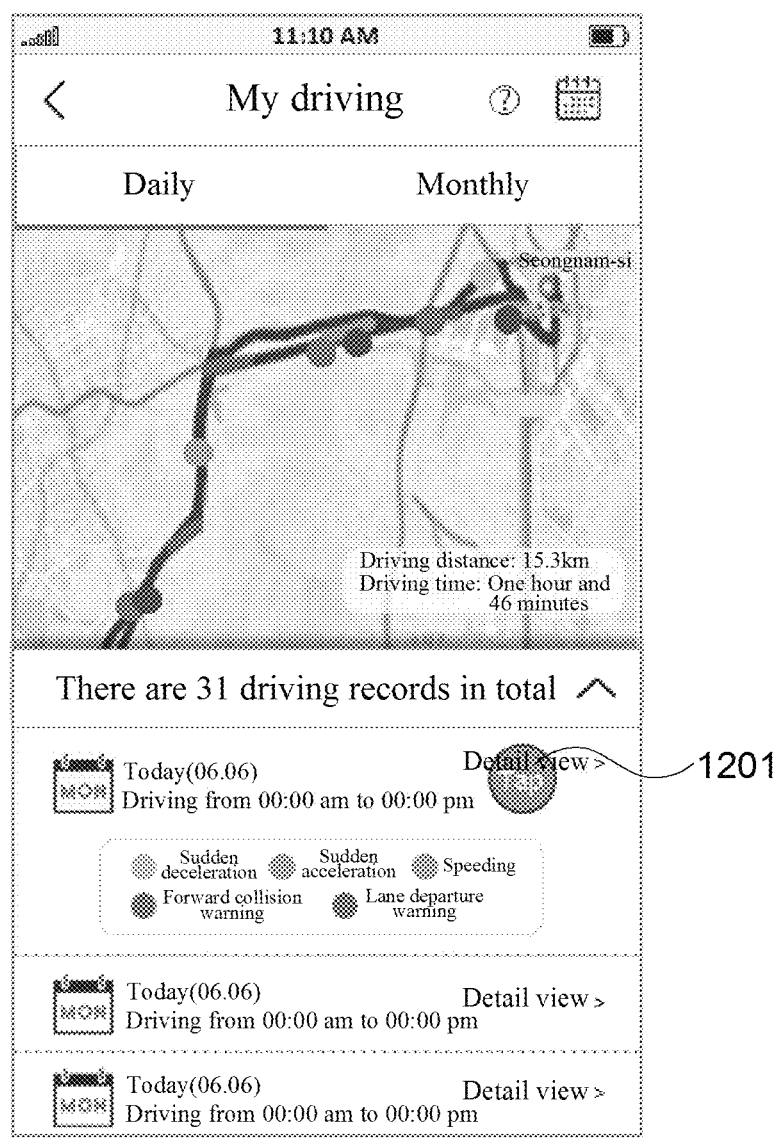
FIGS. 12A-12D are views of a driving information user interface illustrating detailed information on a driving-related event according to an exemplary embodiment of the present invention.
Figure 12B:
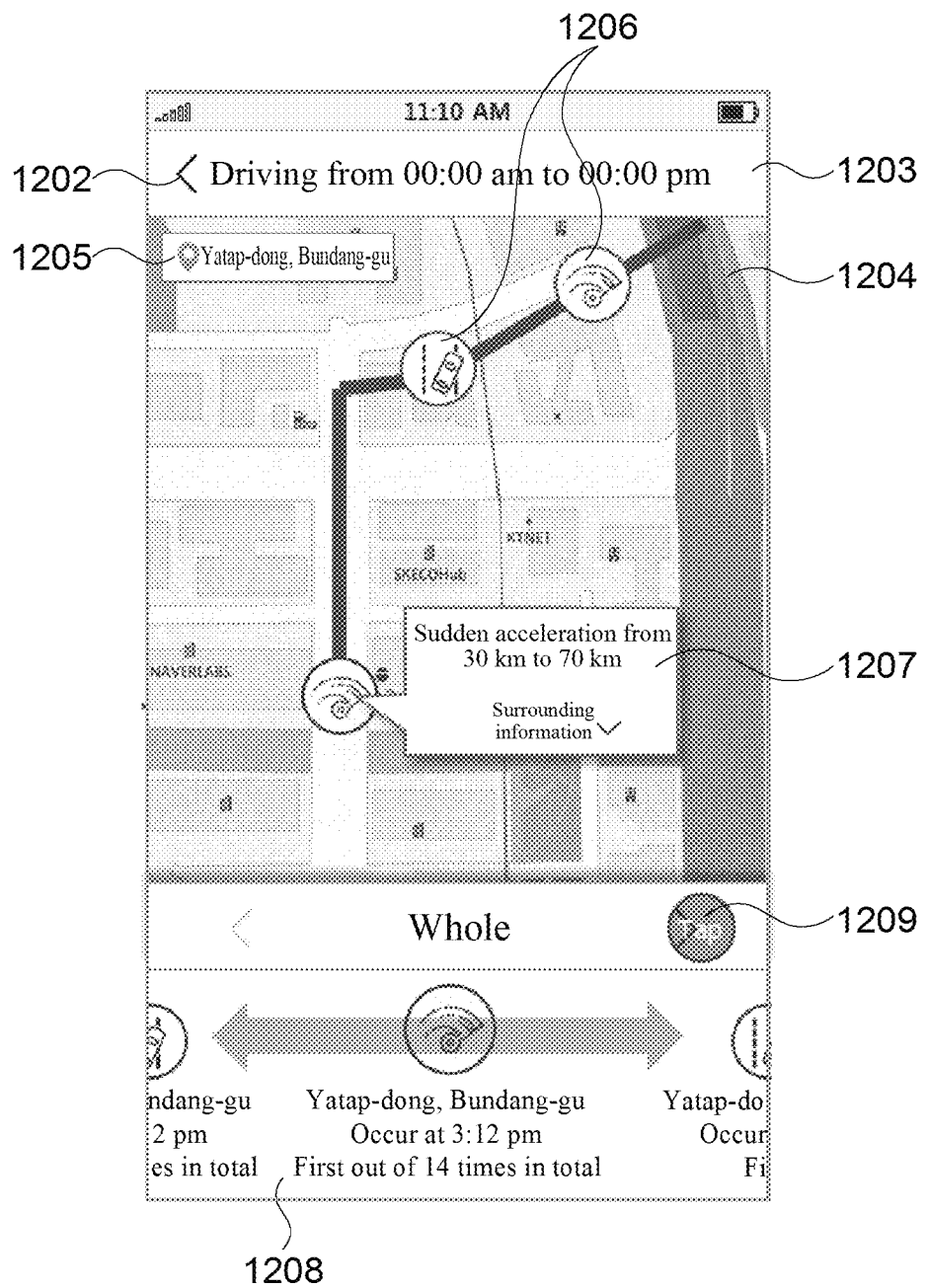

FIGS. 12A-12D are views of a driving information user interface illustrating detailed information on a driving-related event according to an exemplary embodiment of the present invention. When the user selects a detail view button 1201 of the driving record list as shown in FIG. 12A, the user terminal device 400 may display a detailed driving information user interface indicating detailed information of the corresponding driving record as shown in FIG. 12B.

Specifically, the user terminal device 400 may switch the map displaying the driving route corresponding to the selected driving record on one screen as shown in FIG. 12A to display a map in which one point of the driving record in which the detail view button 1201 is selected is magnified and displayed as shown in FIG. 12B. That is, the user terminal device 400 may detect a point of the driving record in which the detail view button 1201 is selected, and display a driving route and a driving-related event occurrence location based on the detected point. In this case, the detailed driving information user interface may display only a part of the driving route on the map by adjusting the scale of the map.

Here, a departure point or an end point of the driving record in which the detail view button 1201 of the driving record is selected, or a point of the most dangerous careless event may be automatically selected as the point. In addition, driving time information of the corresponding driving record may be displayed in a region 1203.

In addition, on a map 1204, a driving route of the driver corresponding to the driving record and an occurrence location of a driving-related event may be displayed. Here, an event icon 1206 corresponding to a type of the driving-related event may be displayed on the map 1204 of the detailed driving information user interface. Here, a touch interaction on the map may be the same as that described above in FIGS. 7A and 7B.

In addition, when the user selects one of the icons corresponding to the driving-related event, information on a reason for the occurrence of the driving-related event corresponding to the selected icon may be displayed as a pop-up window 1207.

For example, when the driving-related event is "sudden acceleration", a text "sudden acceleration from 30 Km to 70 Km" may be displayed on a pop-up window 1207 as the event occurrence reason information. Here, the pop-up of the previously selected icon may disappear. Also, when the user selects the icon on which the pop-up is displayed again, the pop-up may disappear again.

Meanwhile, according to an example, when the user selects one of the event icons corresponding to the driving-related event, the user terminal device 400 may display a map and a driving route so that the selected icon becomes the center of the map. That is, the user terminal device 400 may display the map based on the selected event icon by expanding the scale of the map.

When the user selects one of icons corresponding to the driving-related event, a driving-related event list 1208 including event detailed information corresponding to the selected icon and event detailed information corresponding to an event that occurs before and/or after the selected event icon may be displayed.

Figure 12C:
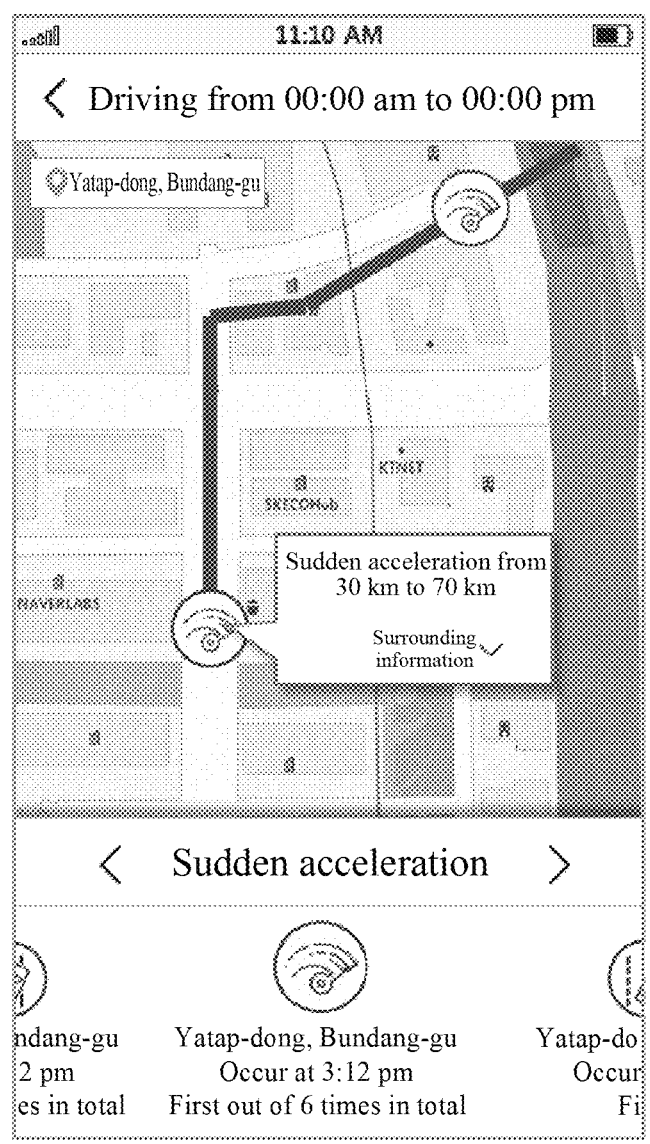
Figure 12D:
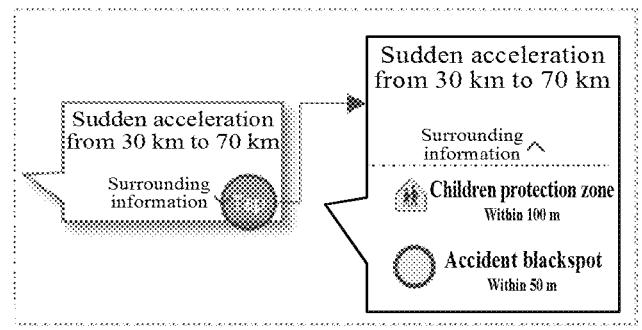

In addition, when the user selects surrounding information displayed in the pop-up 1207, the user terminal device 400 may expand the pop-up as shown in FIG. 12D to display surrounding information such as a children protection zone or an accident blackspot of the corresponding location. Here, the surrounding information may be information based on a traffic safety sign and may include location information such as a caution sign, a regulatory sign, an instruction sign, an auxiliary sign, a road surface sign, and the like.

In addition, location information of a currently displayed map may be displayed in the region 1205, and the corresponding lo cation information may be changed and displayed according to a touch interaction input to the map. Here, the location information may be displayed based on the center of the screen.

In addition, in the driving-related event list 1208, driving-related events included in the driving record may be sequentially displayed. Here, the order may be order of occurrence time of driving-related events, and the driving-related events may be distinguished from each other and displayed as icons corresponding to types of the driving-related events in the region 1208.

In addition, in the driving-related event list 1208, a location where a driving-related event occurs, occurrence time, occurrence number information, occurrence order information, and the like may be displayed. Here, the occurrence number information and the occurrence order information may be classified for each driving-related event. For example, in a case where a sudden acceleration occurs 14 times in the corresponding driving record and the corresponding event is a first sudden acceleration, the user terminal device 400 may display occurrence number information and occurrence order information, such as "1st out of 14 times".

In addition, in the driving-related event list 1208, a driving-related event may also be moved and selected in a direction corresponding to a swipe input according to the user's swipe input. In addition, a map and a driving route may be displayed in the region 1204 to correspond to the selected driving-related event. That is, the map 1204 may display a location of the selected driving-related event, and the driving route may be displayed based on the location of the driving-related event.

In addition, the user may select a type of the driving-related event by selecting a region 1209. For example, as shown in FIG. 12B, "entire driving-related events" may be selected, and as shown in FIG. 12C, only "sudden acceleration" may be selected. In this case, the user terminal device 400 may display a driving route on the map 1204 and may display only a sudden acceleration event among driving-related events on the driving route.

If there is no record on the type of driving information selecting the region 1209, the user terminal device 400 may display a text such as "There is no such record."

Meanwhile, FIG. 12B illustrates a case where when the driving-related event icon 1206 is selected, specific information of the driving-related event corresponding to the selected icon is displayed as a pop-up window. According to the present invention, the user terminal device 400 may display an image of an event corresponding to the selected event driving-related event as a pop-up window. Here, the image may be a motion image generated by combining at least two images instead of one image, or may be an image configured by only one image.

In addition, according to the present invention, the user terminal device 400 may output a recorded sound corresponding to the selected event driving-related event. Here, the recorded sound may include an image captured during a period from before a predetermined time to after a predetermined time based on the occurrence of a driving-related event.

Figure 13A:
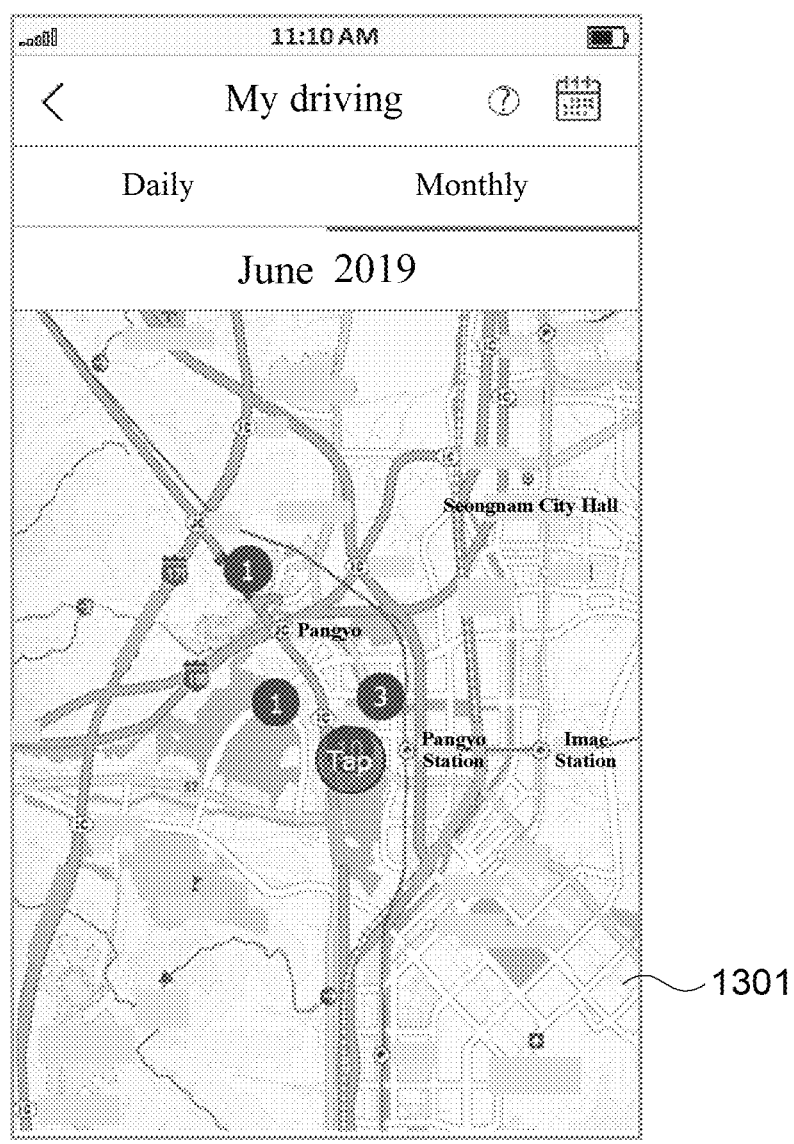
FIGS. 13A-13C are views illustrating a monthly driving information user interface according to an exemplary embodiment of the present invention.

FIGS. 13A-13O are views illustrating a monthly driving information user interface according to an exemplary embodiment of the present invention. When the user selects monthly in the driving information user interface, the user terminal device 400 may display a map 1301 as shown in FIG. 13A and group the numbers of driving records of the latest month according to the proximity of locations and display the grouped numbers.

In addition, the user terminal device 400 may display the number of driving records on the map by differently grouping the driving records according to the scale of the map. Here, the number of driving records displayed on the map may be determined according to the accumulated number of parking (start ON/OFF number) of the vehicle.

Also, the number of driving records displayed on the map may vary according to the scale of the map. Here, a basic scale of the map may be determined as a scale in which all driving records of a corresponding month may be displayed on one screen, and a touch interaction on the map may be applied in the same manner in FIGS. 7A and 7B.

Figure 13B:
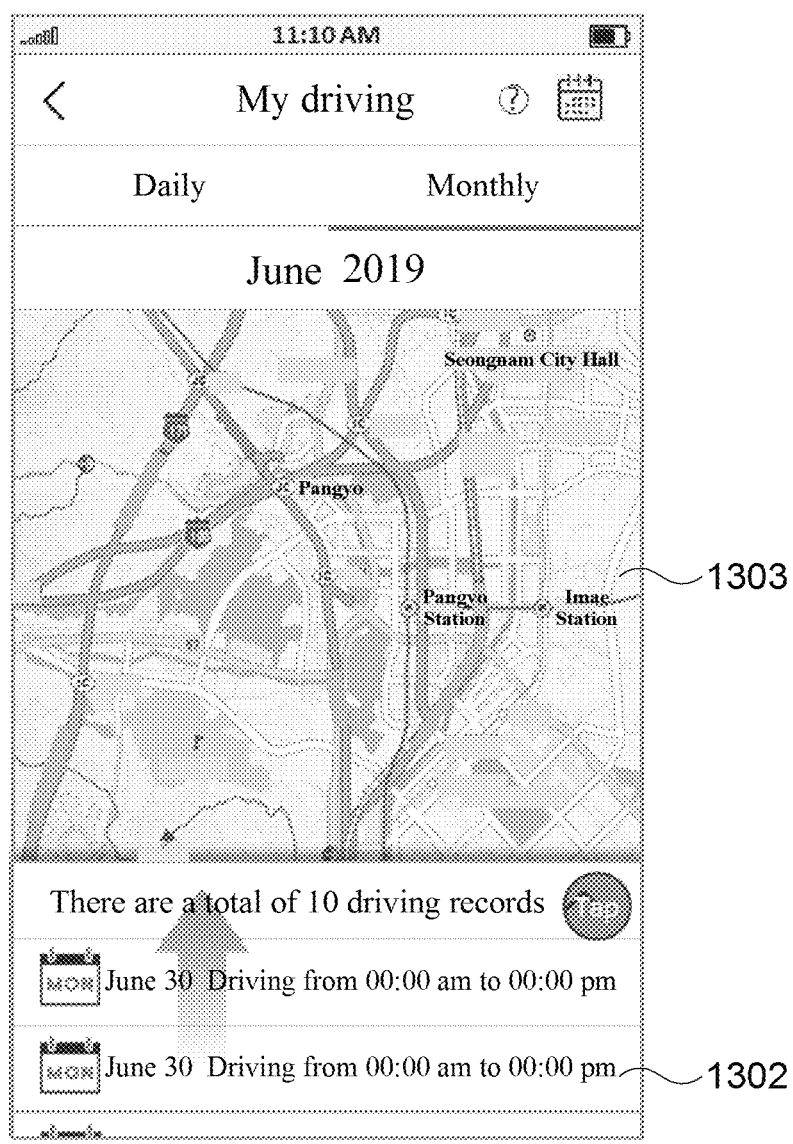
Figure 13C:
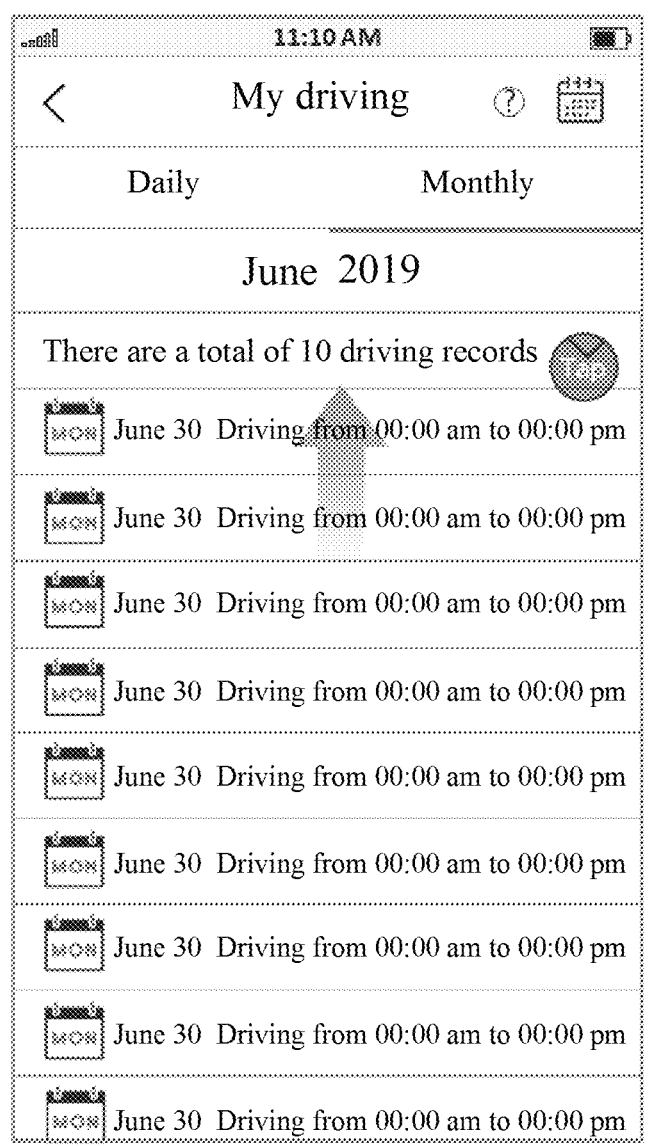

In addition, when the user selects one of the numbers of driving records displayed on the map, the user terminal device 400 may display a list of driving records corresponding to the group selected by the user in the region 1302 as shown in FIG. 13B. In addition, in a region 1303, information corresponding to a driving record selected by default (or selected by the user) from the driving record list of the region 1302 may be displayed on a map.

In addition, the region 1302 representing the driving record list may be implemented in the same manner as that described above in the daily driving record list.

Figure 14A:
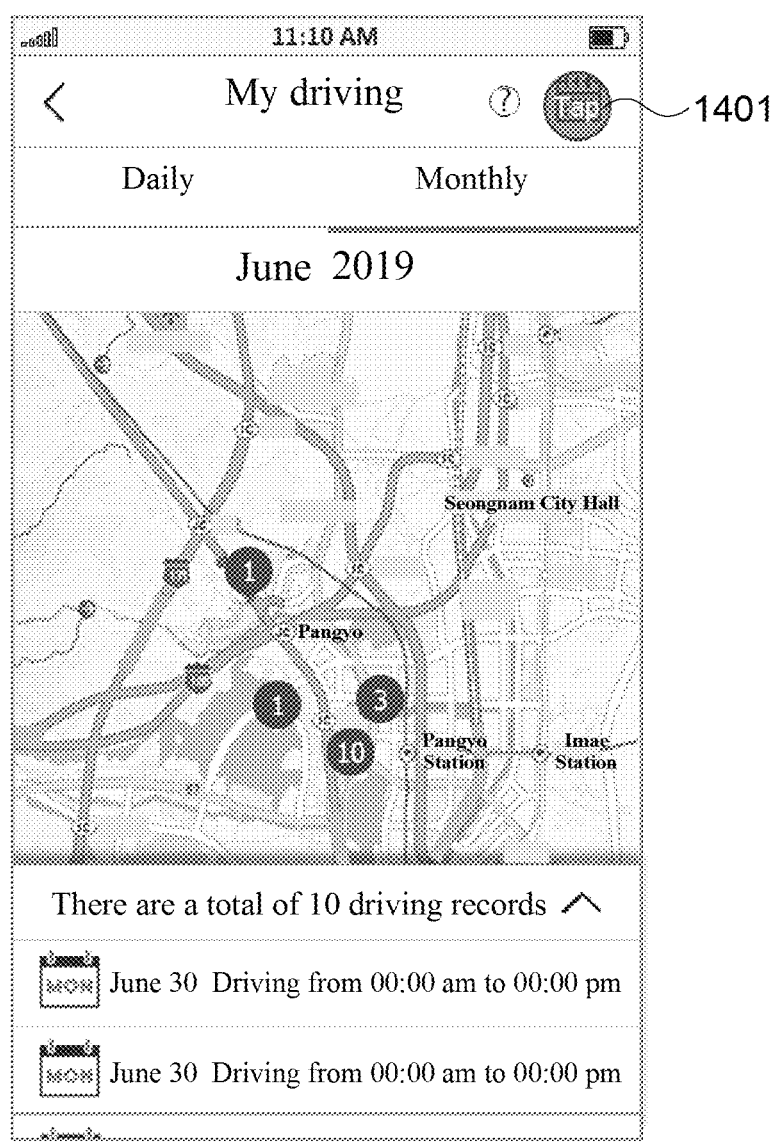
Figure 14B:
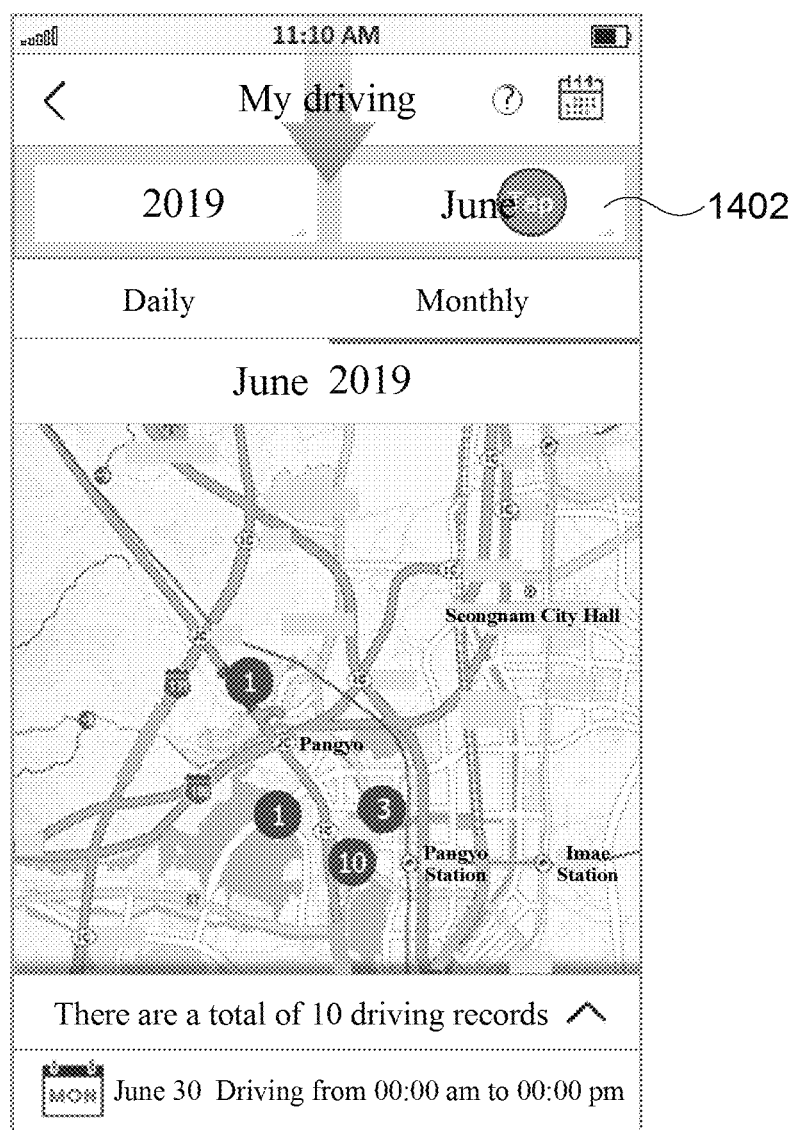
Figure 14C:
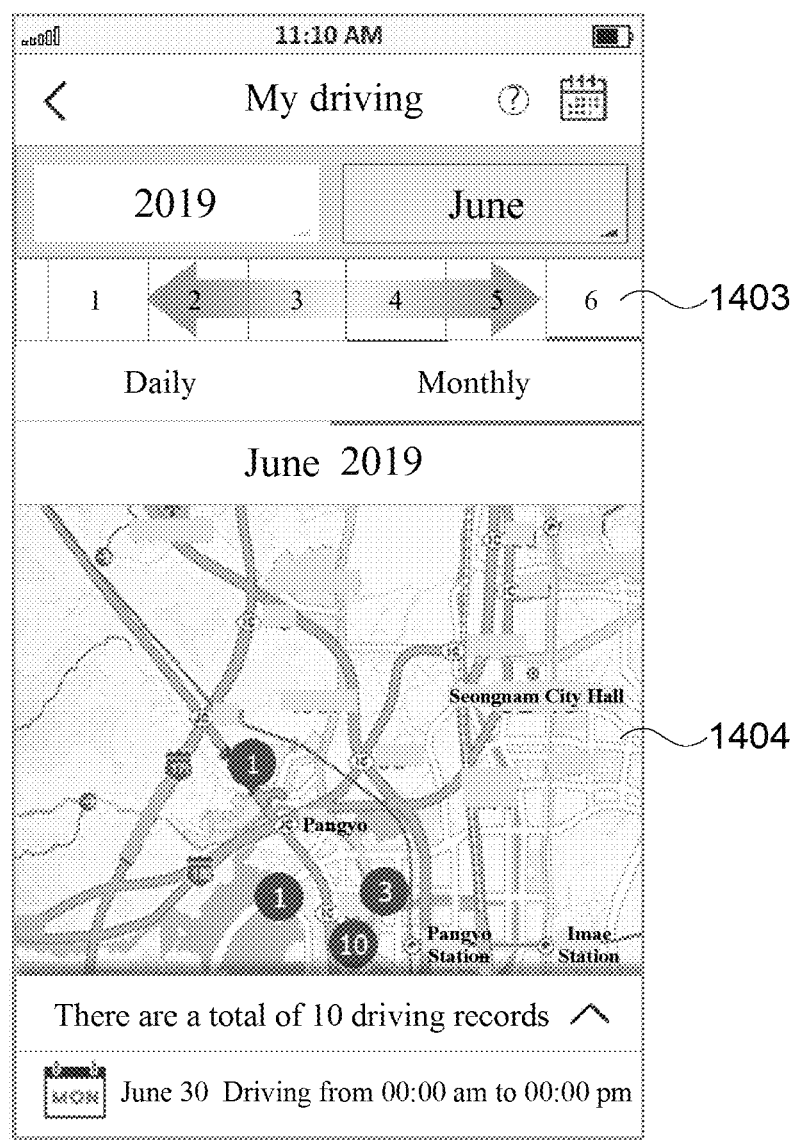
Figure 15A:
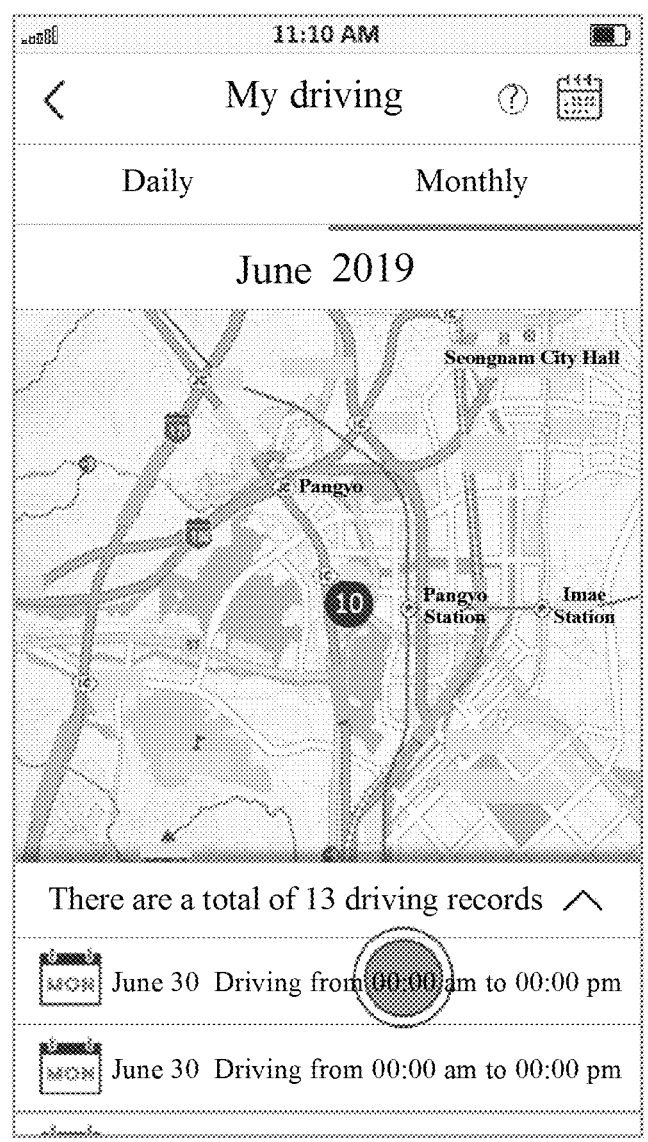
FIGS. 15A-15D are views of a driving information user interface illustrating monthly driving record editing according to an exemplary embodiment of the present invention.
Figure 15B:
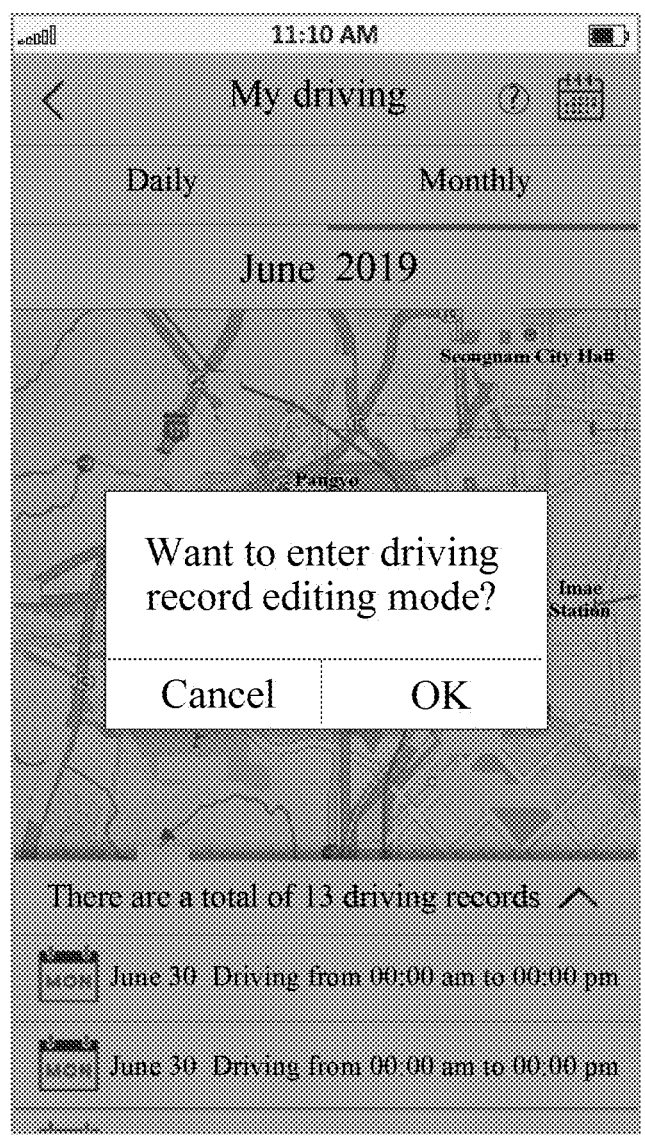
Figure 15C:
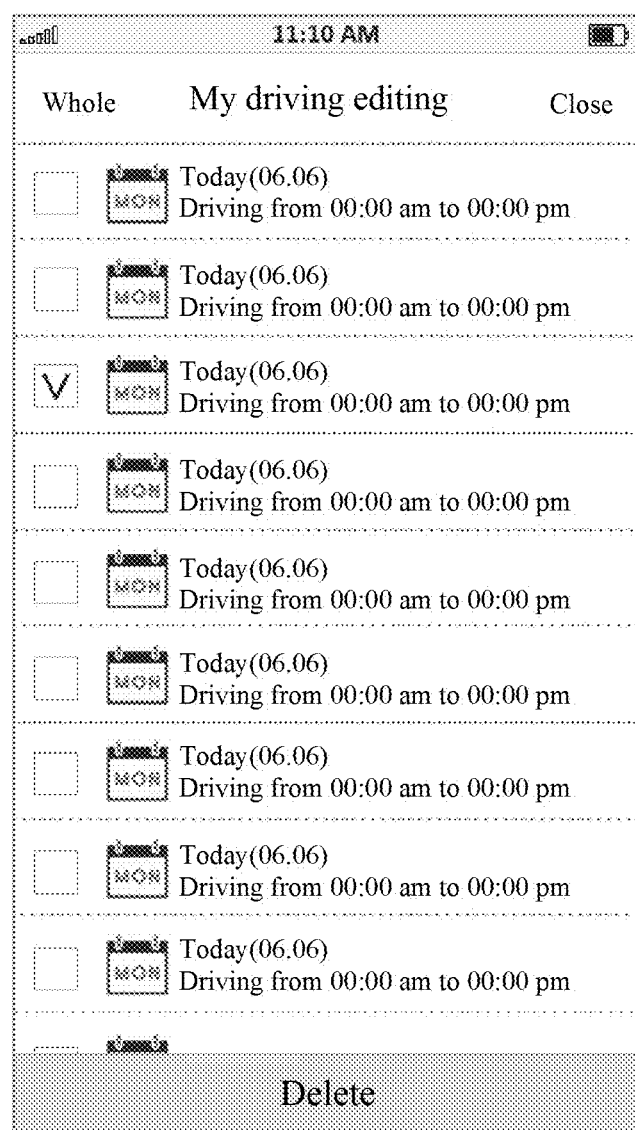
Figure 15D:
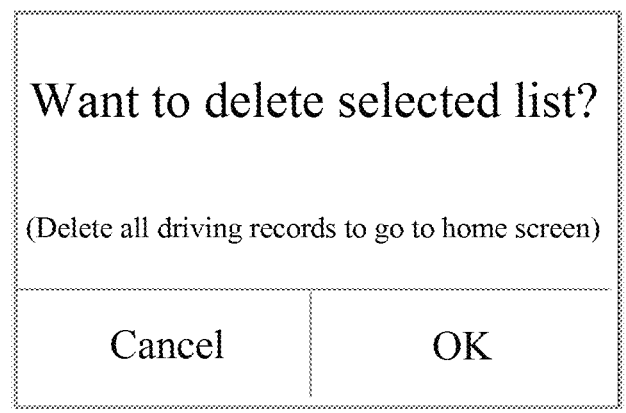

FIGS. 14A-14E are views of a driving information user interface illustrating a monthly date change according to an exemplary embodiment of the present invention. Referring to FIG. 14A, when the user selects a region 1401, the user terminal device 400 may display a region 1402 in which the year/month may be changed as shown in FIG. 14B. In addition, when the user selects a desired month using the region 1402, the user terminal device 400 may display the numbers of driving records obtained by grouping driving records of the corresponding month on a map 1404 as shown in FIG. 14C.

In addition, in a region 1403, adjacent months are displayed based on the month selected by the user, and the months may be displayed in a different color depending on whether there is a driving record in the corresponding month or may be displayed with a text such as "with record" and "without record". Also, in the region 1403, a button may be activated only in a month with a driving record and may be deactivated and displayed in a month without a driving record.

In addition, when a user inputs a left and right drag touch in the region 1403, the user terminal device 400 may change and display the month in the region 1403 to correspond to the corresponding left and right drag touch.

In addition, if the user selects a specific month using the region 1403, but there is no driving information record in the corresponding specific month, the user terminal device 400 may provide a pop-up indicating another date with a driving information record.

For example, if there is no driving information record in a specific month selected by the user but there is a driving record within the last 3 months, the user terminal device 400 may display a pop-up window of "There is no driving record on the selected date. Do you would you like to see the record from adjacent O month(s) ago instead?" as shown in FIG. 14D.

As another example, if there is no driving information record in a specific month selected by the user and the month is not within the last 3 months, the user terminal device 400 may display a pop-up window of "My driving record only up to latest 3 months is provided. Do you would you like to see record of adjacent 0 month instead?" as shown in FIG. 14E. Here, when the user selects a "yes" button in the pop-up window, the user terminal device 400 may display a driving record of the corresponding month.

FIGS. 15A-15D are views of a driving information user interface illustrating monthly driving record editing according to an exemplary embodiment of the present invention.

The driving information user interface for monthly driving record editing of FIGS. 15A-15D may operate in the same manner as the driving information user interface illustrating the daily driving record editing described in FIGS. 11A-11D, and a detailed description thereof will be omitted.

Figure 16:
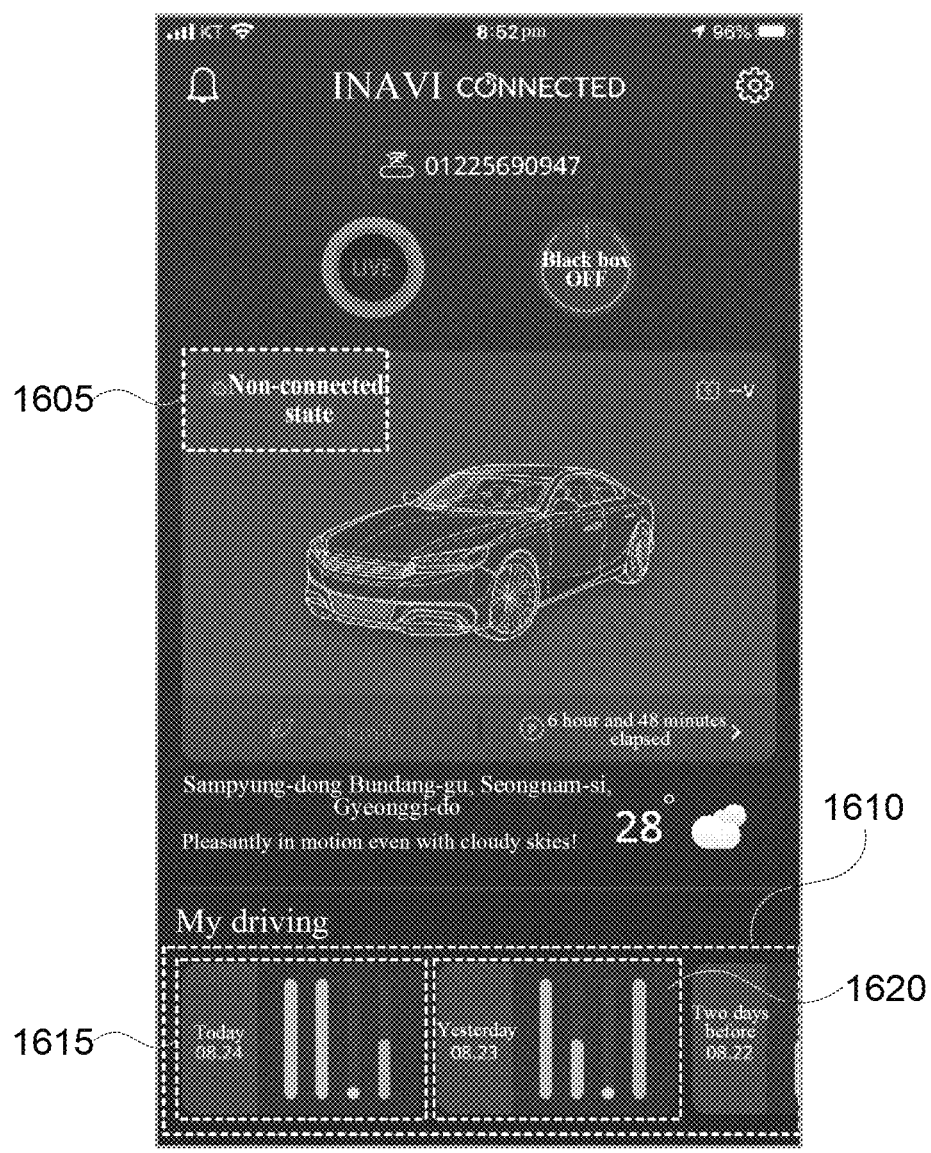
FIG. 16 is a view illustrating a main user interface according to another exemplary embodiment of the present invention.

FIG. 16 is a view illustrating a main user interface according to another exemplary embodiment of the present invention. In FIG. 16, reference numeral 1605 denotes information on a state of a communication connection with the driving information providing server 300 of the user terminal device 400, and reference numeral 1610 denotes a region representing a users driving history in the main user interface.

Specifically, referring to the user's driving history 1610, the main user interface may display the user's driving-related event occurrence frequency as icons visually distinguished according to event types by date on which the user's event has occurred such as reference numerals 1615 and 1620.

The driving-related event occurrence frequency may be displayed in the form of a bar graph among chart icons.

Also, my driving information is displayed by date from the date of the latest event occurrence, and when the user's touch input to my driving information region 1610 of the main user interface displayed on the touch-sensitive display unit is detected, the processor of the user terminal device 400 may sequentially display user driving-related event information by moving in a left-right direction according to the user's touch input.

For example, when the user's gesture is input to the my driving information region 1610, the processor may control a user interface screen to show an animation of sliding the user driving-related event information 1615 and 1620. Here, the user's touch input may be a gesture input, a tap input, or a flick input.

Figure 17:
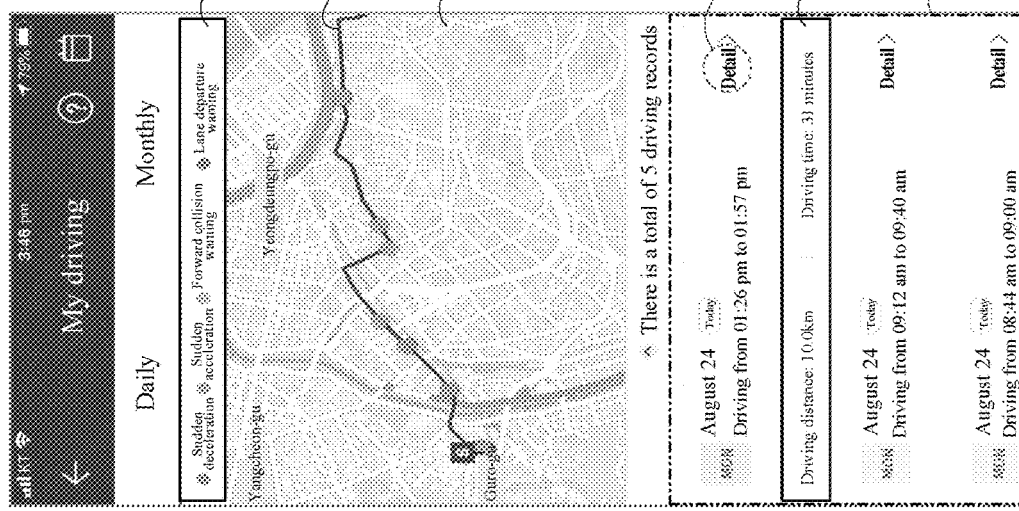
FIG. 17 is a view illustrating a user interface in which a user driving-related event is displayed when a user's touch input is detected in a "detail" menu of a driving record list in a driving information user interface according to another exemplary embodiment of the present invention.

FIG. 17 is a view illustrating a user interface displayed when a user's touch input to a "detail" menu of a driving record list is detected according to another exemplary embodiment of the present invention.

Reference numeral 1701 denotes a user interface screen displayed on the touch-sensitive display unit according to another exemplary embodiment of the present invention and may display driving-related event information of the user with map data.

The user interface screen 1701 may include a user driving-related event type display region 1710, a map data region 1715, and a user driving record list region 1717.

Here, in the map data region 1715, a route 1705 corresponding to the driving record in which the latest user driving-related event has occurred "Driving at 1:26~1:57 on August 24," may be displayed, and visual objects may be used to be displayed to be distinguished from each other according to user driving-related event types at each location where the user driving-related event has occurred in the route 1705. In reference numeral 1710, types of user driving-related events that may be displayed on a route may be displayed.

In addition, in a user driving record list region 1717, only driving records in which a driving-related event has occurred among a plurality of driving records of the user is displayed, and the latest driving record may be displayed at the top based on time information for each driving record. Reference numeral 1725 denotes a total distance and driving time the user has driven during "1:26 pm~1:57 pm on August 24$^{th}$", and reference numeral 1720 denotes a menu for displaying detailed information of the user driving-related event that occurs during "1:26 pm~1:57 pm on August 24$^{th}$" of the user.

When a user touch is detected in the region 1717, the processor slides a driving record list listed in the region 1717 according to the detected touch.

In addition, when a user touch is detected in the region 1720, the processor may switch the user interface screen to an interface screen denoted by reference numeral 1702.

The user interface screen 1702 is a screen displaying detailed user driving-related event information when the user clicks a detail view 1720 of the user interface screen 1701.

Reference numeral 1740 denotes a region in which map data is displayed, and reference numeral 1730 denotes a region in which detailed information on a driving-related event displayed on the map 1740 is displayed (a user driving-related event detail information display region).

Reference numeral 1750 denotes a visualized object (icon) corresponding to an event 1760 displayed at the center of the user driving-related event detail information display region 1730, which is displayed to be highlighted compared to other visualized objects, in a case where a plurality of driving-related events occur in a specific section.

Specifically, a route displayed on the map 1740 corresponds to a route in which the user drove on "1:26 pm~1:57 pm, August 24th", and reference numeral 1750 denotes an icon located at the forefront compared to other icons.

Reference numeral 1735 denotes that a user's swipe to the right has occurred in the user driving-related event detail information display region 1730.

When a user's swipe input is detected in the user driving-related event detail information display region 1730, the user terminal device 400 according to another exemplary embodiment of the present invention may perform control such that a location where an event corresponding to the swipe input has occurred, among a plurality of events displayed in the map data region 1740, is displayed at the center of the map data.

Meanwhile, the case where swiping occurs as the user touch 1735 in a first direction (rightward direction) in the region 1730 is used as an example, but this is an example for convenience of description and the present invention is not limited thereto. In other words, the user touch 1735 detected in the region 1730 may be a tap or a flick.

Figure 18:
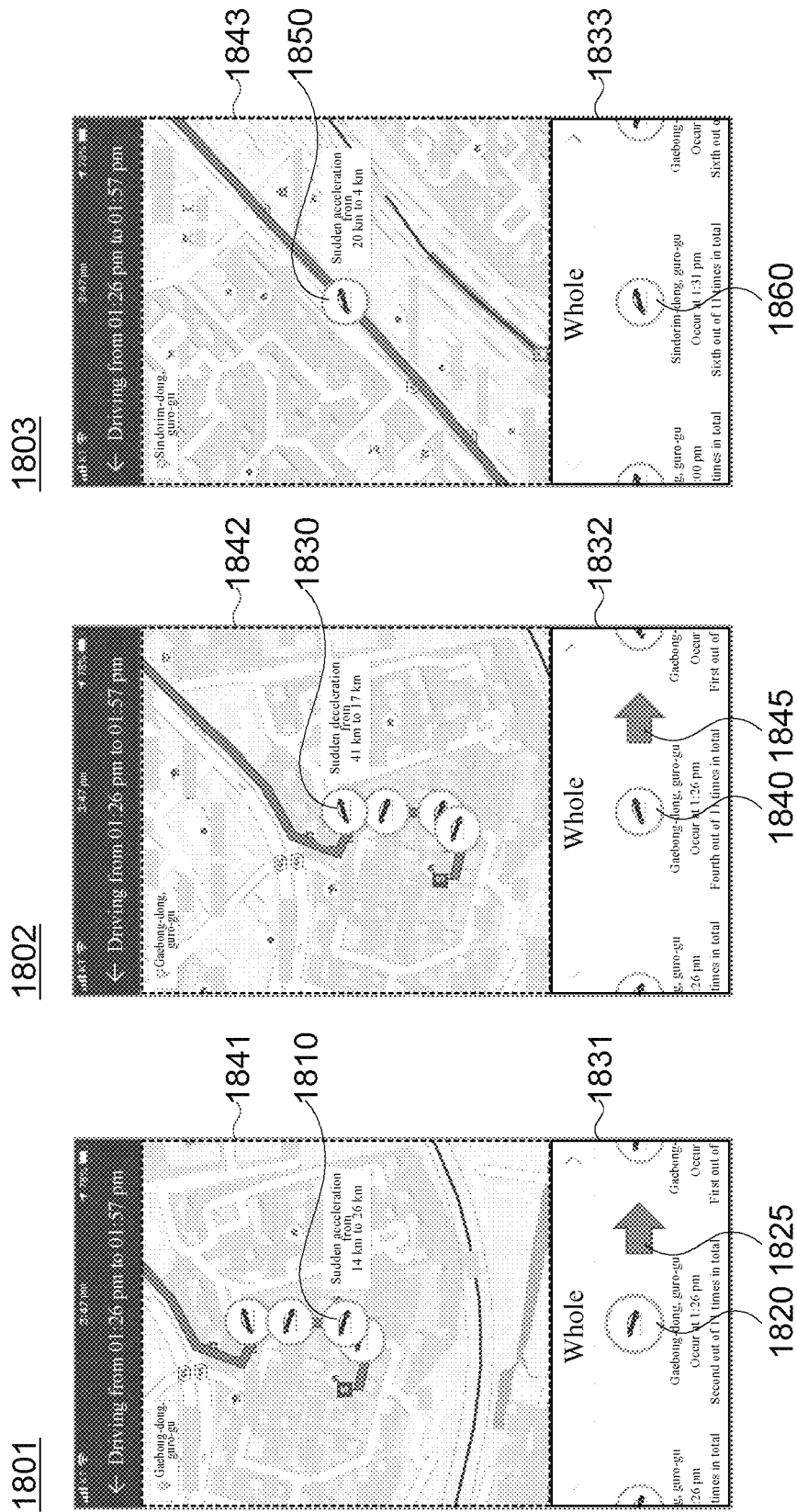
FIG. 18 is a view illustrating an example of displaying a user interface screen when a user's swipe input occurs in a driving information user interface according to another exemplary embodiment of the present invention.

FIG. 18 is a view illustrating an example of display of a user interface screen when a user's swipe input occurs in a driving information user interface according to another exemplary embodiment of the present invention.

Referring to a user interface screen 1801, it is illustrated that an event corresponding to a sudden acceleration event 1820 which is a user event displayed at the center of the user driving-related event detail information display region 1831 is displayed to be different from other driving-related events at the center 1810 of a map data region 1841. Here, an example of displaying the event to be different may include displaying the event in a magnified manner compared with other events, displaying the event at a different height, or displaying the event to protrude in a direction of the user's eyes.

Reference numeral 1825 denotes that a user swipe is input in a right direction.

The user interface 1802 shows that a sudden deceleration event 1840 selected according to the user's swipe input 1825 for reference numeral 1831 is located at the center of the user driving-related event detail information display region 1832.

In addition, the user interface 1802 shows that a location of an occurrence of a sudden deceleration event 1840 selected according to the user's swipe input 1825 for reference numeral 1831 is enlarged to be displayed at the center on a driving route of the map data region 1842.

Reference numeral 1845 denotes that a user swipe is input in the right direction. When the user swipe is input in the right direction as denoted by reference numeral 1845, a user interface screen 1803 may be displayed.

The user interface screen 1803 may display a sudden deceleration event 1860, which is a user driving-related event selected according to the swipe input 1845, at the center of the user driving-related event detail information display region 1833. Also, the user interface screen 1803 places the location 1850 where the sudden deceleration event 1860, which is a user driving-related event selected according to the swipe input 1845, occurs at the center of the map data region 2243, and disposes the location to be displayed on a driving route.

In FIG. 18, only the case where the user swipe occurs in the right direction is described, but this is only an example and the user swipe may occur in any direction, such as up, down, left, right, or a diagonal direction.

Figure 19:
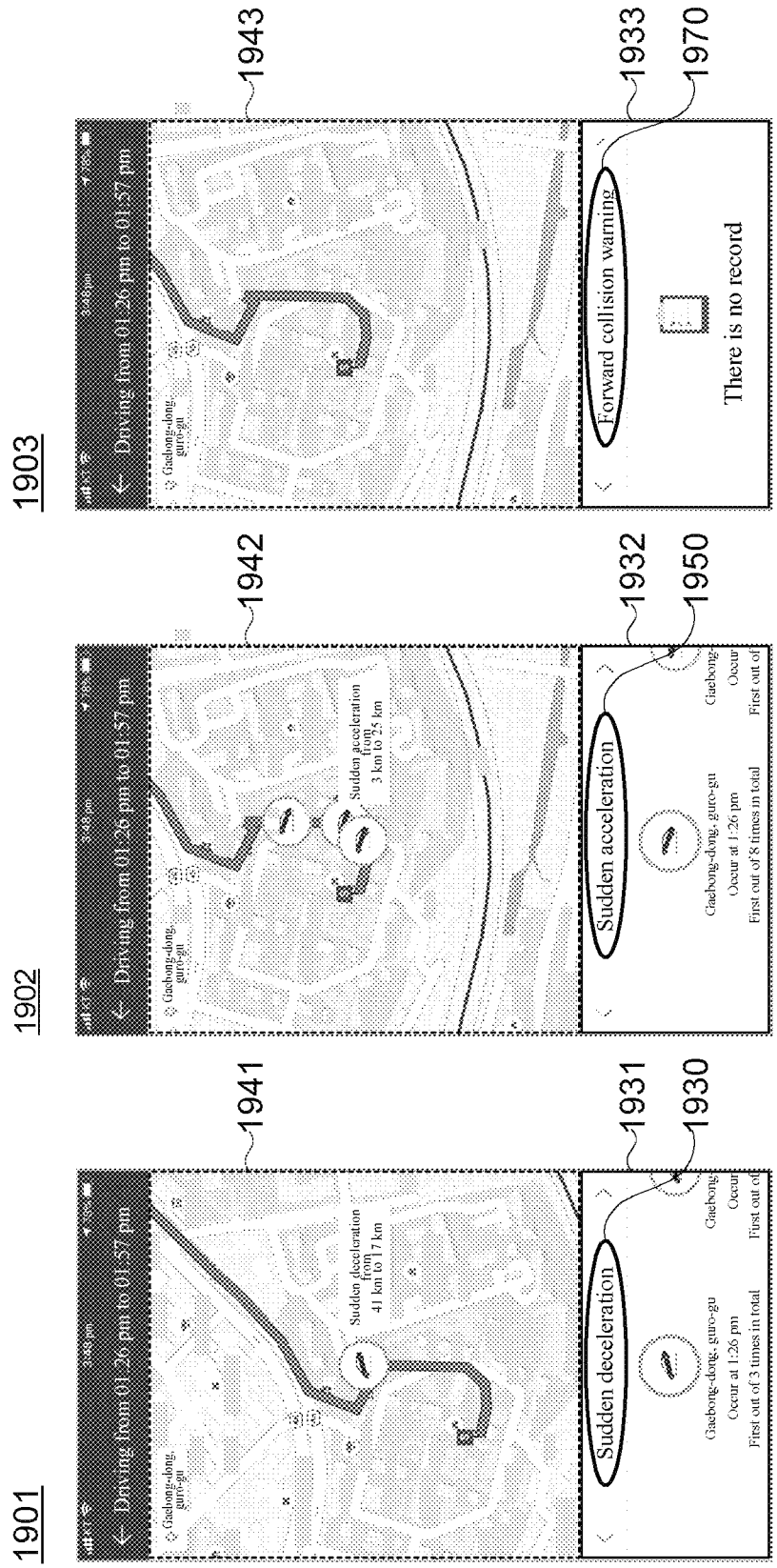
FIG. 19 is a view illustrating that only a specific user driving-related event is displayed in map data and a driving-related event detail information display region.

In FIG. 18, it is described that all types of user driving-related events are displayed in the map data 1841, 1842, and 1843 and the user driving-related event detail information display regions 1831, 1832, and 1833, but this is merely an example, and the user terminal device may control only a specific user driving-related event to be displayed in the map data and the driving-related event detail information display region as shown in FIG. 19.

As a result, referring to FIG. 18, the processor according to another exemplary embodiment of the present invention may display an animation sliding such that the user driving-related event icons 1810, 1830, and 1850 displayed in the map data regions 1841, 1842, and 1843 are located at the center of the map data regions 1841, 1842, and 1843 on the map in response to the user's touch 1825 and 1845 from 1801 to 1803.

FIG. 19 is a view illustrating an example of displaying only a specific user driving-related event on a driving information user interface according to another exemplary embodiment of the present invention.

Referring to FIG. 19, a user interface screen 1901 displays only an event corresponding to a sudden deceleration event 1930, and a user interface screen 1902 displays an event corresponding to a sudden acceleration event 1950, and a user interface screen 1903 displays only an event corresponding to a forward collision warning event 1970.

As described above, in another exemplary embodiment of the present invention, among a plurality of user driving-related events displayed in the map data 1941, 1942, and 1943, driving-related events selected according to a user's swipe input detected from the driving-related event detail information display regions 1931, 1932, and 1933 are displayed to be identified from other driving-related events on the map data 1941, 1942, and 1943 and display of the selected driving-related event may be controlled to be located at the center of the map data.

Hereinafter, a configuration of a user interface screen according to another exemplary embodiment of the present invention and each region configuring the screen will be described with reference to FIGS. 20 to 27.

Figure 20:
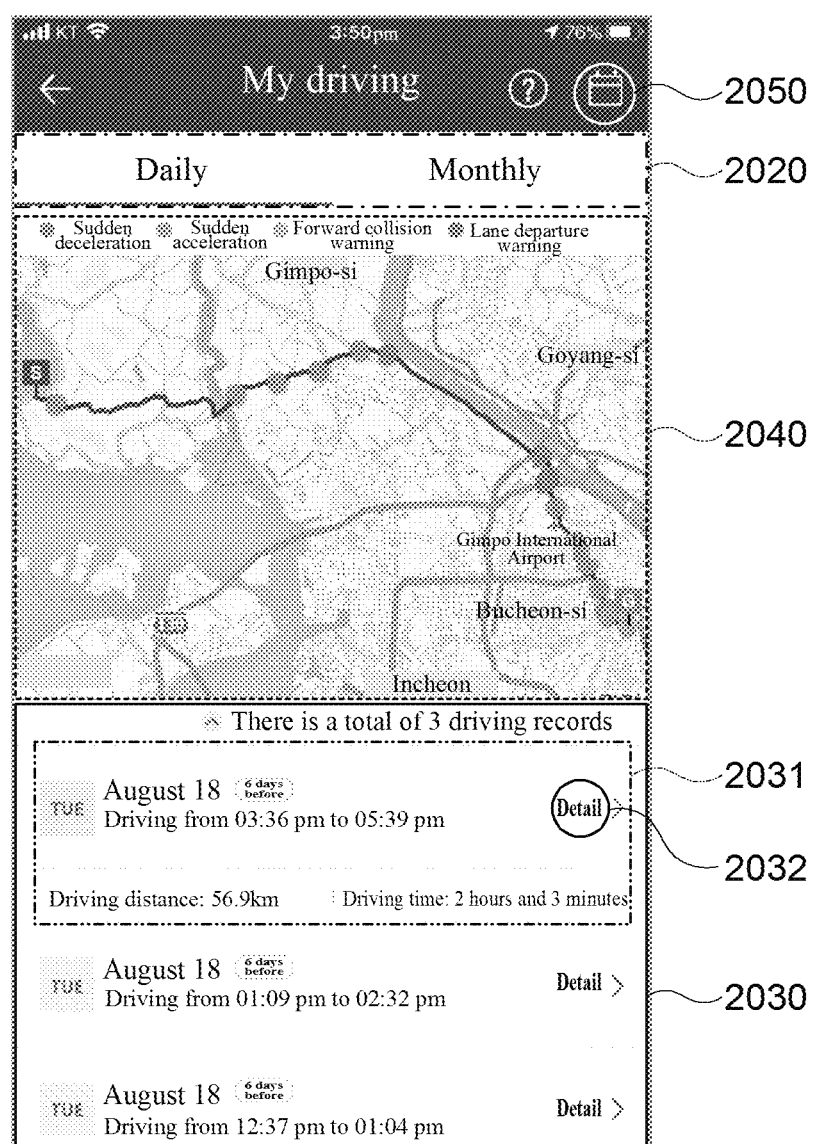
FIG. 20 is a view illustrating a user interface of a user's driving-related event according to another exemplary embodiment of the present invention.

FIG. 20 is a user interface screen for a user driving-related event according to another exemplary embodiment of the present invention.

A first region 2020 of the user interface is a region in which a time unit for providing user driving-related event information to the user is selected. The first region 2020 may display driving-related event information generated according to the user's driving on a daily and monthly basis.

However, the present invention is not limited thereto. Although it is illustrated that a time unit is selected in the first region 2020, generated user driving-related event information may be provided in units of a certain region. For example, a name of a city, province, or county in which a user driving-related event occurs may be displayed in the first region 2020. The first region 2020 of FIG. 20 shows that a user driving-related event is provided on a monthly basis by a user's touch.

A second region 2030 of the user interface displays a list of total numbers of user driving records and dates of the driving records that occur in a corresponding month (August) based on a time unit (monthly) selected by a user's touch in the first region 2020.

In reference numeral 2031 of the second region 2030, day, date, and time information (driving start time and driving end time) corresponding to a driving record, and driving distance and driving time related to the corresponding driving record are displayed.

Figure 24:
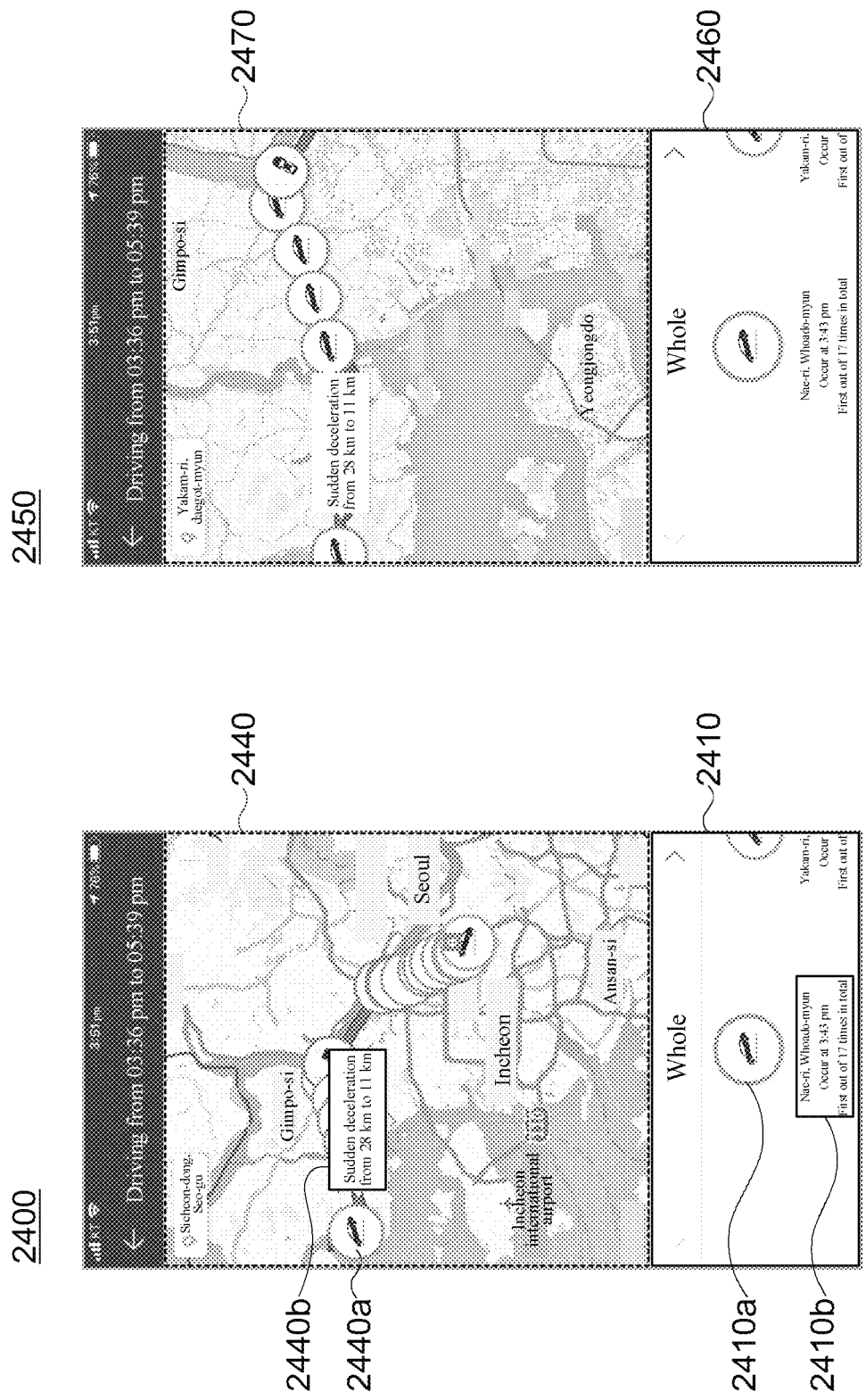
FIG. 24 is a view illustrating a user interface for displaying a user's driving-related event according to another exemplary embodiment of the present invention.

Reference numeral 2032 is a UI region for displaying detailed information of the driving record for "driving between 3:36 and 5:39 on August 18th", and when a user's touch input is detected at the corresponding part, the processor may display a user interface screen as shown in FIG. 24 to be described later.

A third region 2040 of the user interface displays a user's driving route from a departure point at which the driving record regarding the "driving between 3:36 and 5:39, August $18^{th}$" selected in the second region 2030 to a destination point and a driving-related event that occurs on the driving route, which are displayed as visualized objects classified according to event types at each occurrence location on the map data.

In FIG. 20, reference numeral 2050 denotes a button for selecting a user driving-related event information display unit displayed in the first region 2020. When a user's touch is detected in reference numeral 2050, the processor may expand the first region 2020 of the user interface as shown in FIGS. 21 to 23 and control the first region 2020 to display a menu for the user to search for driving-related event information and also control the second region 2030 and the third region 2040 to display information corresponding to the search condition selected in the first region 2020.

In order to display the user driving-related event information through the user driving-related event user interface on the user terminal device 400 according to exemplary embodiments of the present invention, the driving information providing server 300 should acquire the user driving event related information from the driving recording device 100 for a vehicle and store the information each time a user driving-related event occurs. That is, when a user driving-related event occurs during driving/parking of the vehicle, the driving information providing server 300 receives the user driving event related information from the driving recording device 100 for a vehicle through a communication network and stores the information. The user driving event related information includes occurrence time, region, location information, event type, speed information, and the like of each event that occurs according to the user's driving.

Figure 21:
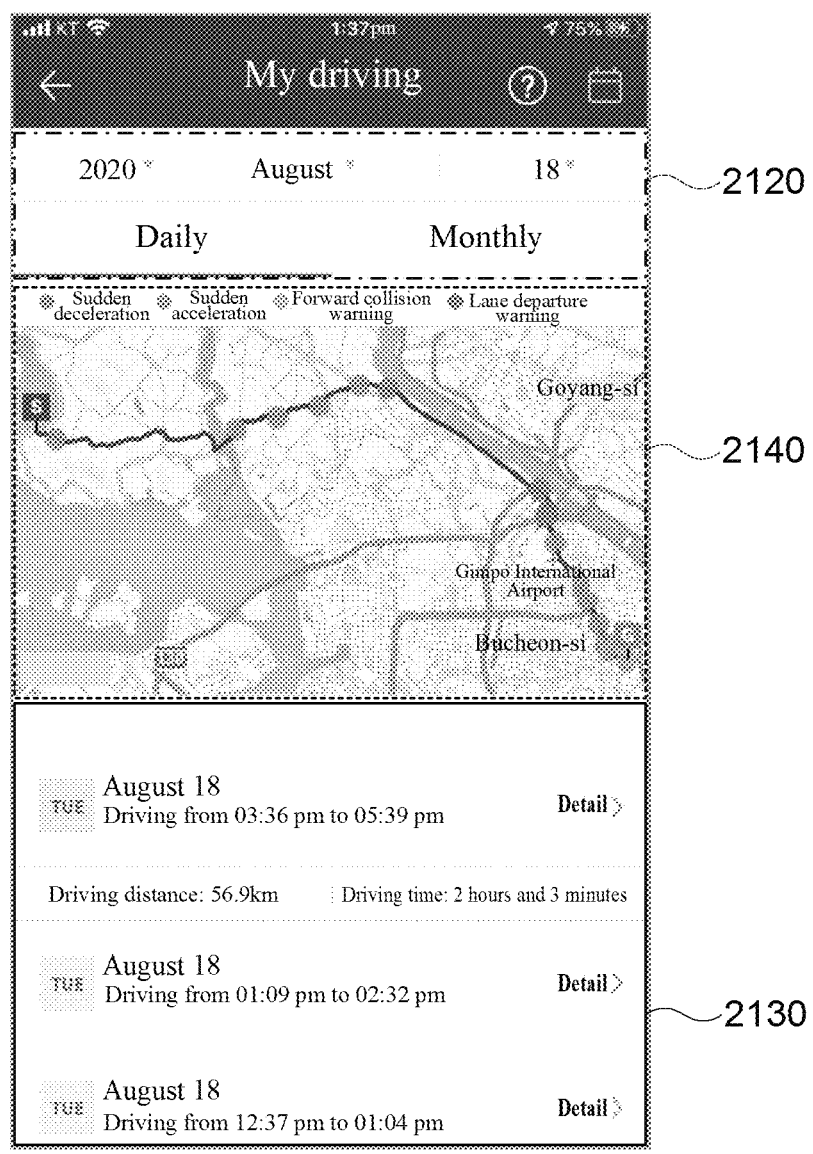
FIGS. 21 to 23 are views illustrating a user interface according to detection of a user touch input in reference numeral 2050 of FIG. 20.
Figure 22:
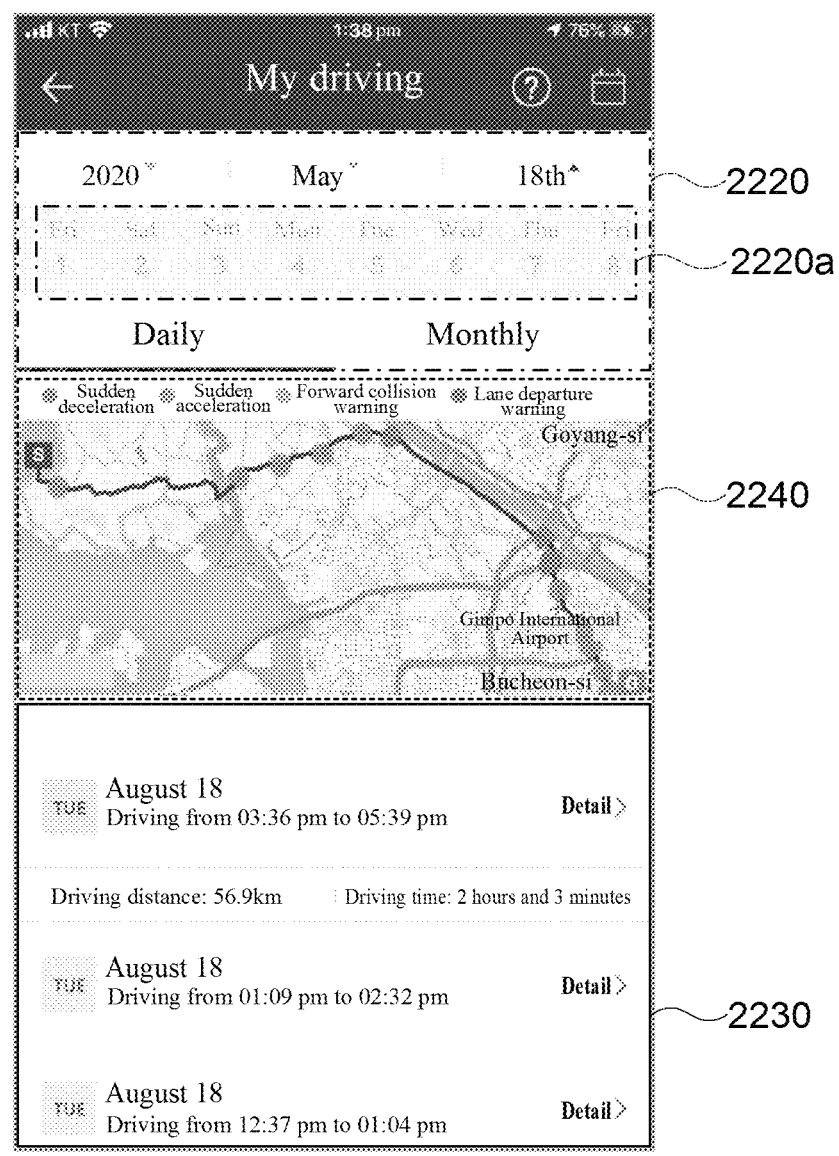
Figure 23:
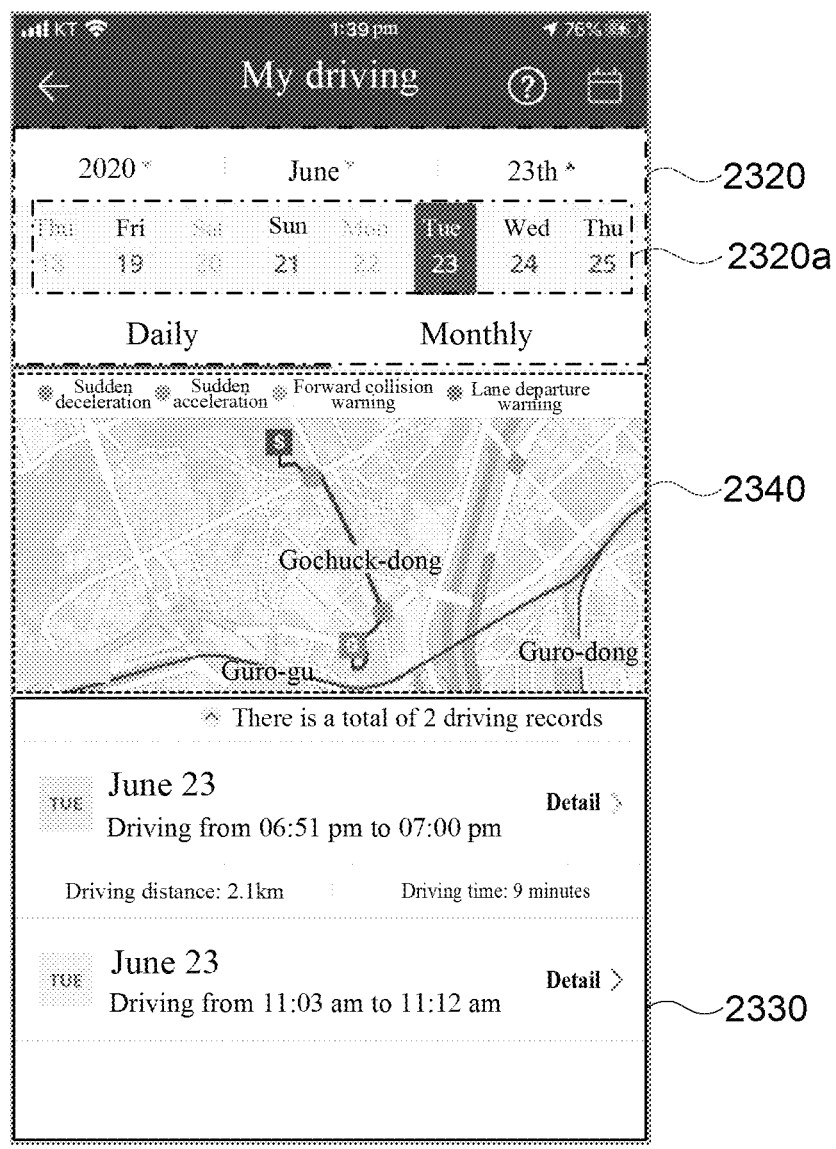

FIGS. 21 to 23 show that a user event time unit selection menu is expanded and displayed in the first region 2020 as a user touch input is detected in reference numeral 2050 of FIG. 20, and accordingly, the user driving-related event information displayed in the second region 2030 and the third region 2040 are varied accordingly.

Specifically, compared to the first region 2020 of FIG. 20, in the first region 2120, a menu (year, month, day) in which the user may directly select a date of occurrence of the driving-related event is additionally displayed. As shown in FIG. 21, when the user selects "Aug. 18, 2020" through the first region 2120, a driving record corresponding to the date selected through the first region 2120 may be displayed in order of occurrence time in the second region 2130.

In addition, in the third region 2140, route information corresponding to the user's driving record located at the top of the second region 2130 and a driving-related event occurrence location may be displayed on the map data.

A first region 2220 of FIG. 22 shows that the user directly selects May 18, 2020 as a driving-related event occurrence date through a touch input. However, since the user driving-related event did not occur on May 18, 2020, the second region 2230 and the third region 2240 may have the same information as that displayed in FIG. 21.

Reference numeral 2220(a) of the first region 2220 shows a date menu screen in which a user may select a day of the week through a horizontal swipe input. Referring to the date menu screen 2220a, it can be seen that all of the corresponding dates are deactivated because there are no user driving-related events from May 1, 2020 to May 8, 2020.

A size of a third region 2240 of FIG. 22 is relatively reduced compared to the third region 2140 of FIG. 21 as the date menu screen 2220a is additionally displayed in the first region 2220a.

A first region 2320 of FIG. 23 shows that the user directly selects Jun. 23, 2020 as a driving-related event occurrence date through a touch input. Referring to a date menu screen 2320a of the first region 2320, among the dates displayed on the date menu screen 2320a, the dates (19th, 21st, 23rd, 24th, 25th) when a driving-related event occurs is activated and the dates (18th, 20th, 22nd) when no driving-related event occurs is deactivated and displayed, so that the user may easily check additional information on the driving-related event through a second region 2330 a third region 2340.

The second region 2330 of FIG. 23 shows a list of driving-related events that occur on Jun. 23, 2020 selected by a user's touch input in the first region 2320, and the third region 2340 displays a driving route related to one driving-related event among driving-related event information displayed in the second region 2330 on the map data.

FIG. 24 is a view of a user interface displaying a user driving-related event according to another exemplary embodiment of the present invention.

Reference numeral 2400 of FIG. 24 shows a user interface screen switched when a user touch input is detected in reference numeral 2032 of FIG. 20.

A first region 2410 of reference numeral 2400 displays a type (sudden deceleration event) icon 2410a of an event that occurs first, among driving-related events included in a driving record regarding "driving between 3:36 and 5:39 on August 18$^{th}$", and first information 2410b on the corresponding event. The first information 2410b includes information on a location where the sudden deceleration event occurs, a time at which the sudden deceleration event occurs, and order information of events that occur during driving.

The second region 2440 shows that icons according to types of driving-related events included in the driving record for "driving between 3:36 and 5:39 on August 18" are displayed on the map data. Specifically, driving-related events in the second region 2440 are displayed at points corresponding to locations where the respective events occur on the route.

Reference numeral 2440a shows that a sudden deceleration event icon 2410a displayed at the center of the first region 2410 is displayed on the driving route. Reference numeral 2440b denotes second information on the sudden deceleration event icon 2410a and includes sudden deceleration related speed information and event type information.

In FIG. 24, reference numeral 2450 shows that the user interface is changed as a user's touch input is detected in the second region 2440 of reference numeral 2400. As a user touch input is detected in the second region 2440 of reference numeral 2400, the scale of map data in the second region 2470 at reference numeral 2450 is expanded, and accordingly, the driving-related icons existing on the driving route are arranged and displayed in a less overlapping manner as compared with reference numeral 2440. However, the first region 2460 of reference numeral 2450 is the same as the first region 2410 of reference numeral 2400.

When the driving-related event icons overlap each other in the second regions 2440 and 2470, the processor may display icons corresponding to driving-related event icons displayed at the centers of the first regions 2410 and 2460 in the second regions 2440 and 2470 such that the icons are more easily identified by the user than other icons. For example, the processor may control icons corresponding to the driving-related event icons displayed at the centers of the first regions 2410 and 2460 compared with other icons, to be displayed to protrude in a direction of the user's eyes, to blink, or to be highlighted compared with other icons.

Figure 25:
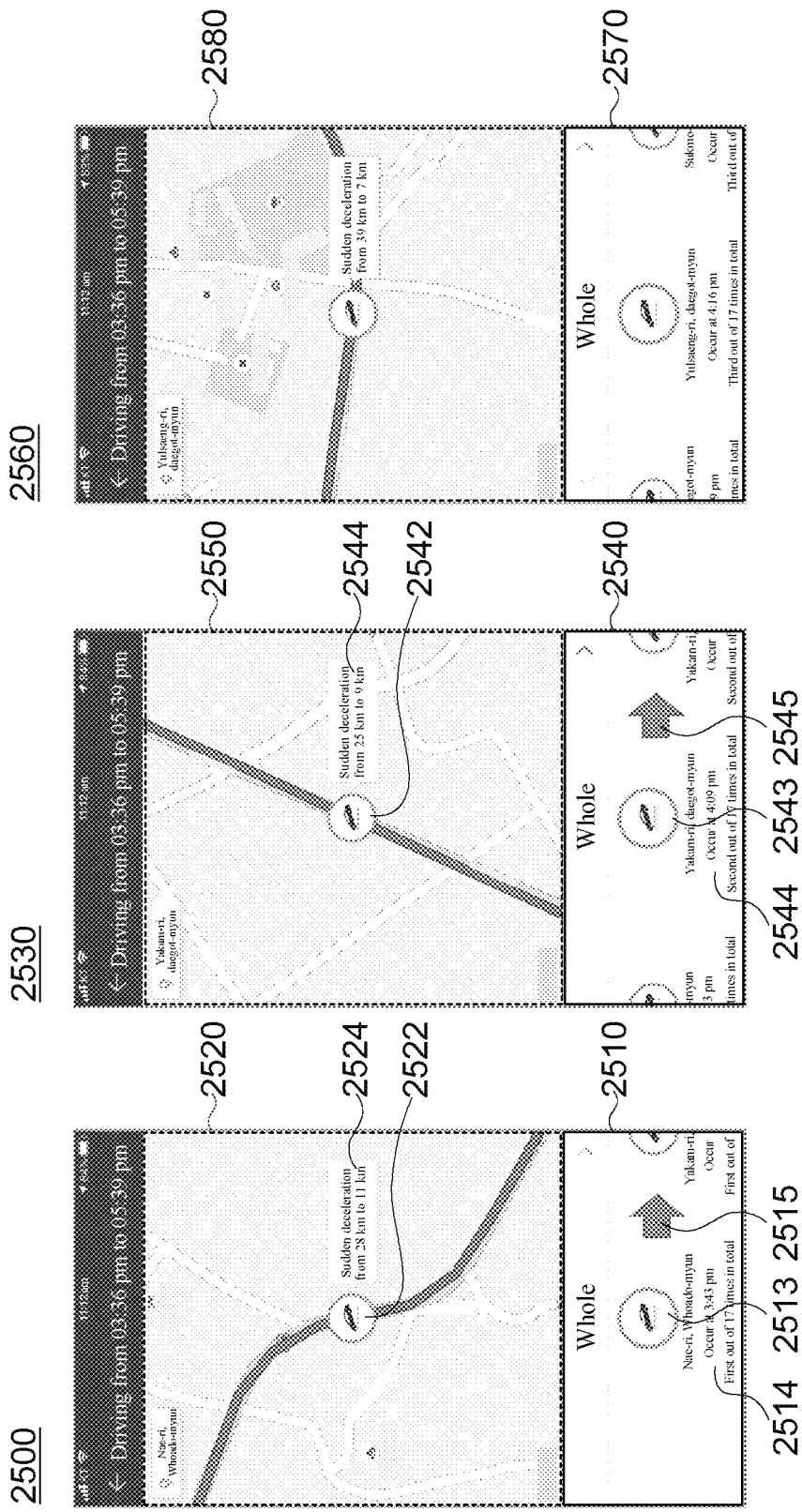
FIG. 25 is a view illustrating a driving-related event user interface according to another exemplary embodiment of the present invention.

FIG. 25 is a view of a user interface displaying a driving-related event according to another exemplary embodiment of the present invention. FIG. 25 illustrates a situation in which a first driving-related event that occurs to a third driving-related event that occurs, among a total of 17 driving-related events that occur in the driving route regarding "driving between 3:36 and 5:39 on August 18$^{th}$", are sequentially displayed on the user interface screen.

Reference numerals 2500, 2530, and 2560 denote that driving-related event icons are sequentially displayed in the second regions 2440 and 2470 according to a user's touch input when the touch input is detected in the first regions 2410 and 2460 of the user interfaces 2400 and 2450 illustrated in FIG. 24.

First, in the first region 2510 of reference numeral 2500, a first event icon 2513 that occurs, among a total of 17 driving-related events that occur in "driving between 3:36 and 5:39 on August 18th", and first information 2514 are located at the center. In addition, a driving-related event icon 2522 corresponding to the driving-related event icon 2513 displayed at the center of the first region 2510 is located at the center of the second region 2520 and second information 2524 is located nearby.

Here, when a user's touch input 2515 is detected in the first region 2510, the processor may control a second driving-related event icon 2543 that occurs, among the total of 17 driving-related events that occur in the "driving between 3:36 to 5:39 on August 18$^{th}$", and the first information 2544 to be displayed at the center of the first region 2540, and control the driving-related event icon 2542 corresponding to the driving-related event icon 2543 displayed at the center of the first region 2540 to be located at the center of the second region 2550 and the second information 2544 to be located nearby.

Also, when the user's touch input 2545 is detected in the first region 2540, the processor controls a third driving-related event icon that occurs, among the total of 17 driving-related events that occur in the "driving between 3:36 and 5:39 on August 18$^{th}$" and an occurrence location thereof to be displayed in the respective regions 2570 and 2580 as shown in reference numeral 2560.

In FIG. 25, the user's touch detected by the processor in the first regions 2510 and 2530 is a swipe gesture, but is not limited thereto.

In addition, FIG. 25 shows that the user's swipe gesture is generated from left to right, but this is only an example, and the swipe gesture in various directions such as up, down, left, right, diagonal, and the like may be input and the processor may control display order of driving-related icons according to the direction of the input swipe gesture.

In addition, although FIG. 25 shows that the driving-related icons are sequentially displayed, the processor may control the driving-related event icons existing on the route to be displayed to skip over a predetermined number according to the user's touch input (e.g., double tap) in the first region and the second region.

In the example described above, when the user's touch input is detected in the first region, the driving-related event icons displayed in the second region are sequentially displayed accordingly, but conversely, when a user's touch is detected in the second region, the driving-related icons displayed in the first region may be sequentially displayed.

Figure 26:
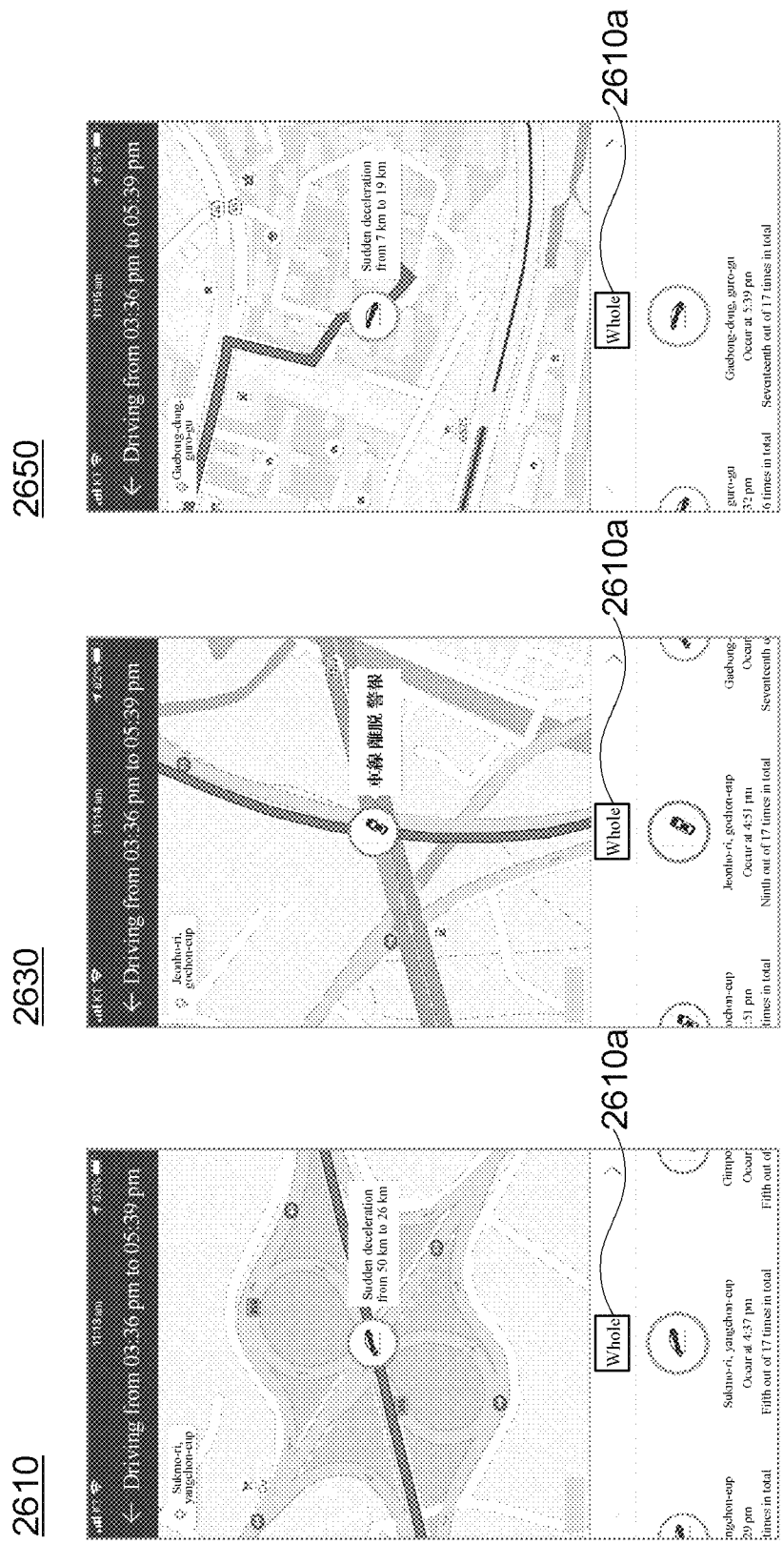
FIG. 26 is a view illustrating that the driving-related event user interface sequentially displays driving-related event icons and locations thereof in respective regions according to a user's touch input.

The driving-related event user interface shown in FIG. 26 shows that driving-related event icons and their positions are sequentially changed and displayed in each region according to a user's touch input.

In FIG. 26, reference numeral 2610 shows that information related to a sudden deceleration event, which is a fifth driving-related event that occurs, among the total of 17 driving-related events that occur on the route of the driving record, reference numeral 2630 shows that information related to lane departure warning event, which is a ninth driving-related event that occurs, and reference numeral 2650 shows that information related to a sudden acceleration event, which is a seventeenth driving-related event that occurs, sequentially displayed according to a user's touch input.

In addition, reference numeral 2610a in FIG. 26 is a region in which a type of a driving-related event to be displayed through a user interface may be selected, and in FIG. 26, it is illustrated that all driving-related events are selected to be displayed.

FIG. 27 is a user interface according to another exemplary embodiment of the present invention, in which driving-related events that occur on a corresponding route are classified and displayed according to event types.

FIG. 27 shows an example in which the processor selects only the sudden deceleration event 2710a, among the total of 17 driving-related events including a driving record regarding the "driving between 3:36 to 5:39 on August $18^{th}$", which is a driving record stored last among driving records stored in the server 300, and displays the selected sudden deceleration event on a user interface. In other words, it can be seen that the total of 17 driving-related events occurred on the driving route of "Driving between 3:36 and 5:39 on August 18" in FIG. 20, in which a total of 11 sudden deceleration events occurred.

Specifically, reference numeral 2710 of FIG. 27 denotes information related to a first sudden deceleration event among the total of 11 stored sudden deceleration events, and reference numeral 2730 denotes information related to a fourth sudden deceleration event.

Switching from the user interface screen of reference numeral 2710 to the user interface screen of reference numeral 2730 may be performed according to a user's touch input.

Also, the information related to the sudden deceleration event in reference numerals 2710 and 2730 of FIG. 27 includes a total number of times the sudden deceleration event has occurred, its sequence, and event occurrence location information.

In FIG. 27, only the sudden deceleration event is described, but other events related to driving, such as a sudden acceleration event, a lane departure event, a driving-related information generation event, and a driving-related information transmission event, may also be selected and displayed.

Figure 28:
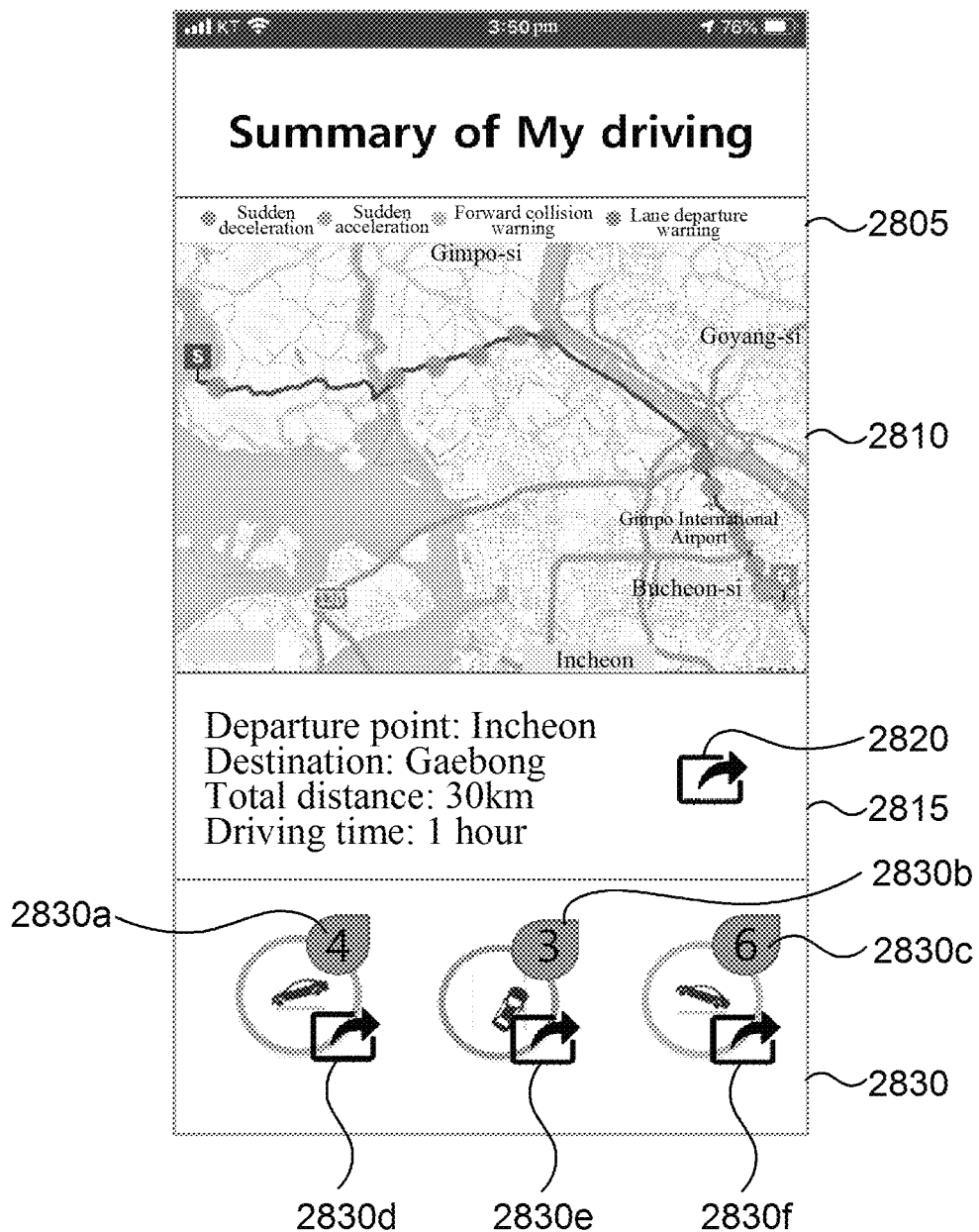
FIG. 28 is a view illustrating a user interface for displaying driving summary information of a user vehicle according to another exemplary embodiment of the present invention.

FIG. 28 is a user interface according to another exemplary embodiment of the present invention and shows a screen displaying driving summary information of a user vehicle.

Specifically, reference numeral 2805 denotes a region in which a type of a driving-related event that occurs during driving is displayed, and reference numeral 2810 is a region in which a driving route is displayed on an electronic map. When a user's touch (pinch-to-zoom, tap, swipe, etc.) is input to the region of reference numeral 2810, the electronic map may be enlarged/reduced or moved and displayed according to the user's touch.

Reference numeral 2815 denotes a region for displaying route summary information (departure point, destination, total distance, driving time) of the user vehicle, and reference numeral 2820 denotes an object for sharing the route summary information with other users.

When the user touches the shared object 2820, the processor may control to provide a UI for selecting a friend to share at least one of the route summary information and full route information to the user. In addition, the processor may transmit the route summary information and full route information to the server 300 through a wireless communication module to share at least one thereof, and the server 300 may provide at least one of the route summary information and full route information requested to be shared to the selected user.

Reference numeral 2830 denotes a region for displaying a type and the number of driving-related events that occur during driving of the user vehicle. Reference numerals 2830a, 2830b, and 2830c denote objects representing the number of times a driving-related event occurs during driving of the user vehicle, and reference numerals 2830d, 2830e, and 2830f denote objects for sharing each of the driving-related events that occur during driving of the user vehicle.

That is, when the user touches the shared object (2830d, 2830e, and 2830f), the processor may transmit the type of the driving-related event and the occurrence number information to the server 300 through the wireless communication module, and the server 300 may provide the type of driving-related event acquired from the user and the occurrence number information to an electronic device of a friend that the user permits to share, or may be used as data for generating traffic-related information generated on the route the user has traveled.

Figure 29:
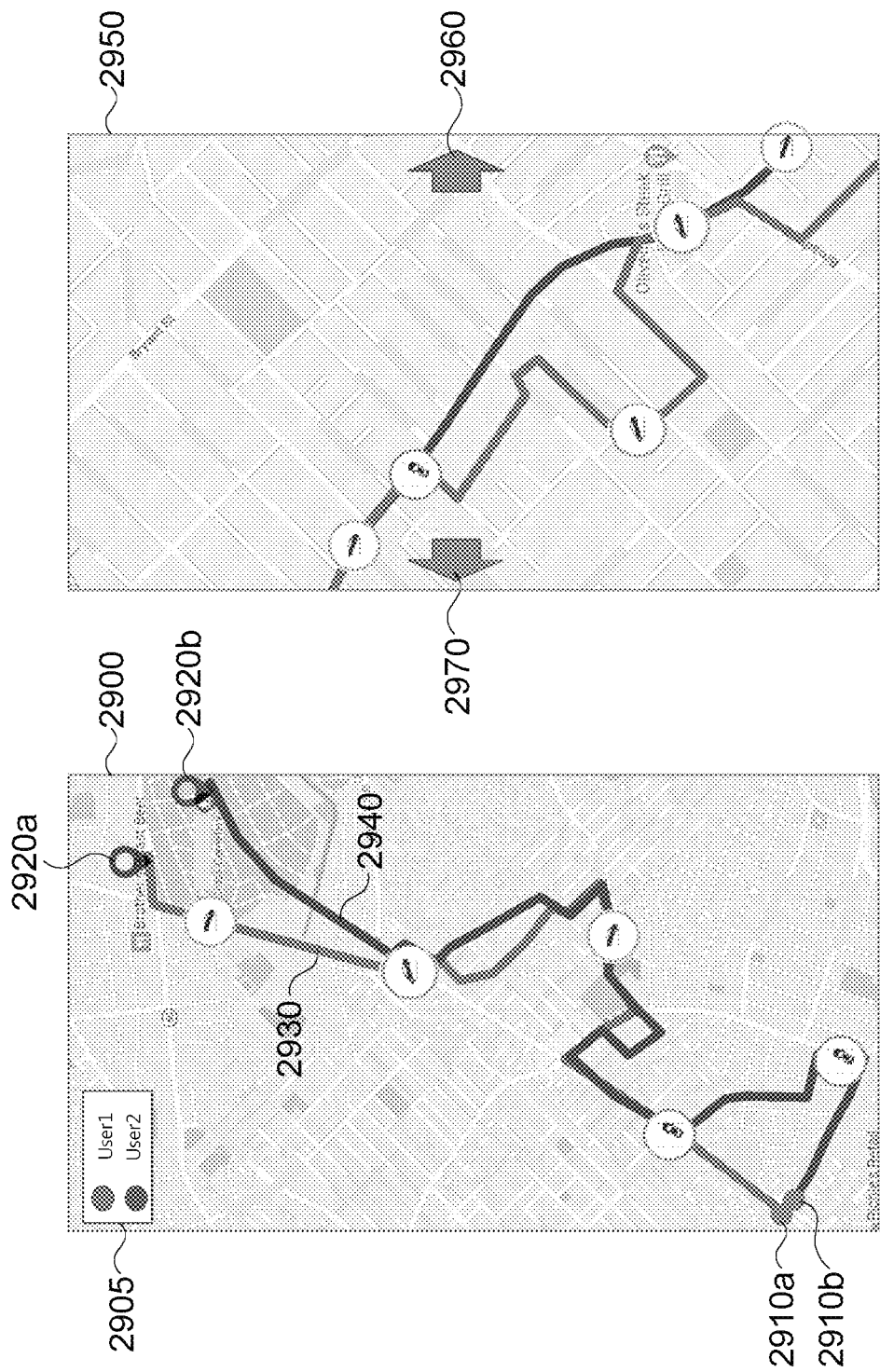
FIG. 29 is a view illustrating a function of sharing a driving-related event with friends according to another exemplary embodiment of the present invention.

FIG. 29 is a user interface according to another exemplary embodiment of the present invention, illustrating a function of sharing a driving-related event with friends.

Reference numeral 2900 denotes a user interface of a user's electronic device mutually permitted to share driving route and driving-related event information, and displays shared driving-related events together with routes where each event occurred on an electronic map.

Reference numeral 2905 denotes an object for displaying shared users, and when there are multiple shared users, reference numeral 2905 may display a selection object for selecting users to be displayed on the map among driving routes and driving-related events of the plurality of users.

Reference numeral 2930 denotes a driving route of user 1, reference numeral 2910a denotes a departure point, reference numeral 2920a denotes a destination, and a driving-related event generated during driving may be displayed on a driving route at a location of the occurrence.

Reference numeral 2940 denotes a driving route of user 2, 2910b denotes a departure point, 2920b denotes a destination, and a driving-related event that occurs during driving may be displayed at a location of occurrence on the driving route.

Reference numeral 2950 shows a user interface screen of the user terminal device 400 when a user's touch for enlarging the map screen is input to the screen of reference numeral 2900.

Reference numeral 2950 shows that when the entire driving route cannot be displayed on the screen of the user terminal device 400 as the map is enlarged, driving-related events are sequentially displayed as the electronic map moves according to the user's touch input (swipe) 2960 and 2970.

In addition, although the degree of traffic congestion for each section is not displayed in the driving route of users in FIG. 29, in another exemplary embodiment of the present invention, the server 300 may calculate the degree of traffic congestion for each specific section based on speed information for each location obtained from the service user terminal devices 400.

In addition, in another exemplary embodiment of the present invention, the server 300 provides a traffic congestion result calculated for each section to the user terminal device 400, so that the processor of the user terminal device 400 is may control the user interface to display the degree of traffic congestion in different colors on the driving route.

Figure 30:
FIG. 30 is a view illustrating a user interface for displaying generated driving-related events and related information on a map of a user electronic device according to another exemplary embodiment of the present invention.

FIG. 30 is a screen for displaying driving-related events that occur and related information on a map of a user electronic device according to another exemplary embodiment of the present invention. Referring to FIG. 30, the server 300 according to another exemplary embodiment of the present invention may acquire and store types of driving-related events that occur during driving of user vehicles connected to a network, occurrence time, and occurrence location information, and the like and provide information such as types of driving-related events that occur near a specific location searched by the user or a location selected on the map, the number of the driving-related events, and safety driving according to the degree of intensive occurrence of driving-related events, and the like to the user terminal device 400 of the user.

Specifically, in FIG. 30, reference numeral 3010 shows a location where a lane departure event intensively occurs, the number of occurrences as 23 times, and an intensive occurrence time (1:11 pm to 3:23 pm) as visual objects.

Reference numeral 3020 shows that a location where the lane departure event occurs four times and a time at which the lane departure event occurs are displayed as visual objects. Reference numeral 3030 shows that a location where a sudden deceleration event occurs 7 times and a time at which the sudden deceleration event occurs are displayed as visual objects. Reference numeral 3040 shows that a location where a sudden acceleration event occurs 9 times and a time at which the sudden acceleration event occurs are displayed as visual objects.

In another exemplary embodiment of the present invention, information on driving-related events that have occurred in a region of interest to the user is displayed on a map as shown in FIG. 30, so that the user may recognize a situation in which the user needs to drive safely in the corresponding area.

In addition, as shown in FIG. 30, if the number of occurrences of driving-related events acquired during driving of the user vehicle exceeds a predetermined reference over a certain period of time, the server 300 may provide driving caution information to the user terminal device 400 to prevent an accident or guide safe driving.

In addition, as shown in FIG. 30, if the number of occurrences of driving-related events acquired during driving of the user vehicle exceeds a predetermined reference over a certain period of time, the server 300 may control a moving object such as a drone, a vehicle, a mobility, and the like to move to a corresponding location to obtain information on an event that occurs at the corresponding location.

Here, the moving object which has moved to the location where the event occurs by the server 300 may obtain information such as an image and a sound for a corresponding point from the corresponding location and provide the information to the server 300, and the server 300 may determine whether road maintenance is necessary, whether an emergency rescue is to be made, or the like from the information such as the image and the sound acquired from the moving object and give an order to dispatch to a related organization.

Figure 31:
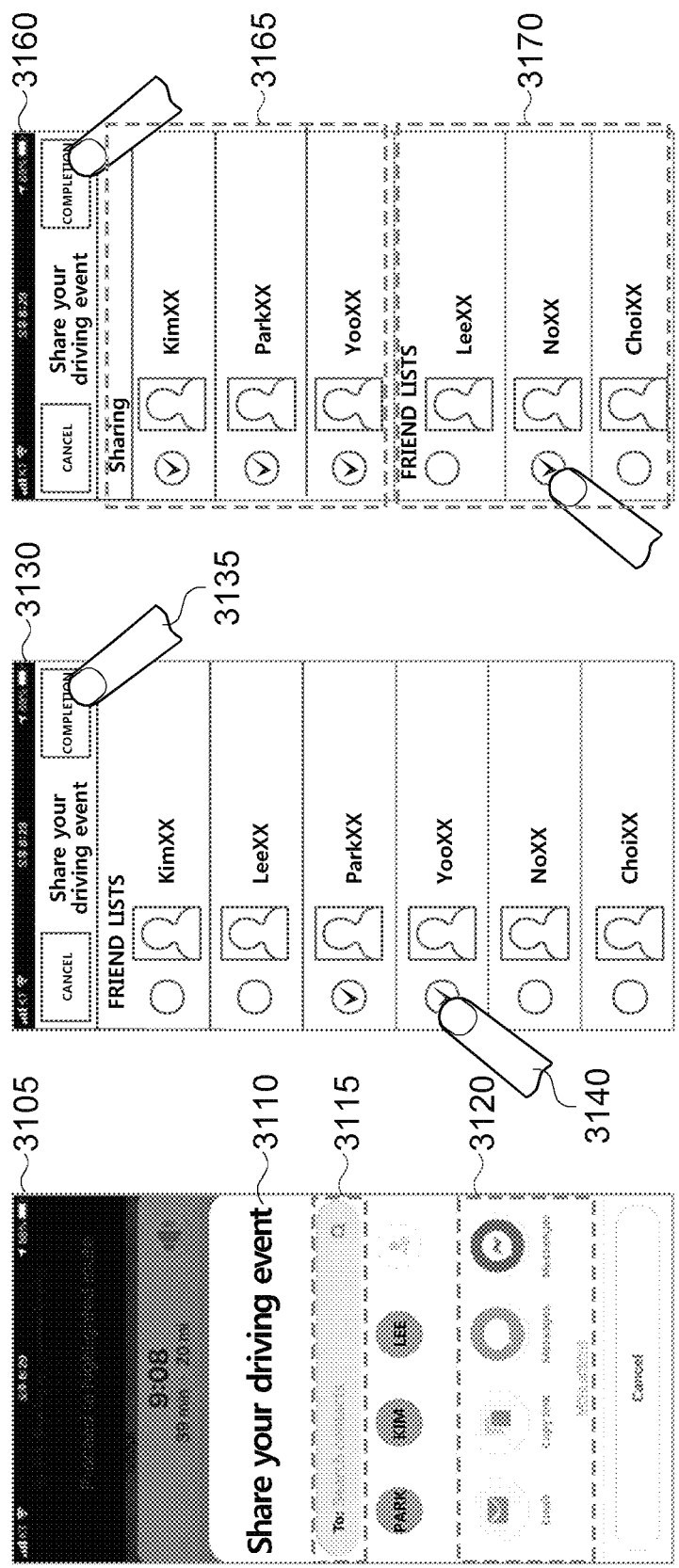
FIG. 31 is a view illustrating a user interface for sharing a driving-related event acquired while driving a user's vehicle with other users.

FIG. 31 shows a user screen for sharing a driving-related event acquired during driving of the user's vehicle with other users. Reference numeral 3105 denotes a user interface screen displayed when a user's touch is input to a visual object having a sharing function shown in FIG. 28 to share a driving-related event acquired during driving of the user's vehicle with other users.

Reference numeral 3110 shows that a user interface for selecting a target to share a driving-related event is displayed, while seamlessly providing an application service (e.g., a navigation function, etc.) already provided to the user.

Reference numeral 3115 denotes a search window for the user to select or input a target to share a driving-related event, and reference numeral 3120 denotes a user interface screen for selecting an application means (email. Link, message, messenger, etc.) for the user to share a driving-related event.

Reference numeral 3130 denotes a user interface that displays a target for the user to share a driving-related event. Reference numeral 3130 shows that the user searches a friend list for a target to which the user is to provide a driving-related event, and here, the friend list may be contact numbers stored in the user's smart phone. However, if the user's prior consent is given, the server 300 providing the service may display, as a target to share the user's driving-related event, a target with which the user has recently shared the driving-related event, a target who wants to share the user's driving-related event, or users who have traveled or who are to travel near a route along which the user has traveled. In addition, when selection of the target for sharing the driving-related event is completed, the user touches a visual object corresponding to the completion of the driving event sharing as shown in reference numeral 3135. Reference numeral 3140 shows that a target to share the driving-related event is selected from the friend list by a user's touch.

Reference numeral 3160 denotes a user interface screen displaying addition of a new target for sharing a driving-related event from a list of friends registered in the user terminal device 400. Referring to reference numeral 3160, in another exemplary embodiment of the present invention, a list of targets sharing the driving-related event and a list of targets not sharing the driving-related event are distinguishably displayed. Reference numeral 3165 denotes targets with which the user shares the driving-related event, and reference numeral 3170 denotes a list of targets with which the user does not share the driving-related event. If the user wants to additionally share the driving-related event, the user may select from the target list 3170 with which the driving-related event has not yet been shared.

In addition, although not shown in the drawings described above, the driving-related event may include all events related to driving such as a collision occurrence event, a driver assistance occurrence event, an accident-related event, a traffic information collecting event, a traffic information reporting event, a traffic information generating event, an autonomous driving event, an emergency service request event, a communication event, and the like. In addition, in order to classify the types of the events, visual objects corresponding to the respective types of events may be displayed on the user interface.

As described above, according to another exemplary embodiment of the present invention, points at which driving-related events selected according to the user's selection occur may also be displayed.

Further, the driving-related event may be referred to as a user driving-related event or a vehicle driving-related event according to whether a driving subject of the vehicle is a person or an autonomous driving system.

Meanwhile, in the specification and the claims, terms such as "first", "second", "third", "fourth", and the like, if any, will be used to distinguish similar components from each other and be used to describe a specific sequence or a generation sequence, but is not necessarily limited thereto. The terms used as such will be understood by the exemplary embodiments of the invention described herein. Likewise, in the case in which it is described herein that a method includes a series of steps, a sequence of the steps suggested herein is not necessarily a sequence in which the steps may be executed, and any described step may be omitted and/or any other steps that are not described herein may be added to the method. For example, the first component may be referred to as a second component, and similarly, the second component may be referred to as a first component, without departing from the scope of the present invention.

In addition, in the specification and the claims, terms such as "left", "right", "front", "rear", "top", "bottom", "over", "under", and the like do not necessarily indicate relative positions that are not changed, but are used for explanation. It will be understood that these terms are compatible with each other under an appropriate environment so that exemplary embodiments of the present invention set forth herein may be operated in a direction different from a direction illustrated or described herein. The term "connected" as used herein is defined as being connected directly or indirectly in an electrical or non-electrical manner. Here, targets described as being "adjacent to" each other may physically contact each other, be close to each other, or be in the same general range or region, in a context in which the above phrase is used. Here, the phrase "in an exemplary embodiment" means the same exemplary embodiment, but is not necessarily limited thereto.

In addition, in the specification and the claims, terms such as "connected", "connecting", "linked", "linking", "coupled", "coupling", and the like, and various modifications of these terms may be used as the meaning including that one component is directly connected to another component or is indirectly connected to another component through the other component.

On the other hand, when it is mentioned that any component is "directly coupled" or "directly connected" to another component, it is to be understood that any component may be coupled or connected to the other element without another component interposed therebetween.

In addition, terms "module" and "unit" for components used in the present specification are used only in order to easily make the specification. Therefore, these terms do not have meanings or roles that distinguish from each other in themselves.

In addition, the terms used in the present specification are for explaining exemplary embodiments rather than limiting the present invention. The singular expression used in the present specification includes the plural expression unless the context clearly indicates otherwise. In the specification, it is to be noted that the terms "comprising" or "including", and the like, are not be construed as necessarily including several components or several steps described in the specification and some of the above components or steps may not be included or additional components or steps are construed as being further included.

Hereinabove, the present invention has been described with reference to the exemplary embodiments thereof. All exemplary embodiments and conditional illustrations disclosed in the present specification have been described to intend to assist in the understanding of the principle and the concept of the present invention by those skilled in the art to which the present invention pertains. Therefore, it will be understood by those skilled in the art to which the present invention pertains that the present invention may be implemented in modified forms without departing from the spirit and scope of the present invention.

Therefore, the exemplary embodiments disclosed herein should be considered in an illustrative aspect rather than a restrictive aspect. The scope of the present invention is shown in the claims rather than the foregoing description, and all differences within the equivalent range should be interpreted as being included in the present invention.

Meanwhile, the method for providing driver's driving information according to various exemplary embodiments of the present invention described above may be implemented as programs and be provided to servers or devices. Therefore, the respective apparatuses may access the servers or the devices in which the programs are stored to download the programs.

In addition, the method according to various exemplary embodiments of the present invention described above may be implemented as a program and stored in various non-transitory computer readable media and provided. The non-transitory computer readable medium is not a medium that stores data for a short time such as a register, a cache, a memory, or the like, but means a machine readable medium that semi-permanently stores data. Specifically, various applications or programs described above may be stored and provided in the non-transitory computer readable medium such as a compact disk (CD), a digital versatile disk (DVD), a hard disk, a Blu-ray disk, a universal serial bus (USB), a memory card, a read only memory (ROM), or the like.

Although the exemplary embodiments of the present invention have been illustrated and described hereinabove, the present invention is not limited to the specific exemplary embodiments described above, but may be variously modified by those skilled in the art to which the present invention pertains without departing from the scope and spirit of the present invention as claimed in the claims. These modifications should also be understood to fall within the technical spirit and scope of the present invention.

What is claimed is:

1. A method for providing driver's driving information of a user terminal device, the method comprising:
    accessing a driving information providing server storing data generated in a driving recording device for a vehicle;
    receiving driving record data including event record data corresponding to a driving-related event of a driver from the driving information providing server;
    displaying a driving-related event occurrence location on a map of a driving information user interface using the received driving record data; and
    displaying at least one icon visually distinguished and associated with frequency of the driving-related event occurrence according to kind of event types on a driving information display region of a main user interface, wherein the driving information user interface and the main user interface are separated user interfaces, wherein the driving information display region is displayed by date, and the driving information display region displays past data as it moves in specific direction according to user input, wherein the icon is visually distinguished by having a different size according to the frequency of the driving-related event occurrence, and wherein the driving-related event includes at least two or more of a lane departure event, a forward collision possibility event, a rear side collision possibility event.

2. The method of claim 1, wherein the driving-related event further includes at least one of a sudden deceleration event, a sudden acceleration event, a sudden stop event, a sudden start event, and a speeding event.

3. The method of claim 1, wherein the event record data includes location information corresponding to a location where the driving-related event occurs, time information corresponding to a time at which the driving-related event occurs, and event type information corresponding to a type of the driving-related event.

4. The method of claim 1, wherein the displaying includes displaying a driving route of the driver and an event icon indicating the driving-related event occurrence location on the driving route, wherein the icon is displayed to be distinguished from each other according to types of events.

5. The method of claim 4, further comprising:
displaying, when the event icon displayed on the map is selected, event occurrence reason information corresponding to the selected event icon as a pop-up window on the map.

6. The method of claim 4, further comprising:
displaying, when the event icon displayed on the map is selected, the map based on the selected event icon by scaling up the map.

7. The method of claim 4, further comprising:
displaying, when the event icon displayed on the map is selected, an image of an event corresponding to the selected event icon as a pop-up window.

8. The method of claim 4, further comprising:
displaying, when the event icon displayed on the map is selected, a driving-related event list including event detail information corresponding to the selected event icon and event detail information corresponding to an event that occurs before and/or after the selected event icon.

9. The method of claim 8, wherein each of a plurality of event detail information included in the driving-related event list is selectable according to a user input, and when one of the plurality of event detail information is selected according to the user input, an event occurrence location on a driving route corresponding to the selected event detail information is displayed on the map.

10. The method of claim 1, further comprising:
displaying a driving record list classified monthly and daily using the received driving record data,
wherein at least one of driving time information or driving distance information corresponding to each item is displayed on each item of the driving record list.

11. The method of claim 10, wherein the map and the driving record list are displayed on one screen.

12. The method of claim 11, further comprising:
displaying, when one item on the driving record list is selected, a driving route of the driver and an event occurrence location on the driving route corresponding to the selected item on the map.

13. The method of claim 1, further comprising:
displaying an event driving record of the driver for a predetermined period of time in a region of a main user interface,
wherein the region displays a driving record by adjusting a size of a figure according to the number of each kind of the driving record.

14. A user terminal device for providing driver's driving information, the user terminal device comprising:
a display unit;
a communication unit accessing a driving information providing server storing data generated in a driving recording device for a vehicle and receiving driving record data including event record data corresponding to a driving-related event of a driver from the driving information providing server; and
a controller controlling the display unit to display a driving-related event occurrence location on a map of a driving information user interface using the received driving record data,
wherein the controller displays at least one icon visually distinguished and associated with frequency of the driving-related event occurrence according to kind of event types on a driving information display region of a main user interface,
wherein the driving information user interface and the main user interface are separated user interfaces,
wherein the driving information display region is displayed by date, and the driving information display region displays past data as it moves in specific direction according to user input,
wherein the icon is visually distinguished by having a different size according to the frequency of the driving-related event occurrence, and
wherein the driving-related event includes at least two or more of a lane departure event, a forward collision possibility event, a rear side collision possibility event.

15. The user terminal device of claim 14, wherein the controller controls the display unit to display a driving route of the driver and an event icon indicating the driving-related event occurrence location on the driving route, wherein the event icon is displayed to be distinguished from each other according to types of events.

16. The user terminal device of claim 15, wherein the controller controls the display unit to display, when the event icon displayed on the map is selected, event occurrence reason information corresponding to the selected event icon as a pop-up window on the map.

17. The user terminal device of claim 15, wherein the controller controls the display unit to display, when the event icon displayed on the map is selected, the map based on the selected event icon by scaling up the map.

18. The user terminal device of claim 15, wherein the controller controls the display unit to display, when the event icon displayed on the map is selected, an image of an event corresponding to the selected event icon as a pop-up window.

19. The user terminal device of claim 14, wherein the controller controls the display unit to display a driving record list classified monthly and daily using the received driving record data, wherein at least one of driving time information or driving distance information corresponding to each item are displayed at each item of the driving record list.

20. A non-transitory computer readable recording storage medium containing instructions that, when executed by one or more processors, cause the one or more processors to perform a method for providing driver's driving information of a user terminal device, the method comprising:

accessing a driving information providing server storing data generated in a driving recording device for a vehicle;

receiving driving record data including event record data corresponding to a driving-related event of a driver from the driving information providing server;

displaying a driving-related event occurrence location on a map of a driving information user interface using the received driving record data; and displaying at least one icon visually distinguished and associated with frequency of the driving-related event occurrence according to kind of event types on a driving information display region of a main user interface, wherein the driving information user interface and the main user interface are separated user interfaces, wherein the driving information display region is displayed by date, and the driving information display region displays past data as it moves in specific direction according to user input, wherein the icon is visually distinguished by having a different size according to the frequency of the driving-related event occurrence, and wherein the driving-related event includes at least two or more of a lane departure event, a forward collision possibility event, a rear side collision possibility event.

* * * * *